United States Patent [19]
Hashimoto et al.

[11] Patent Number: 6,047,313
[45] Date of Patent: Apr. 4, 2000

[54] DATA ROUTING APPARATUS, SERVER AND DATA TERMINAL EQUIPMENT

[75] Inventors: Sunao Hashimoto; Tan Hazama, both of Nakai-machi, Japan

[73] Assignee: Fuji Xerox Co., Ltd., Tokyo, Japan

[21] Appl. No.: 08/904,584

[22] Filed: Aug. 6, 1997

[30] Foreign Application Priority Data

Aug. 8, 1996 [JP] Japan ................................ 8-208714
May 8, 1997 [JP] Japan ................................ 9-118059

[51] Int. Cl.[7] .................................................. G06F 13/00
[52] U.S. Cl. ........................ 709/203; 709/217; 709/219
[58] Field of Search .................................. 709/200, 201, 709/203, 217, 218, 219, 224, 227, 228

[56] References Cited

U.S. PATENT DOCUMENTS

| | | | |
|---|---|---|---|
| 5,146,578 | 9/1992 | Zangenehpour | 711/137 |
| 5,375,244 | 12/1994 | McNair | 710/200 |
| 5,761,436 | 6/1998 | Nielsen | 709/245 |
| 5,784,562 | 7/1998 | Diener | 709/217 |
| 5,809,298 | 9/1998 | Nakada | 707/104 |
| 5,812,769 | 9/1998 | Graber et al. | 709/228 |
| 5,819,285 | 10/1998 | Damico et al. | 707/104 |
| 5,860,071 | 1/1999 | Ball et al. | 707/100 |

FOREIGN PATENT DOCUMENTS 7-295930   11/1995   Japan .
8-44643    2/1996    Japan .

*Primary Examiner*—Moustafa M. Meky
*Attorney, Agent, or Firm*—Oliff & Berridge, PLC

[57] ABSTRACT

A data routing apparatus for routing data between a network server and data terminal equipment. The data routing apparatus comprises: a historical information holding unit for holding historical information about past data requests from the data terminal equipment, the historical information holding unit further accommodating additional historical information about any new data request coming from the data terminal equipment; a data acquisition unit for accessing the network server in accordance with the data request so as to acquire requested data therefrom; and a data output unit for outputting the data acquired by the data acquisition unit and the historical information to the data terminal equipment that issued the data request.

25 Claims, 38 Drawing Sheets

| USER NAME | HISTORY-UNNECESSARY CONDITIONS |
|---|---|
| USER A | DATA TYPE = IMAGE DATA<br>DATA CONTENT: "HISTORY" INCLUDED<br>URL =http://www.xxx.co.jp |
| USER B | DATA TYPE = HTML<br>URL =http://www.yyy.co.jp/index.html<br>URL =http://www.zzz.com |

| DATA NAME | DATA CONTENTS | LAST UPDATE TIME |
|---|---|---|
| NAME 1 | DATA 1 | LAST 1 |
| NAME 2 | DATA 2 | LAST 2 |
| NAME 4 | DATA 4 | LAST 4 |

| USER NAME | URL | WORK NAME | TIME | DATA |
|---|---|---|---|---|
| HASHIMOTO | http://www.test.com/index.html | PATENT | 97/03/08 12:35 | HTML DOCUMENT 1 |
| HASHIMOTO | http://fujiyama.co.jp/index.html | PATENT | 97/03/11 17:03 | HTML DOCUMENT 2 |
| YAMADA | http://www.test.com/index.html | R & D | 97/03/14 13:15 | HTML DOCUMENT 1 |
| HASHIMOTO | http://www.test.com/index.html | PATENT | 97/03/25 10:54 | HTML DOCUMENT 3 |

| WS_ID | WS_title |
|---|---|
| 1 | Patent |
| 2 | Accounting |
| 3 | Development |

| user_ID | user_name | passwd | home_WS_ID |
|---|---|---|---|
| 1 | Hashimoto | hogehoge | 1 |
| 2 | Hazama | bokeboke | 2 |

| snap_ID | create_data | WS_ID | link_ID | operation |
|---|---|---|---|---|
| 1 | 96/06/05 13:10 | 1 | 1 | Browse |
| 2 | 96/07/10 15:22 | 2 | 4 | Print |
| 3 | 96/07/10 19:54 | 3 | 2 | Edit and store |
| 4 | 96/07/25 10:09 | 1 | 1 | Browse |

| link_ID | link_TITLE | URL | MEMO |
|---|---|---|---|
| 1 | Published Unexamined Patent Application | http://www.pat.ccc/pat?id=H08368297 | Important |
| 2 | Accounting procedure | http://www.keiri/tejyunnsho.htm | Urgent |
| 3 | Department budget draft for '97 | http://www.keiri/xxdepbudget-97.htm | Reference material |
| 4 | ○× Newspaper | http://www.shinbunn.co.jp | F Y I |
| 5 | Search result | http://www.kensaku.com/search?java | Problem found |

| snap_ID | link_ID | X | Y |
|---|---|---|---|
| 1 | 1 | 50 | 100 |
| 2 | 2 | 45 | 89 |
| 2 | 3 | 42 | 105 |
| 3 | 4 | 98 | 3 |
| 3 | 5 | 28 | 81 |

435a

DATA ROUTING APPARATUS, SERVER AND DATA TERMINAL EQUIPMENT

BACKGROUND OF THE INVENTION

1. Field of the Invention

The present invention relates to a data routing apparatus, a server and data terminal equipment. More specifically, the invention relates to a data routing apparatus that routes data between a network server and data terminal equipment, to a server that serves diverse kinds of data, and to data terminal equipment requesting data from the server.

2. Description of the Related Art

The Internet, a huge network interconnecting computers throughout the world, is rapidly coming into general use today. Any host computer (called hosts hereafter) inside closed networks such as LANs (local area networks) may access the Internet, the network of interconnected networks, for transmitting electronic mail, making use of external databases, and other functions. Of a variety of services available on the Internet, the WWW (Word Wide Web) is particularly popular, in part because it allows users to receive multimedia content including dynamic images and voice data from around the world.

To browse data on the WWW, users utilize client software called a browser such as Netscape Navigator (registered trademark of Netscape Communications Inc.). Using a browser, a user may either specify a URL (uniform resource locator) to identify the desired entity on the WWW, or track links (highlighted characters or images selected typically by a pointing device) in HTML (Hyper Text Markup Language) documents to view other data related to the currently-displayed document.

Of the vast quantity of data located on the WWW, only a limited portion is typically needed by a given individual. Since the data retrieved by a user in the past is highly likely to be needed by the same user again in the future, client software is typically capable of storing a history of data viewed, in the form of links or "bookmarks" of preferred pages previously retrieved. By referring to the history or bookmarks, the user may readily recall necessary data.

It should be noted that such historical information is stored only in the environment in which the client software operates. The capability of acquiring historical information is built beforehand into the client software. Thus, if a user wants to utilize the historical information in a different environment or acquire a different kind of history, the client software must be modified.

A number of methods have been proposed to let easily users gain access to desired pages, without requiring modifications to their client software.

One such method involves the use of JavaScript (registered trademark of Sun Microsystems Inc.) that allows users to store information about desired pages into their client software. With this method, users select specific pages from the information they viewed previously, and JavaScript will then retrieve the requested pages.

Another method involves using JavaScript to passively build a history of pages browsed by the user. With this method, JavaScript operates in one window of the client software. User activity in other windows of the client software is then monitored by JavaScript. The link history is sent to a server for storage. In that case, the user's historical information is accumulated in a server and therefore may be accessed from different client software.

When the Internet is accessed from within a local area network (LAN) or similar setup, the host on which client software runs may be connected to a server having a data routing capability called a proxy server. The host in side the LAN is connected to the Internet not directly but only through the proxy server. This setup is primarily intended to prevent unauthorized entry into the LAN.

Illustratively, Japanese Published Unexamined Patent Application No. Hei 8-446432 discloses a gateway server that replaces hypertext links between client software and the server. The disclosed device is intended to forestall illegal access from the outside.

Some proxy servers are capable of retaining acquired data in a cache memory and of retrieving the data therefrom when the same data is accessed from within the LAN in question. Such a server obtains log information at the time of data routing. When a data request is received, the server may choose to search its cache memory for the requested data and responds with the matched data, reducing the load on the network.

FIG. 40 is a schematic view of the environment in which a conventional proxy server operates. In FIG. 40, a proxy server 610 routes data between a network 620 and a LAN 600. The network 620 is connected to servers 621 and 622 having data 621a and 622a to be served, respectively. The LAN 600 is connected to hosts 601 and 602 which run respectively client software programs 601a and 602a for viewing data supplied from the servers. The proxy server 610 has storage means 611 that accommodates log information and data acquired.

When the client software 601a requests the server 621 to serve the data 621a, the proxy server works in the manner described below.

FIG. 41 is a schematic view outlining how a conventional proxy server operates. In the description that follows, any components of the setup not relevant to the description of the proxy server workings are omitted.

Suppose that the client software 601a requests that data A be served from the server 621, having the data A stored in storage means 621a.

Given the data request from the client software 601a, the proxy server 610 stores log information about the request in the storage means 611. The proxy server 610 then accesses the server 621 and requests the data A which is part of the data stored in 621a. The data A thus obtained is placed in the storage means 611 before being forwarded to the client software 601a. If any other client software subsequently issues a request for the data A, the proxy server 610 does not send a data request to the server 621, but instead supplies the client software in question with the data A retrieved from the storage means 611.

In the manner described above, the proxy server acts as a cache memory that reduces traffic on the network and enhances access speed.

The method mentioned above for having information about desired pages stored in client software has one disadvantage: users must input all information about their preferred pages into their client software. To view the information stored by this method, users must invoke either a specific page or a particular function of their client software. It is impossible to display an invoked page while navigating through other pages simultaneously. Furthermore, because the information about desired pages is stored in a particular client software program, the same user cannot utilize this function if another client software program is activated.

Likewise, the method of having JavaScript monitor other windows has the disadvantage of having to open a dedicated page to view the historical information. Another disadvantage of this method is that a specific page from which to start acquiring the historical information must be viewed every time an access operation is made.

In addition, the preceding method is characterized by storing historical information to be held in a server. This makes it difficult for a particular user to view only his or her historical information. There exists a security risk of historical information of any user being accessed by other unscrupulous users.

The method involving the use of a proxy server as a cache memory poses two problems.

First, the retained log information is typically not offered to client software. Thus when a user requests data, the log information is not referenced. To acquire the log information requires that the storage means of the proxy server be accessed somehow independently of the client software.

The second problem with the proxy server method is that, because only the most recent data is retained in the cache memory, it is unpredictable whether any document in the cache is still the same as the latest document. The cache is accessed for previously acquired results on the assumption that any file once accessed remains unchanged. If the original file is found to have been updated, the contents of the cache are updated as well, i.e., the previously acquired results are discarded. If any old file happens to be in the cache, there is no way of designating and accessing that file.

The above second problem related to the proxy server may be circumvented by application of work space techniques. The work space is a system that preserves and manages a work environment in which a user works using a computer on plural tasks which may be switched to proceed in parallel. As such, the work space comprises techniques whereby the environment in which the user worked on tasks, the history of work by users, or both the environment and the work history, are preserved and managed so that a desired work state that existed in the past may be recalled. One such technique regarding the work space is disclosed illustratively in Japanese Published Unexamined Patent Application No. Hei 07-295930.

The system disclosed in Japanese Published Unexamined Patent Application No. Hei 07-295930 above has one disadvantage. That is, the backup of any old file before its update is stored with a difficult-to-understand file name such as "0331BK" that replaces the original file name of, for example, "SPECIFICATION." This can lead to a situation where the user is at a loss as to which file succeeds which before and after the update.

In addition, the conventional work space technique is incapable of dealing with documents or data acquired externally from Internet sources such as the WWW. That is, data in a server connected through the Internet may be updated over time but the client having accessed the data in question before has no way of knowing that the update took place. Since the WWW identifies any data through links based on URLs, any data with its URL replaced by some other name is no longer retrievable through linkage. Thus past status can be neither preserved nor reproduced.

SUMMARY OF THE INVENTION

It is therefore an objective of the present invention to overcome the above and other deficiencies and disadvantages of the related art and to provide a data routing apparatus which stores historical information independently of client software or of the environment or the server where such software operates and which allows any client software to make use of the stored information therein.

Another objective of the invention is to provide a data routing apparatus for routing data between a network server and data terminal equipment in a way that minimizes the risk of illegal access and decreases the load on the network in question.

Another objective of the invention is to provide a data routing apparatus for allowing the contents of previously accessed data to be referenced again even if the data contents have since been updated.

Another objective of the invention is to provide a server for serving again the contents of data previously served to a user even if the data contents have since been updated.

It is a further objective of the invention to provide data terminal equipment for referencing again the contents of data previously acquired from a server, even if the data contents have since been updated.

In carrying out the invention and according to one aspect thereof, there is provided a data routing apparatus for routing data between a network server and data terminal equipment, the data routing apparatus comprising: historical information holding means for holding historical information about past data requests from the data terminal equipment, the historical information holding means further accommodating additional historical information about any new data request coming from the data terminal equipment; data acquisition means for accessing the network server in accordance with the data request so as to acquire requested data therefrom; and data output means for outputting the data acquired by the data acquisition means and the historical information to the data terminal equipment that issued the data request.

Where the data routing apparatus of the above constitution is used to route data between any network server and data terminal equipment, the historical information holding means holds historical information about past data requests made by the data terminal equipment. When a new data request is input from the data terminal equipment, the historical information holding means supplements its historical information with additional information about the newly input data request. The data acquisition means accesses the network server in accordance with the input data request and acquires requested data therefrom. The data output means outputs to the data terminal equipment both the acquired data and relevant historical information held in the historical information holding means.

Because the data routing apparatus has a historical information holding capability, historical information may be accumulated independently of specific client software or of the environment or server in which the software is run. This allows historical information to be utilized by any client software.

According to another aspect of the invention, there is a data routing apparatus for routing data between data utilization means for utilizing requested and acquired data on the one hand, and data service means for serving, as requested, data stored therein on the other hand, the data routing apparatus comprising: history holding means for holding historical information about routed data; request analysis means for analyzing a data acquisition request received from the data utilization means to see whether the request is a data routing request or a historical information acquisition request, the request analysis means further extracting a data name from the data acquisition request if the request is found to be a data routing request, the request analysis means further extracting a data name and time information from the data acquisition request if the request is found to be a historical information acquisition request; data request means which, when the data acquisition request turns out to be a data routing request, requests from the data service means the data corresponding to the data name extracted by the request analysis means, the data request means further receiving the data sent from the data service means as requested; history management means which, when the data acquisition request turns out to be a data routing request, stores into the history holding means historical information associating the data received by the data request means, a name of the received data, and time information representing a time at which data routing was performed, the history management means thereupon preparing the data received by the data request means as output data; the history management means further acting, when the data acquisition request turns out to be a historical information acquisition request, to retrieve from the history holding means historical information relevant to the data name and time information extracted by the request analysis means, the history management means thereupon preparing the data included in the retrieved historical information as output data; and output means for sending the output data prepared by the history management means to the data utilization means that issued the data acquisition request.

The data routing apparatus of the above constitution operates as follows: upon receipt of a data acquisition request that turns out to be a data routing request, the request analysis means extracts a data name from the request. Then the data request means requests from the data service means the data corresponding to the data name extracted by the request analysis means, and receives the data sent from the data service means as requested. The history management means stores into the history holding means the historical information associating the data received by the data request means, the data name, and time information representing the time at which data routing took place. At the same time, the history management means prepares the data received by the data request means as output data. The output data is sent by the output means to the data utilization means that issued the data acquisition request.

On the other hand, upon receipt of a data acquisition request that turns out to be a historical information acquisition request, the request analysis means extracts a data name and time information from the request. Then the history management means searches the history holding means for the historical information that matches the data name and time information extracted by the request analysis means. The data included in the historical information thus detected is prepared as output data. The output data is sent by the output means to the data utilization means that issued the data acquisition request.

According to a further aspect of the invention, there is provided a server for returning data in response to a request from data terminal equipment, the server comprising: data holding means for holding data to be served via a network; history holding means for holding historical information about data served in response to data acquisition requests; request analysis means for analyzing a data acquisition request received from data terminal equipment to see whether the request is a latest data acquisition request or a historical information acquisition request, the request analysis means further extracting a data name from the data acquisition request if the request is found to be a latest data acquisition request, the request analysis means further extracting a data name and time information from the data acquisition request if the request is found to be a historical information acquisition request; data retrieval means which, when the data acquisition request is found to be a latest data acquisition request, retrieves from the data holding means the data corresponding to the data name extracted by the request analysis means; history management means which, when the data acquisition request turns out to be a latest data acquisition request, stores into the history holding means historical information associating the data retrieved by the data retrieval means, a name of the retrieved data, and time information representing a time at which data serving was performed, the history management means thereupon preparing the data retrieved by the data retrieval means as output data; the history management means further acting, when the data acquisition request turns out to be a historical information acquisition request, to retrieve from the history holding means historical information relevant to the data name and time information extracted from the data acquisition request, the history management means thereupon preparing the data included in the retrieved historical information as output data; and output means for sending the output data prepared by the history management means to the data terminal equipment that issued the data acquisition request.

The server of the above constitution operates as follows: upon receipt of a data acquisition request that turns out to be a latest data acquisition request, the request analysis means extracts a data name from the request. Then the data retrieval means retrieves from the data holding means the data corresponding to the data name extracted by the request analysis means. The history management means stores into the history holding means the historical information associating the data retrieved by the data retrieval means, the data name, and time information representing the time at which data serving took place. At the same time, the history management means prepares the data retrieved by the data retrieval means as output data. The output data is sent by the output means to the data terminal equipment that issued the data acquisition request.

On the other hand, upon receipt of a data acquisition request that turns out to be a historical information acquisition request, the request analysis means extracts a data name and time information from the request. Then the history management means searches the history holding means for the information that matches the data name and time information extracted by the request analysis means. The data included in the historical information thus detected is prepared as output data. The output data is sent by the output means to the data terminal equipment that issued the data acquisition request.

According to another aspect of the invention, there is provided data terminal equipment for accessing data in a server connected via a network, the data terminal equipment comprising: history holding means for holding historical information about data acquired through access to the server; request analysis means for analyzing a data acquisition request that is input to see whether the request is a server access request or a historical information acquisition request, the request analysis means further extracting a data name from the data acquisition request if the request is found to be a server access request, the request analysis means further extracting a data name and time information from the data acquisition request if the request is found to be a historical information acquisition request; data request means which, when the data acquisition request turns out to be a server access request, requests from the server the data corresponding to the data name extracted by the request analysis means, the data request means further receiving the data sent from the server as requested; history management means which, when the data acquisition request turns out to be a server access request, stores into the history holding means historical information associating the data received by the data request means, a name of the received data, and time information representing a time at which server access was performed, the history management means thereupon preparing the data received by the data request means as output data; the history management means further acting, when the data acquisition request turns out to be a historical information acquisition request, to retrieve from the history holding means historical information relevant to the data name and time information extracted by the request analysis means, the history management means thereupon preparing the data included in the retrieved historical information as output data; and display means for displaying on a display screen the output data prepared by the history management means.

The data terminal equipment of the above constitution operates as follows: given a data acquisition request that turns out to be a server access request, the request analysis means extracts a data name from the request. The data request means receives from the server the data corresponding to the data name extracted by the request analysis means. The history management means then stores into the history holding means the historical information associating the data received by the data request means, the data name, and the time information representing the time at which server access took place. The data received by the data request means is prepared as output data. The content of the output data is displayed by the display means on the display screen.

On the other hand, given a data acquisition request that turns out to be a historical information acquisition request, the request analysis means extracts a data name and time information from the request. The history management means then searches the history holding means for the historical information that matches the data name and time information extracted by the request analysis means. The data included in the historical information thus detected is prepared as output data. The content of the output data is displayed by the display means on the display screen.

BRIEF DESCRIPTION OF THE DRAWINGS

FIG. 10 is a table listing typical history-unnecessary conditions;

FIG. 12 is a view of a typical data table held by a server;

FIG. 18 is a view of typical historical information held by history holding means of the invention;

FIG. 24 is a view of a typical management table held by work space management means of the invention;

FIG. 25 is a view of a typical management table held by user management means of the invention;

FIG. 26 is a view of a typical management table held by snap management means of the invention;

FIG. 27 is a view of a typical management table held by link information management means of the invention;

FIG. 28 is a view of a typical management table held by icon management means of the invention;

DESCRIPTION OF THE PREFERRED EMBODIMENTS

Preferred embodiments of the present invention will now be described with reference to the accompanying drawings. Below, a data routing apparatus embodying the invention to let any client software utilize historical information in the apparatus will be described first, followed by another inventive data routing apparatus for allowing the contents of previously accessed data to be again accessed. A server and data terminal equipment according to the invention will be described thereafter.

Figure 1:
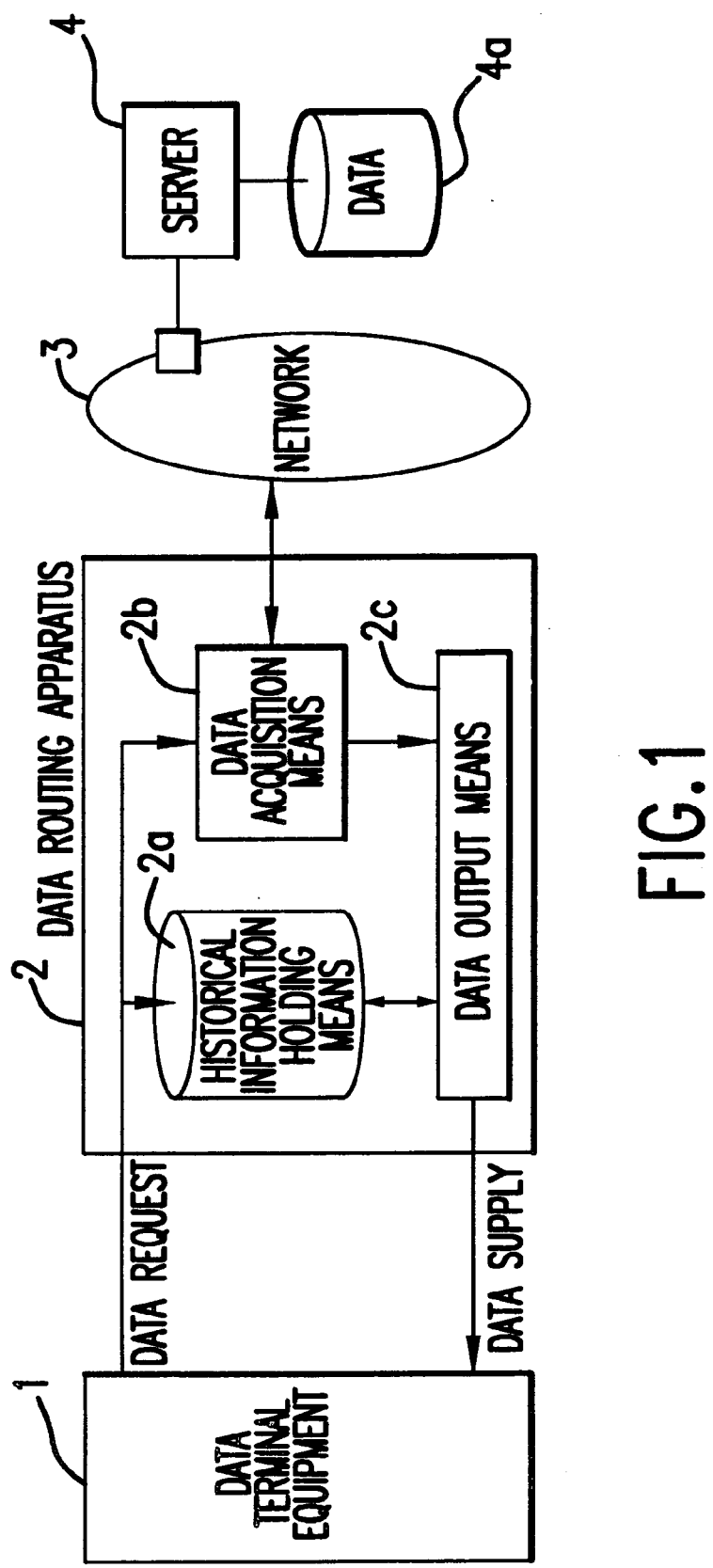
FIG. 1 is a schematic view outlining the operating principle of this invention.

FIG. 1 is a schematic view outlining the operating principle of this invention.

In FIG. 1, a data routing apparatus 2 of the invention routes data between data terminal equipment 1 and a server 4 connected to a network 3. The server 4 has data 4a stored therein and serves its data 4a as requested.

The data routing apparatus 2 comprises historical information holding means 2a having historical information about past data requests entered from the data terminal equipment 1, data acquisition means 2b for acquiring data in accordance with a data request entered from the data terminal equipment 1, and data output means 2c for outputting acquired data together with historical information to the data terminal equipment 1.

The historical information holding means 2a retains historical information about the data requests issued by the data terminal equipment 1 in the past. When a data request is newly input from the data terminal equipment 1, the historical information holding means 2a supplements the historical information held therein with additional information about the new data request.

The data acquisition means 2b analyzes the input data request, and requests data 4a from the server 4 by way of the network 3. Upon receipt of the data 4a served from the server 4, the data acquisition means 2b forwards the data to the data output means 2c.

On receiving the data 4a from the data acquisition means 2b, the data output means 2c obtains relevant historical information from the historical information holding means 2a. The data output means 2c then sends the data 4a and the historical information thus acquired to the data terminal equipment 1.

The first embodiment of the invention will now be described.

Figure 2:
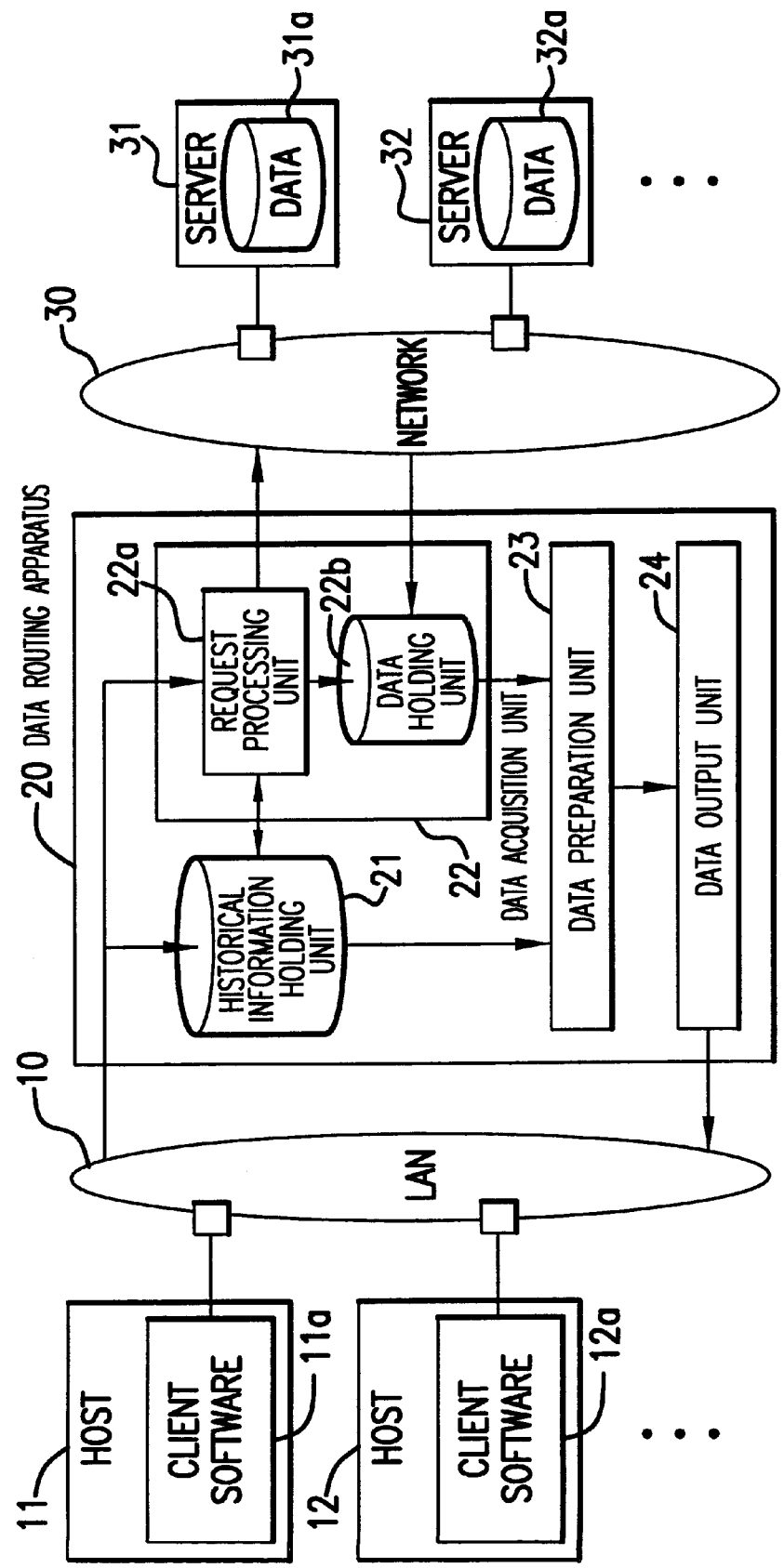
FIG. 2 is a block diagram of a first embodiment of the invention.

FIG. 2 is a block diagram of the first embodiment of the invention. The correspondence between the setups in FIGS. 1 and 2 will be discussed after the first embodiment is described below with reference to FIG. 2.

A data routing apparatus 20 in the first embodiment in FIG. 2 routes data between data terminal equipment 11, 12, etc., (i.e., hosts) connected to a LAN 10 on the one hand, and servers 31, 32, etc., connected to a network 30 on the other hand.

Client software programs 11a and 12a are run in hosts 11 and 12, respectively, located on the LAN 10. The client software requests data from the data routing apparatus 20 via the LAN 10. Servers 31 and 32 on the network 30 retain data 31a and 32a, respectively. The data routing apparatus 20 acquires such data from servers by way of the network 30.

The data routing apparatus 20 comprises a historical information holding unit 21 that holds historical information about past data requests, a data acquisition unit 22 that acquires data in response to a data request entered from a host via the LAN, a data preparation unit 23 that supplements acquired data with historical information so as to prepare history-supplemented data, and a data output unit 24 that outputs the history-supplemented data thus prepared to the host over the LAN 10.

Data requests from the client software 11a and 12a each include a URL designating requested data. The URL comprises a host name or IP address and other information about that server on the network 30 which retains the data in question.

The historical information holding unit 21 holds as historical information the URLs of data included in past data requests entered from the client software programs 11a and 12a in the hosts 11 and 12 connected to the LAN 10.

Upon receipt of a new data request over the LAN 10, the historical information holding unit 21 sends its currently held historical information to a request processing unit 22a. At this point, the historical information is supplemented with the URL of data included in the new data request. The historical information held in the historical information holding unit 21 is supplied to the data preparation unit 23 as requested.

The data acquisition unit 22 includes the request processing unit 22a and a data holding unit 22b. The request processing unit 22a processes input data requests on the basis of historical information. The data holding unit 22b retains data supplied in the past via the network 30.

Upon receipt of the new data request, the request processing unit 22a checks the requested data against the historical information sent from the historical information holding unit 21 to see if the same data has been routed previously. If the same data is found to have been routed in the past, the data should reside in the data holding unit 22b. Thus the request processing unit 22a orders the data holding unit 22b to output the data in question. If the requested data thus available, the request processing unit 22a requests the data over the network 30 on the basis of the URL. The data served in response to that request is first placed in the data holding unit 22b. The data holding unit 22 is ordered thereafter to output the served data.

The data holding unit 22b retains data supplied in the past over the network 30. If further data is fed through the network 30, the data is also placed into the data holding unit 22b. In accordance with orders from the request processing unit 22a, the data holding unit 22b outputs data to the data preparation unit 23.

On receiving data from the data holding unit 22b in the data acquisition unit 22, the data preparation unit 23 requests historical information from the historical information holding unit 21. The data preparation unit 23 supplements the data from the data holding unit 22b with the supplied historical information and with a link to the data indicated by the historical information, thereby preparing history-supplemented data. The data thus prepared is sent to the data output unit 24.

The data output unit 24 sends the history-supplemented data from the data preparation unit 23 to the client software of the host which sent the data request via the LAN 10.

The data terminal equipment 1 in FIG. 1 corresponds to the hosts 11 and 12 in FIG. 2. Likewise, the data routing apparatus 2 corresponds to the data routing apparatus 20; the network 3, to the network 30; the server 4, to the servers 31 and 32; and the data 4a, to the data 31a and 32a.

The historical information holding means 2a corresponds to the historical information holding means 21; the data acquisition means 2b, to the data acquisition unit 22; and the data output means 2c, to the data output unit 24.

Below is a description of how the data routing apparatus 20 outputs data in response to data requests from client software.

Figure 3:
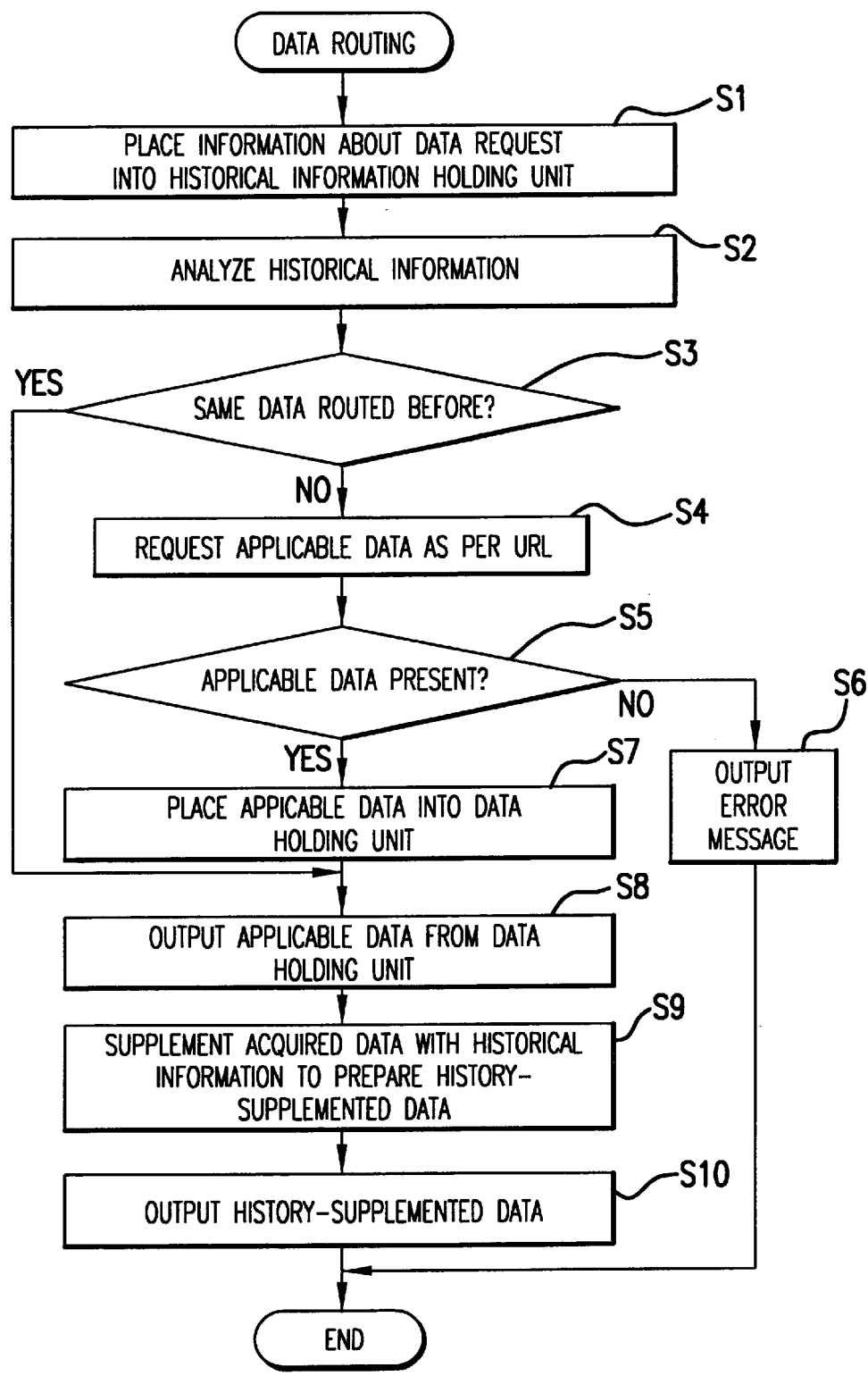
FIG. 3 is a flowchart of steps in which a data routing apparatus in the first embodiment works to route data.

FIG. 3 is a flowchart of steps in which the data routing apparatus 20 works to route data.

In step S1 of FIG. 3, given a data request, the historical information holding unit 21 supplements the historical information held therein with additional information about the data request. At this point, the historical information in effect so far is sent to the request processing unit 22a.

In step S2, the request processing unit 22a in the data acquisition unit 22 analyzes the historical information entered from the historical information holding unit 21. Specifically, the request processing unit 22a checks to see if the historical information includes the URL of data contained in the input data request.

In step S3 following the analysis in step S2, it is determined whether or not the historical information includes the URL of the data contained in the input data request. If the URL is found to be included in the historical information, it means the same data has been routed in the past. In that case, step S8 is executed next. If the same data has not been routed so far, step S4 is next.

In step S4, the request processing unit 22a requests the data in question in accordance with the URL of the data included in the input data request. The request is made via the network 30 to the applicable server which is requested to serve the data to the data routing apparatus 20.

In step S5, a check is made to see if the applicable data exists. If the data is found to exist, step S7 is reached. If the data does not exist, i.e., if the designated server does not exist or does not have the data for the specified data name, then step S6 is reached.

In step S6, in the absence of the applicable data, an error message is output regarding the input data request for nonexistent data. The output of the error message terminates the flow of processing in FIG. 3.

In step S7, with the data in question found to exist, the data is received over the network 30 into the data holding unit 22b in the data acquisition unit 22. The data holding unit 22b retains the supplied data.

In step S8, the data holding unit 22b outputs to the data preparation unit 23 the data applicable to the input data request.

In step S9, upon receipt of the data from the data holding unit 22b, the data preparation unit 23 requests historical information from the historical information holding unit 21. The data preparation unit 23 supplements the received data with the historical information from the historical information holding unit 21 as well as with a link to the data indicated by that historical information, thereby preparing history-supplemented data. The history-supplemented data thus prepared is sent to the data output unit 24.

In step S10, the data output unit 24 outputs the history-supplemented data from the data preparation unit 23 to the client software of the host which issued the data request to the data routing apparatus 20 via the LAN 10.

The host 11 shown in FIG. 2 is operated to browse data using what is known as a client software screen.

Figure 4:
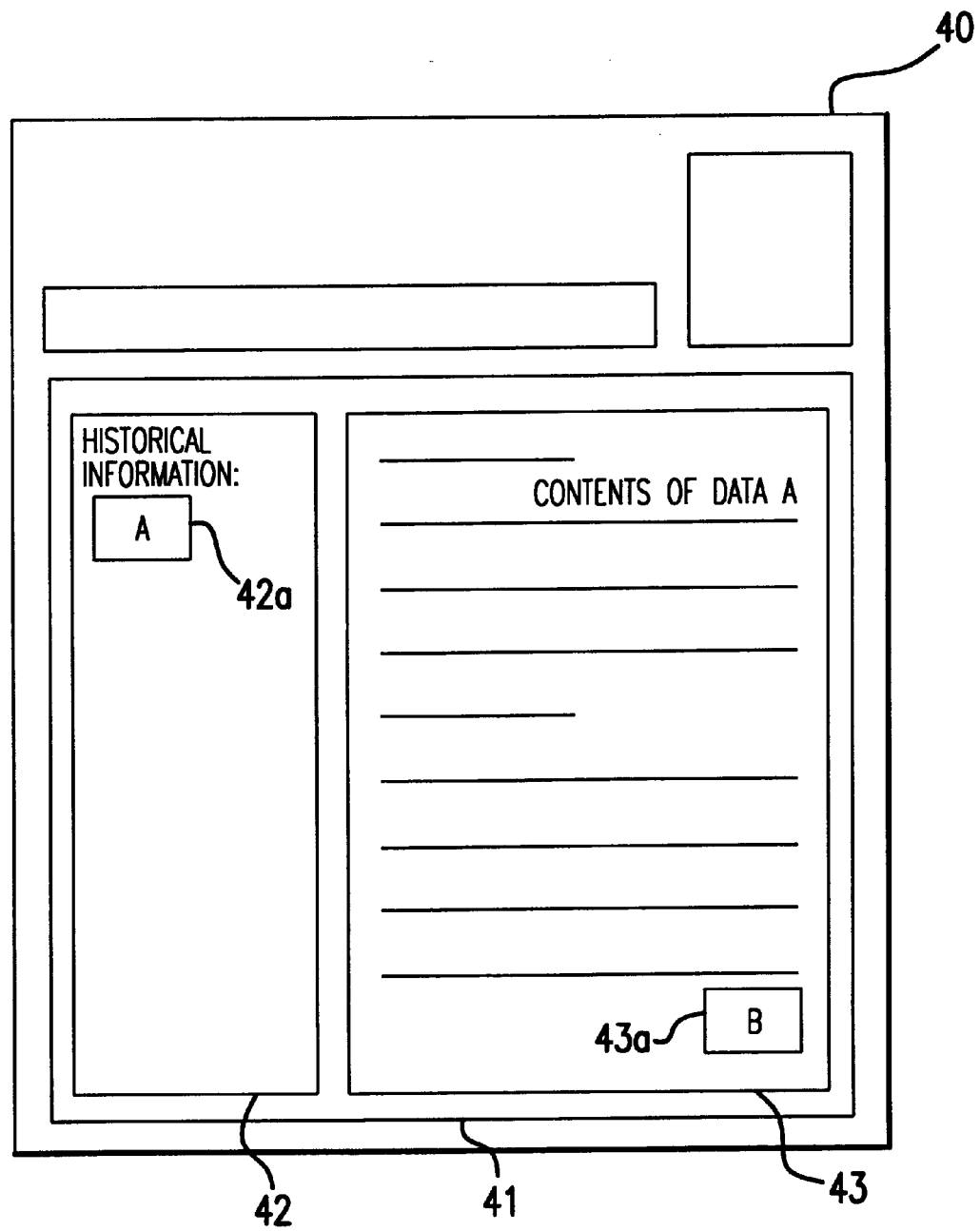
FIG. 4 is a view of a client software screen for browsing history-supplemented data.

FIG. 4 shows a typical client software screen for browsing history-supplemented data.

The client software screen 40 displayed by client software 11a includes a data window 41 in which to display requested data. If the data routing apparatus 20 is not utilized, the requested data is displayed unmodified in the data window 41. In our case, the data window 41 comprises a historical information area 42 and a data area 43. The client software screen 40 of FIG. 4 is a screen in effect when data A is called through designation of a URL.

The historical information area 42 in the data window 41 indicates a link 42a as historical information linked to the data A. The data A displayed in the data area 43 contains a link 43a linked to data B.

If the link 43a of the data B in the data area 43 is selected by a pointing device or like means, the client software issues a data request requesting the data B.

Below is a description of a typical screen in which the data B thus called is displayed.

Figure 5:
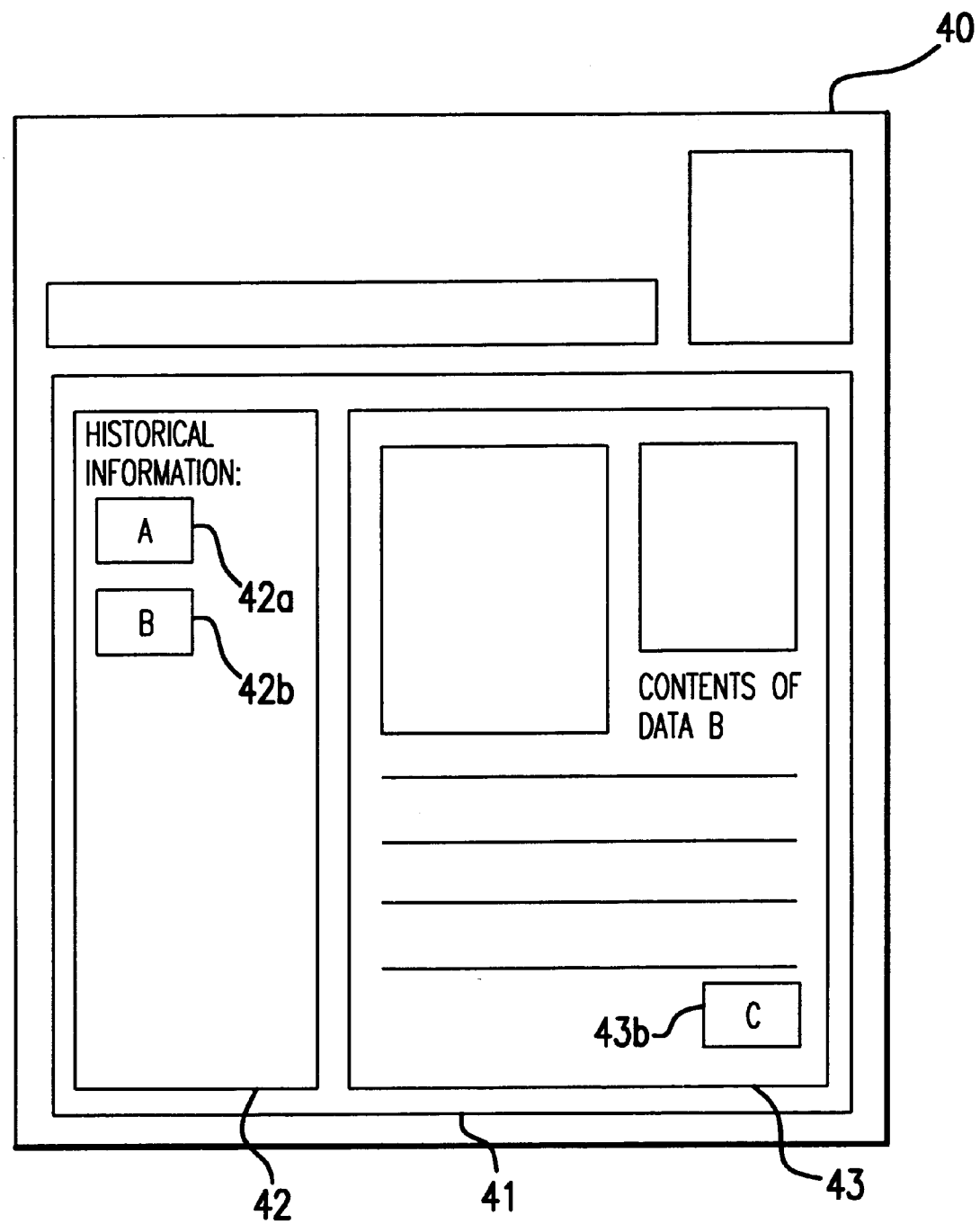
FIG. 5 is a view of a client software screen showing "data B" called from the client software screen of FIG. 4.

FIG. 5 depicts a client software screen showing the data B called from the client software screen of FIG. 4. In FIGS. 4 and 5 which show basically the same screen, like reference numerals designate like or corresponding parts, and their descriptions are hereunder omitted where redundant.

The historical information area 42 in the data window 41 of FIG. 5 is supplemented with a link 42b linked to the data B as historical information. The data B displayed in the data area 43 has a link 43b linked to data C.

If the link 43b to the data C in the data area 43 is selected by a pointing device or similar means, the client software issues a data request requesting the data C.

Below is a description of a typical screen in which the data C thus called is displayed.

Figure 6:
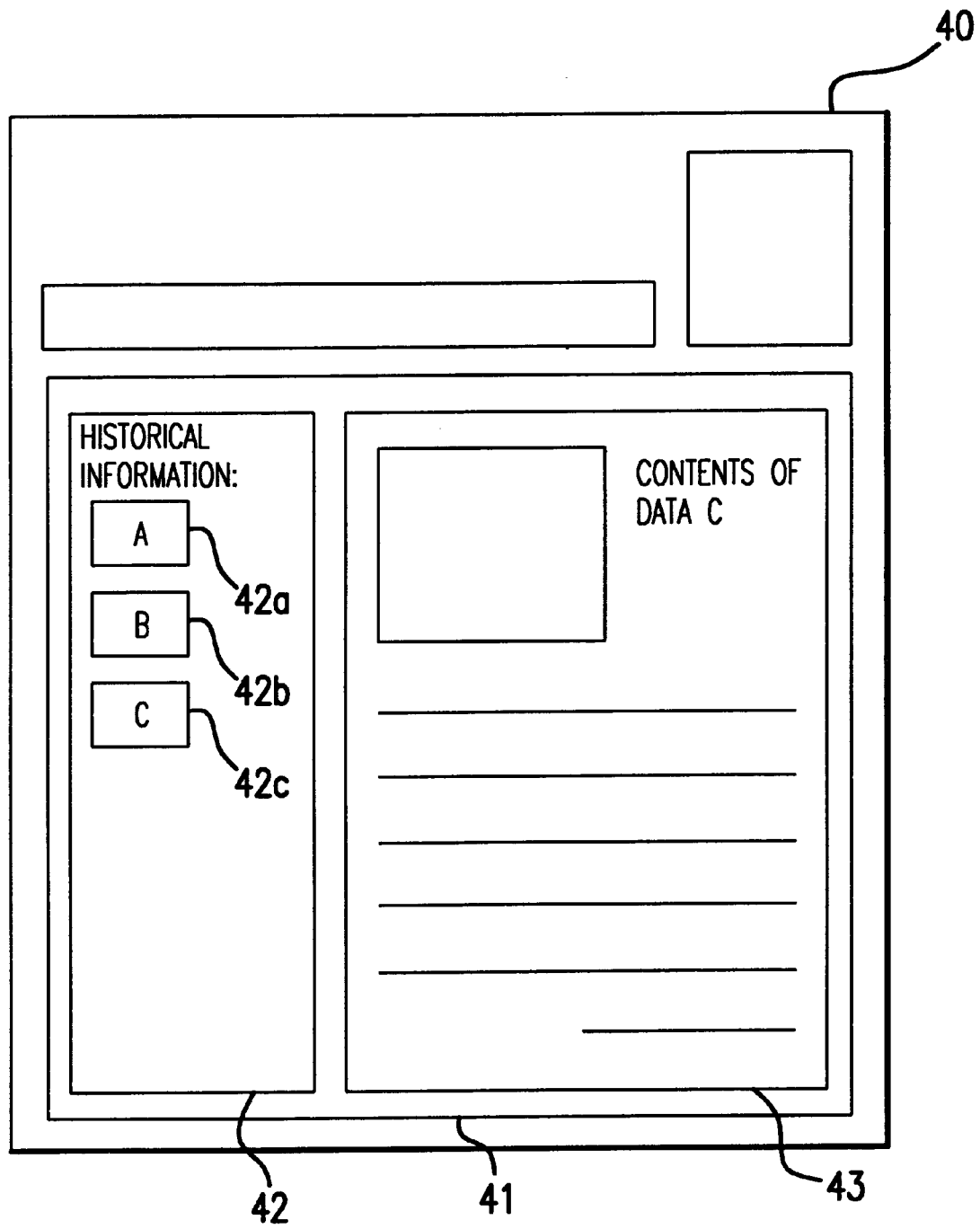
FIG. 6 is a view of a client software screen showing "data C" called from the client software screen of FIG. 5.

FIG. 6 shows a client software screen showing the data C called from the client software screen of FIG. 5. In FIGS. 5 and 6 which show basically the same screen, like reference numerals designate like or corresponding parts, and their descriptions are hereunder omitted where redundant.

The historical information area 42 in the data window 41 of FIG. 6 is supplemented with a link 42c linked to the data C as historical information. The data area 43 displays contents of the data C.

Described below is a client software screen in which the host 12 is operated to browse data upon completion of the processing by the host 11 in FIGS. 4 through 6. The client software operating in the host 12 may or may not be the same as that in the host 11.

Figure 7:
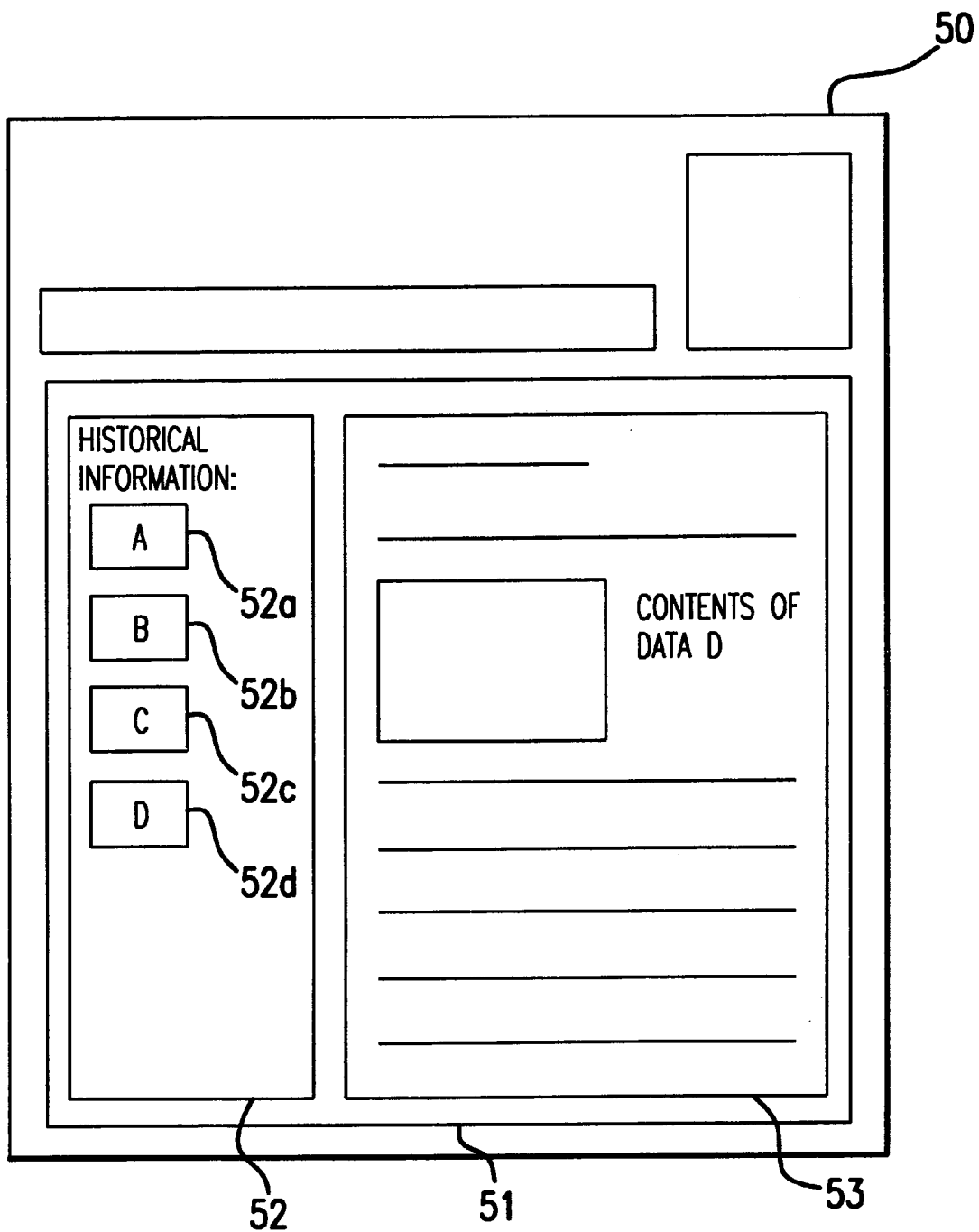
FIG. 7 is a view of another client software screen for browsing history-supplemented data.

FIG. 7 is a view of another client software screen for browsing history-supplemented data. The client software screen 50, displayed by the client software 12a in operation, includes a data window 51 that displays requested data. If the data routing apparatus 20 is not utilized, the requested data is displayed unmodified in the data window 51. In our case, the data window 51 comprises a historical information area 52 and a data area 53. The client software screen 50 of FIG. 7 is a screen in effect when data D is called by designation of a URL.

The historical information area 52 in the data window 51 includes as historical information a link 52a to the data A, a link 52b to the data B, a link 52c to the data C and a link 52d to the data D. The data area 53 displays contents of the data D. Where the host 12 has no historical information of its own, the historical information area 52 indicates historical information of the host 11 connected to the data routing apparatus 20 via the same LAN 10 so that data may be called from any of the links displayed in the area 52.

As described, with historical information stored in the data routing apparatus, history-supplemented data may be acquired therefrom by different client software programs. Where both historical information and previously routed data are retained along with links to data indicated by the historical information, client software may again access previously accessed data easily, quickly and safely. It is not necessary for such repeated access to be initiated by the same client software.

Where the data routing apparatus of above constitution is utilized, historical information is added to data so that the history-supplemented data will be output to the client software. It follows that there is no need to modify contents of the client software.

In the description above, the historical information holding unit 21 was shown supplementing all requested data with historical information. However, this is not a limitation of the invention. Alternatively, historical information counters may be furnished so that, if the same data already exists, the applicable historical information may be counted up instead of having the current information supplemented with additional information.

In the above description, the data routing apparatus 20 was shown comprising the data preparation unit 23 for outputting history-supplemented data to client software. Alternatively, requested data and historical information may be sent separately to the host in question.

Furthermore, the first embodiment described above was shown having only URLs of data treated as historical information, with the historical information area solely indicating links to data. Alternatively, the historical information holding unit 21 may also retain as historical information the name of a user who issued a data request, a host name, a time at which the data request was issued and other items which may be included in the historical information area. In such cases, it is possible for the historical information from the same user alone to be added to the requested data while historical information of any other user is suppressed.

The second embodiment of the invention will now be described.

Figure 8:
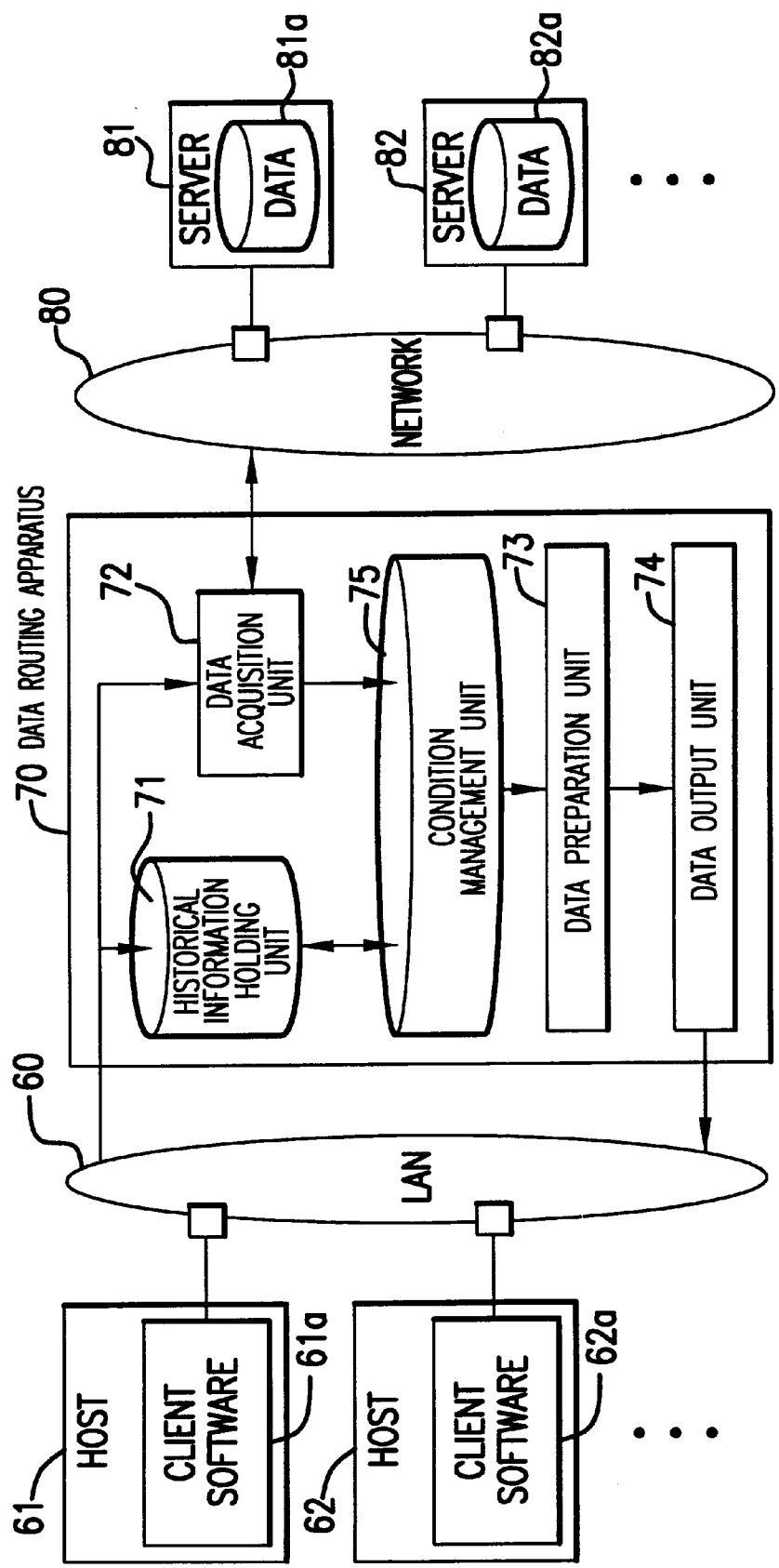
FIG. 8 is a block diagram of a second embodiment of the invention.

FIG. 8 is a block diagram of the second embodiment.

A data routing apparatus 70 in the second embodiment routes data between data terminal equipment 61, 62, etc., (i.e., hosts) connected to a LAN 60 on the one hand, and servers 81, 82, etc., connected to a network 80 on the other hand.

Client software programs 61a and 62a are run in hosts 61 and 62, respectively, located on the LAN 60. The client software requests data from the data routing apparatus 70 via the LAN 60. The servers 81 and 82 on the network 80 retain data 81a and 82a, respectively. The data routing apparatus 70 acquires such data from servers by way of the network 80.

The data routing apparatus 70 comprises a historical information holding unit 71 that holds historical information about past data requests; a data acquisition unit 72 that acquires data in response to a data request entered from a host via the LAN; a condition management unit 75 that determines whether or not to supplement acquired data with historical information; a data preparation unit 73 that supplements acquired data with historical information so as to prepare history-supplemented data; a data output unit 74 that outputs the history-supplemented data to the host over the LAN 60.

Data requests from the client software programs 61a and 62a each include a URL designating requested data.

The historical information holding unit 71 holds as historical information the URLs of data included in past data requests entered from the client software programs 61a and 62a in the hosts 61 and 62 connected to the LAN 60.

Upon receipt of a new data request over the LAN 60, the historical information holding unit 71 supplements its historical information with the URL of data included in the new data request. The historical information held by the historical information holding unit 71 is supplied to the condition management unit 75 as requested.

The data acquisition unit 72 requests data over the network 80 in accordance with the input data request.

The data thus acquired is input to the condition management unit 75 that holds history-unnecessary conditions. Given data from the data acquisition unit 72, the condition management unit 75 checks to see if the data matches any of the history-unnecessary conditions. If there is a match, the data alone is input to the data preparation unit 73. If there is a mismatch between the data and the history-unnecessary conditions, the condition management unit 75 requests historical information from the historical information holding unit 71 and supplies the data preparation unit 73 with the data combined with the applicable historical information.

Given the data alone from the condition management unit 75, the data preparation unit 73 outputs the data free of any additional information to the data output unit 74. If the data and historical information are received in combination from the condition management unit 75, the data preparation unit 73 supplements the data with the historical information and a link to the data indicated by that historical information, thereby preparing history-supplemented data. The history-supplemented data thus prepared is sent to the data output unit 74.

The data output unit 74 sends either the data or the history-supplemented data from the data preparation unit 73 to that client software in the host which issued the data request over the LAN 60.

Below is a description of how the data routing apparatus 70 outputs data in response to data requests from client software.

Figure 9:
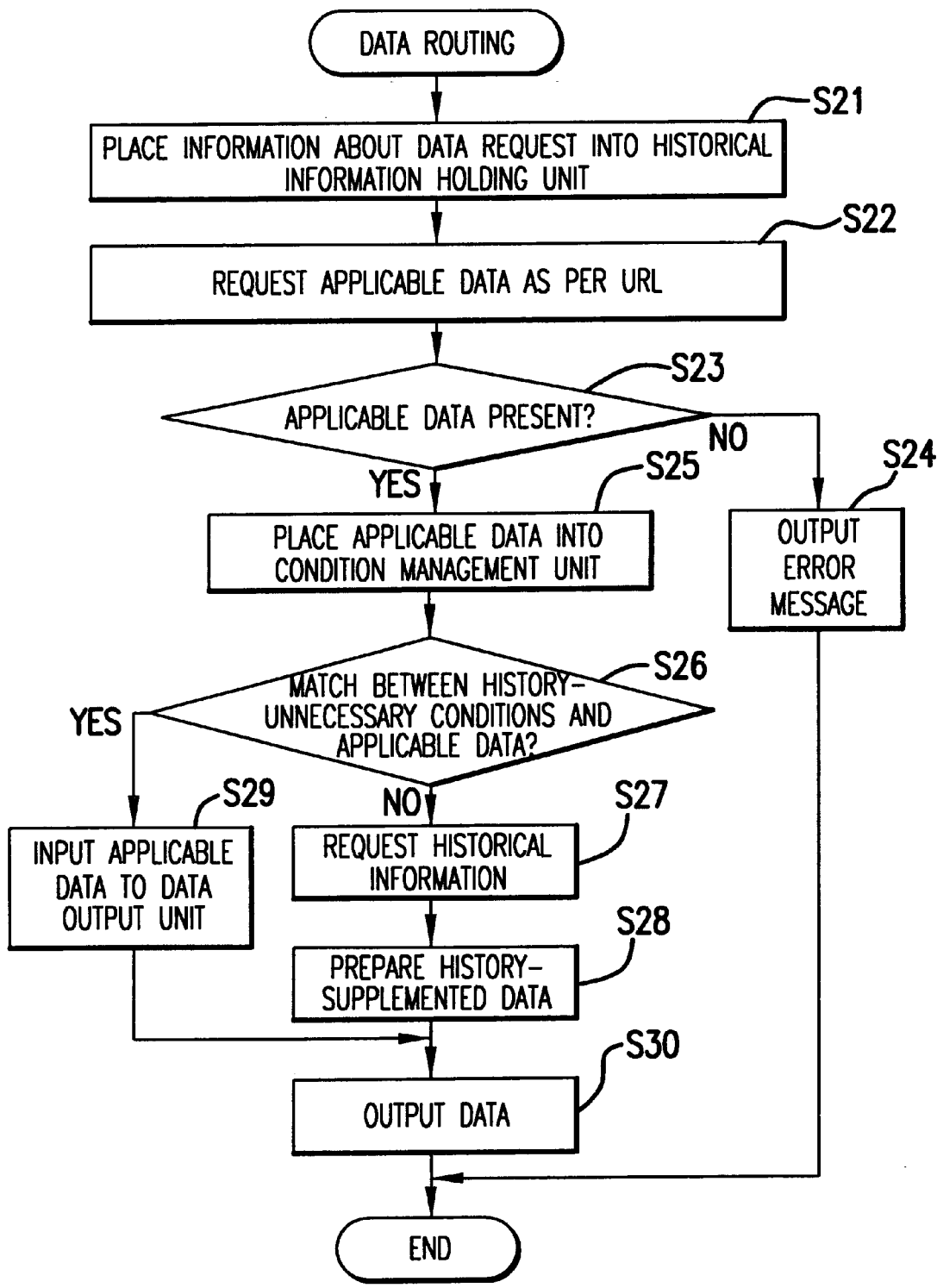
FIG. 9 is a flowchart of steps in which a data routing apparatus in the second embodiment works to route data.

FIG. 9 is a flowchart of steps in which the data routing apparatus 70 works to route data.

In step S21 of FIG. 9, given a data request, the historical information holding unit 71 supplements the historical information held therein with additional information about the data request.

In step S22, the data acquisition unit 72 requests data on the basis of the URL of the data included in the input data request. The request is made via the network 80 to the applicable server which is requested to serve the data to the data routing apparatus 70.

In step S23, a check is made to see if the applicable data exists. If the data is found to exist, step S25 is reached. If the data does not exist, i.e., if the designated server does not exist or does not have the data having the specified data name, then step S24 is reached.

In step S24, in the absence of the applicable data, an error message is output regarding the input data request requesting nonexistent data. The output of the error message terminates the flow of processing in FIG. 9.

In step S25, with the data in question found to exist, the data is sent over the network 80 to the data acquisition unit 72. The data is forwarded to the condition management unit 75.

In step S26, given the data, the condition management unit 75 checks the data against the history-unnecessary conditions it retains. If there is a match between the data and any of the history-unnecessary conditions, then step 29 is reached. If there is a mismatch, step S27 is reached.

In step S27, in the event of a mismatch between the input data and the history-unnecessary conditions, history-supplemented data needs to be prepared. The condition management unit 75 requests historical information from the historical information holding unit 71, and supplies the data preparation unit 73 with the data and the retrieved historical information in combination.

In step S28, the data preparation unit 73 prepares history-supplemented data based on the combination of the input data and historical information. The history-supplemented data thus prepared is sent to the data output unit 74.

In step S29, in the case of a match between the data and any of the history-unnecessary conditions, history-supplemented data will not be prepared. The condition management unit 75 sends the data in question free of additional information to the data preparation unit 73. The data preparation unit 73 forwards the received data unchanged to the data output unit 74.

In step S30, the data output unit 74 sends the history-supplemented data or the data alone to the client software of the host which issued the data request to the data routing apparatus 70 over the LAN 60.

The data routing apparatus in the second embodiment is further described below in connection with some typical history-unnecessary conditions.

FIG. 10 is a table listing exemplary history-unnecessary conditions.

History-unnecessary conditions 75a are held in the condition management unit 75 shown in FIG. 8. If at least one of these conditions is found to match data, the data is considered to have no need for historical information.

The history-unnecessary conditions deny adding historical information to data to be routed to a given user when at least one of the conditions is met by the data. Illustratively, the conditions 75a for user A in FIG. 10 are deemed to match data if any one of the listed conditions is met: if the data type is image data; if the data contents comprise a character string "history"; and/or if the URL turns out to be "http://www.xxx.co.jp."

The history-unnecessary conditions 75a for user B are considered to match data if any one of the listed conditions is met: if the data type is HTML; if the URL is "http://www.yyy.co.jp/index.html"; and/or if the URL is "http://www.zzz.com."

The condition management unit 75 checks the data acquired as per the data request against the history-unnecessary conditions 75a. If at least one of these conditions is found to match the data, the condition management unit 75 does not supplement the data with historical information.

In the above description about history-unnecessary conditions, the conditions were shown pertaining to the data type, data contents and URL. However, this is not the limit of the invention. Other conditions for denying the addition of historical information to data may be established as well. As another alternative, the designation of users may be omitted from the decision as to whether or not to supplement data with historical information.

Furthermore, with the second embodiment described above, the decision about the need for supplementing data with historical information is made after the data in question has been acquired. Alternatively, if a history-unnecessary condition is a URL and/or a user name, the decision may be made before the applicable data is obtained.

The data routing apparatuses embodying the invention as described above are of the type that allows any client software to make use of historical information. What follows is a description of those types of data routing apparatus, server and data terminal equipment which will permit contents of previously accessed data to be subsequently utilized again.

Figure 11:
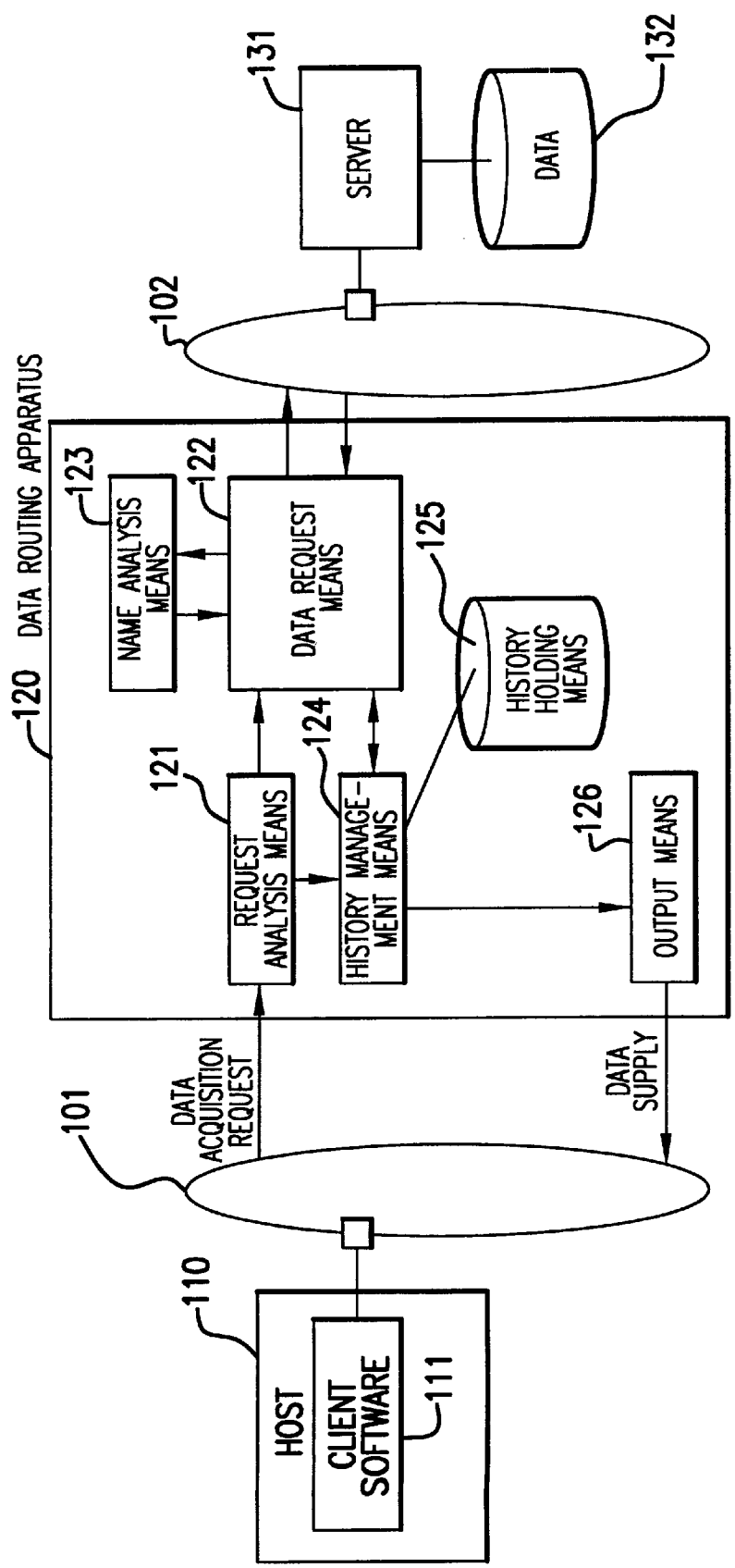
FIG. 11 is a block diagram of a third embodiment of the invention.

FIG. 11 is a block diagram of the third embodiment of the invention. The third embodiment allows client software connected to a network to acquire data via data routing means from a network-connected server by having a data name designated. Furthermore, the third embodiment permits client software to obtain past data through designation of a past time and a data name.

A host 110 in FIG. 11 is connected to a data routing apparatus 120 via a network 101. The data routing apparatus 120 is connected via a network 102 to a server 131 that holds data 132.

In the host 110, client software 111 is executed to reference data by way of the network 101. A user at the host 110 enters a data name or other relevant item into the client software 111 which in turn issues a data acquisition request. The data acquisition request output by the client software 111 to the data routing apparatus 120 is one of two types: a data routing request for referencing data in the server 131, or a historical information acquisition request for again referencing previously referenced data. If the data acquisition request is a data routing request, the request includes a name of data to be referenced (e.g., a server name, a location name, a file name, etc.). If the data acquisition request is a historical information acquisition request, the request includes both the name of the data to be referenced and time information indicating the time at which the data was referenced in the past. The client software 111 has a function for receiving data from the data routing apparatus 120 and for displaying the received data on a display screen.

The data routing apparatus 120 comprises the components described below.

Request analysis means 121 determines whether the data acquisition request from the host 110 is a data routing request or a historical information acquisition request. If the data acquisition request is found to be a data routing request, the request analysis means 121 extracts the data name from the data acquisition request. If the data acquisition request turns out to be a historical information acquisition request, the request analysis means 121 extracts the data name and time information from the request.

With the data acquisition request found to be a data routing request, data request means 122 receives the data name extracted by the request analysis means 121. With the data name received, the data request means 122 enters the data name into name analysis means 123. When the name analysis means 123 returns a server identifier, the data request means 122 requests from the server designated by the identifier the data 132 corresponding to the data name extracted by the request analysis means 121, and receives the served data from the server 131.

The name analysis means 123 analyzes the data name sent from the data request means 122, and returns the identifier of the server from which to request the data corresponding to the data name.

If the data acquisition request is a data routing request, history management means 124 places into history holding means 125 historical information associating the data received by the data request means 122 with the data name, data contents, and time information indicating the time at which data routing took place. The history management means 124 then prepares the data received by the data request means 122 as output data. Where the data acquisition request is a historical information acquisition request, the history management means 124 prepares as output data the historical information which is retained in the history holding means 125 and which coincides with the data name and time information designated by the data acquisition request.

The history holding means 125 holds historical information which associates the name of the data routed by the data routing apparatus 120 with data contents and the time at which data routing took place.

Output means 126 forwards the contents of the output data prepared by the history management means 124 to the client software 111.

The server 131 keeps and manages, in tabular form, the contents of the data and other information.

FIG. 12 is a view of a typical data table held by a server. The data table 131a comprises data names, data contents and last update times which are retained and managed in association with one another.

With a system of the above constitution, a user at the host 110 is illustratively assumed to reference the data 132 in the server 131. In that case, the user transmits a data acquisition request designating the data name using the client software 111. For the following discussion suppose that data named "NAME1" is requested.

In the data routing apparatus 120, the request analysis means 121 receives the request from the client software 111. The request analysis means 121 analyzes the request and recognizes that the request is a data routing request. In this example, the data acquisition request is found to be a data routing request because it does not include time information. The request analysis means 121 extracts the data name "NAME1" and inputs the data to the data request means 122.

Upon receipt of the data name "NAME1" from the request analysis means 121, the data request means 122 forwards the name to the name analysis means 123. The name analysis means 123 analyzes the data name "NAME1" sent from the data request means 122, and returns an identifier of the server from which to request the data having the data name "NAME1." The data request means 122 transmits the data name "NAME1" to the server whose identifier has been returned from the name analysis means 123, in order to request the data corresponding to the data name "NAME1."

On receiving the data name "NAME1" from the data request means 122, the server 131 returns the corresponding data "DATA1" together with a last update time "LAST1" at which the data "DATA1" was last updated provided the server 131 holds the data in question. If the server 131 does not have the data having the data name "NAME1," then the server 131 returns a "not found" notice.

The data request means 122 forwards to the history management means 124 the data "DATA1" and the last update time "LAST1" returned from the server along with the data name "NAME1." Given the data name "NAME1," data "DATA1" and last update time "LAST1" from the data request means 122, the history management means 124 sends the name "NAME1," data "DATA1," last update time "LAST1" and a current time "T11" (i.e., the time at which historical information is being stored) to the history holding means 125 for storage and management thereby. If the "not found" notice is returned from the data request means 122, nothing is placed into the history holding means 125.

Figure 13:
FIG. 13 is a view of a typical table held by history holding means of the invention.

FIG. 13 is a view of a typical table 125a held by the history holding means 125. The table 125a comprises data names, data contents, last update times, and times (current) which are retained and managed in association with one another.

The history management means 124 forwards the data "DATA1" received from the data request means 122 as output data to the output means 126. The output means 126 transmits to the client software 111 the data "DATA1" sent from the history management means 124. On receiving the transmitted data "DATA1," the client software 111 displays the data contents on the display screen. Thus the user operating the client software 111 is able to reference desired data.

Although the history management means 124 was shown above always placing the data from the server 131 into the history holding means 125, this is not a limitation of the invention. All served data need not be stored in the history holding means 125. For example, when the data request means 122 has sent in the data name "NAME1," data "DATA1" and last update time "LAST1," the history holding means 125 may search the names it holds for the data name in question. If the history holding means 125 already contains data named "NAME1", then the history management means 124 may compare the data currently associated with "NAME1" with the data "DATA1" received from the data request means 122. If the data do not match, only then the history holding means 125 may add the name "NAME1," data "DATA1," last update time "LAST1" and current time "T11."

As another alternative, when the data request means 122 has sent in the data name "NAME1," data "DATA1" and last update time "LAST1," the history holding means 125 search the names it holds for the data name in question. If the history holding means 125 retains the same data name "NAME1" received from the data request means 122, then the history management means 124 may compare the last update time currently associated with the data name "NAME1" with the last update time "LAST1" received from the data request means 122. If the last update time "LAST1" of the incoming data is more recent, then the history holding means 125 may add the name "NAME1," data "DATA1," last update time "LAST1" and current time "T11."

In the description above, the history holding means 125 was shown holding current times, each representing the time at which historical information was written to the history holding means 125. Alternatively, other time information may be stored instead, as long as each time setting represents a specific time during data routing. For example, the request analysis means 121 sends to the data request means 122 a time "T01" at which the request analysis means 121 received a request from the client software 111 along with the data name "NAME1." The data request means 122 writes to the history management means 124 the time "T01" from the request analysis means 121 together with the data name "NAME1," data "DATA1" and last update time "LAST1." The history management means 124 keeps and manages the information in the history holding means 125. In this setup, the time "T01," at which the request analysis means 121 received the request from the client software 111, is used as time information for designating relevant historical information.

A further alternative may be as follows: the output means 126 may input to the history management means 124 a time "T02" at which the output means 126 transmitted the data "DATA1" to the client software 111. The history management means 124 may then retain, in association with the data name "NAME1," the time "T02" at which the data "DATA1" was transmitted along with other information pertaining to the name "NAME1."

The data request means 122 may input to the history management means 124 a time "T03" at which the data request means 122 transmitted the data name "NAME1" to the server 131. The history management means 124 may then retain and manage, in association with the data name "NAME1," the time "T03" at which the data name "NAME1" was transmitted along with other information pertaining to the name "NAME1."

The data request means 122 may input to the history management means 124 a time "T04" at which the data request means 122 received the data name "DATA1" from the server 131. The history management means 124 may then retain and manage, in association with the data name "NAME1," the time "T04" at which the data "DATA1" was received along with other information pertaining to the name "NAME1."

A user name may be included in a data acquisition request output by the client software 111. In that case, the request analysis means 121 extracts the user name from the data acquisition request and writes the user name along with the data name "NAME1" to the data request means 122. In turn, the data request means 122 inputs to the history management means 124 the user name from the request analysis means 121 together with the name "NAME1," data "DATA1" and last update time "LAST1." The history management means 124 retains and manages all of this information, plus the current time in the history holding means 125.

A host name may be included in a data acquisition request output by the client software 111. In such a case, the request analysis means 121 writes the host name taken from the data acquisition request to the data request means 122 along with the data name "NAME1." In turn, the data request means 122 inputs to the history management means 124 the host name from the request analysis means 121 together with the data name "NAME1," data "DATA1" and last update time "LAST1." The history management means 124 retains and manages in the history holding means 125 the above information and the current time.

Likewise, diverse kinds of context information other than the user name and host name may be included in the data acquisition request. Such context information may include a work name, a department name and a group name.

A data acquisition request output by the client software 111 may also include a provision rejecting historical information. If that provision is included in the request, the request analysis means 121 notifies the history management means 124. Given the notice of the history-rejecting provision, the history management means 124 does not retain or manage the data with the name "NAME1" or any related information received from the data request means 122. The use of the provision in the request rejecting historical information suppresses the storage of unnecessary data so that the storage area in the data routing apparatus 120 may be utilized more effectively.

The description so far has centered on how the data routing apparatus 120 routes data and how the routed data and time information related thereto are processed and stored.

What follows is a description of how the client software 111 may again access previously browsed data through designation of a past time and a data name.

To acquire data associated with a time "T11" corresponding to the name "NAME1," the client software 111 transmits to the data routing apparatus 120 a data acquisition request including the name "NAME1" and time "T11." The time "T11," entered by a user into the client software 111, need not be strictly accurate. The user need only remember a fairly accurate time at which the named data was referenced in the past.

In the data routing apparatus 120, the request analysis means 121 receives the data acquisition request sent from the client software 111. The request analysis means 121 analyzes the request and extracts the name "NAME1" and time "T11." Since the request contains the time "T11," the request analysis means 121 recognizes that historical information is sought. The request analysis means 121 then inputs the name "NAME1" and time "T11" to the history management means 124.

Upon receipt of the name "NAME1" and time "T11" from the request analysis means 121, the history management means 124 checks to see if the history holding means 125 contains data corresponding to the name "NAME1" paired with the time "T11." If so, the history management means 124 sends the data "DATA1" to the output means 126. If the data is not found, the history management means 124 sends a "not found" notice to the output means 126. A certain degree of error is tolerated when matching the time "T11".

The output means 126 transmits the data from the history management means 124 to the client software 111. The client software 111 displays the received data on the display screen. Thus, the user is able to obtain data previously referenced at the time "T11," even if the contents of the data with the name "NAME1" in the server 131 have since been updated.

In another example where the name "NAME1" and time "T11" are received from the analysis request means 121, the history holding means 125 may not have data corresponding to both the name "NAME1" and the time "T11." In that case, the history management means 124 may supply the output means 126 with data whose name alone matches the name "NAME1" and whose time is closest to the time "T11" paired with the name "NAME1" in the history holding means 125. Such a feature will allow users to reference desired data by designating a time based on their vague memory.

In a further example where the name "NAME1" and time "T11" are received from the analysis request means 121, the history holding means 125 may not have data corresponding to both the name "NAME1" and the time "T11." In such a case, the history management means 124 may supply the output means 126 with data whose name alone matches the name "NAME1" and whose time is closest to and earlier than the time "T11" paired with the name "NAME1" in the history holding means 125. If earlier data does not exist, a "not found" notice may be returned.

In another example where the name "NAME1" and time "T11" are received from the analysis request means 121, the history holding means 125 may not have data corresponding to both the name "NAME1" and the time "T11." In such a case, the history management means 124 may supply the output means 126 with data whose name alone matches the name "NAME1" and whose time is closest to and more recent than the time "T11" paired with the name "NAME1" in the history holding means 125. If more recent data does not exist, a "not found" notice may be returned.

In a yet another example where the name "NAME1" and time "T11" are received from the analysis request means 121, the history holding means 125 may not have data corresponding to both the name "NAME1" and the time "T11." In that case, the history management means 124 may order the data request means 122 to acquire the data with the name "NAME1" from the server 131. Given the name "NAME1" from the history management means 124, the data request means 122 performs the same process as when the name "NAME1" is received from the request analysis means 121.

Although the third embodiment described above was shown having the client software 111, data routing apparatus 120 and server 131 located in a distributed manner over a network, this is not a limitation of the invention. Alternatively, any of these components may exist in combination on the same computer.

If the components of the data routing apparatus 120 are included in the server 131, the data acquisition request from a host is one of two kinds: a latest data acquisition request, or a historical information acquisition request. In this setup, the data request means 122 is replaced by data retrieval means. Where the data acquisition request turns out to be a latest data acquisition request, the data retrieval means retrieves from the data holding means (holding data to be served to other equipment) the data corresponding to the data name extracted by the request analysis means.

If the components of the data routing apparatus 120 are held by the client software 111, the request analysis means 121 analyzes the data acquisition request entered by the user operating an input device (e.g., a keyboard). In this setup, the output means 126 is replaced by display means. The display means displays on a display screen the contents of output data prepared by the history management means.

Instead of managing the name of the requested data, the data contents, the last update time and the current time in association with one another, the data routing apparatus 120 may retain a set of the requested data name, data contents and last update time in conjunction with an identifier for identifying that set. In this case, the client software 111 acquires an identifier from the data routing apparatus 120 and transmits the data name and the identifier to the apparatus 120 in order to obtain the previously browsed data therefrom.

Alternatively, the client software 111 may keep and manage time information. In this case, the client software 111 comprises time holding means, access time management means, and time information display means. The time holding means retains time information. Upon output of a data acquisition request, the access time management means places into the time holding means the name of the requested data as well as the time at which the request was output. On receiving an access time search request, the access time management means outputs the time information held by the time holding means. The time information display means displays this time information. This setup eliminates the need for the user to remember the time at which data was acquired.

The fourth embodiment of the invention will now be described. The fourth embodiment allows client software to acquire past environment information (i.e., related historical information other than data) from a data routing apparatus and to utilize the environment information in requesting data previously browsed by a user from the data routing apparatus, allowing access to the data again. The environment information comprises a user name, a URL, a work name and a time. The time represents a time of day at which the client software issued a data request to the data routing apparatus.

Figure 14:
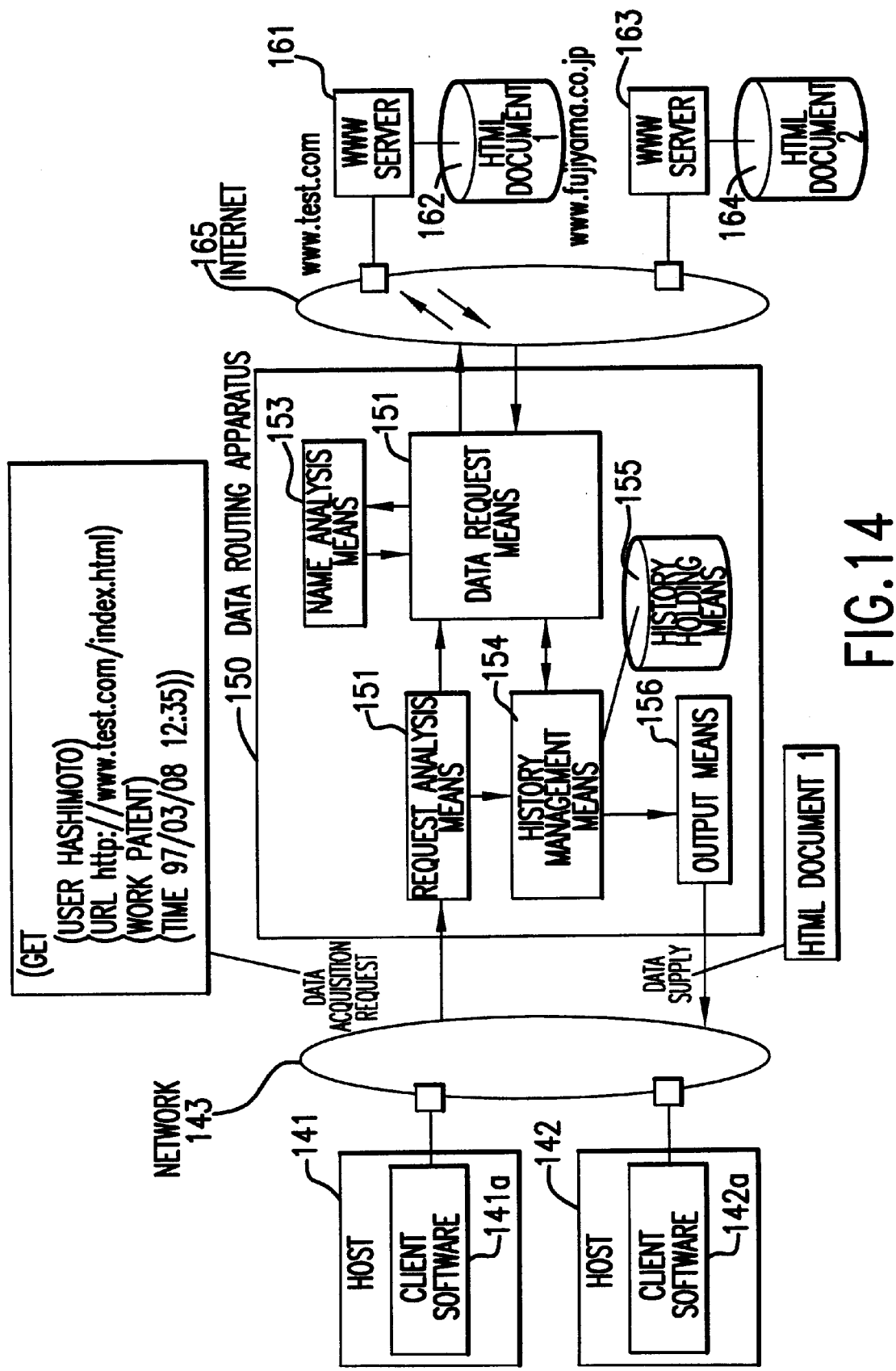
FIG. 14 is a block diagram of a fourth embodiment of the invention.

FIG. 14 is a block diagram of the fourth embodiment of the invention. What is shown in FIG. 14 is an example in which client software (a WWW browser) gains access via a data routing apparatus to HTML documents in WWW servers located on the Internet.

In FIG. 14, a number of hosts, including 141 and 142, are connected to data routing apparatus 150 via network 143. The data routing apparatus 150 is connected via the Internet to a number of WWW servers, including 161 and 163. The WWW servers 161 and 163 retain HTML documents 162 and 164 respectively.

In the hosts 141 and 142, client software programs 141a and 142a (WWW browsers) are run respectively. The client software programs 141a and 142a send data requests to and receive responses from the data routing apparatus 150. The received data is displayed on a display screen by the client software programs 141a and 142a. Other activities performed by the client software programs 141a and 142a include: sending environment information to the data routing apparatus 150 upon requesting data; querying the data routing apparatus 150 about environment information; and requesting data from the data routing apparatus 150 by describing the environment.

The data routing apparatus 150 comprises request analysis means 151, data request means 152, name analysis means 153, history management means 154, history holding means 155 and output means 156. These components are basically the same in function as their counterparts with identical names in the data routing apparatus 120 of FIG. 11. Some additional functions are provided as described below in order to receive environment information from the client software programs 141a and 142a as well as to respond to their queries about environment information.

Upon receipt of a data acquisition request from the client software 141a or 142a, the request analysis means 151 extracts environment information such as time information (representing the time at which the client issued the request) from the request, and sends the extracted environment information to the history management means 154. If the data acquisition request turns out to be a data routing request, the history management means 154 places into the history holding means 155 the environment information sent from the request analysis means 151 along with data contents and other information from the data request means 152. Where the data acquisition request is found to be a historical information acquisition request, the history management means 154 extracts from the history holding means 155 the data coinciding with the environment information sent in the request analysis means 151. The extracted data is forwarded to the output means 156. The output means 156 transmits the environment information to the client software 141a or 142a.

On receiving a URL, the WWW servers 161 and 163 each check to see if there exists data matching the URL. If so, the data is transmitted from the server to the client that issued the request.

For a system of the above constitution, suppose that a user at the host 141 using the client software 141a wants to reference a document with a file name "index.html" held by the WWW server 161 whose address is "www.test.com."

The user first logs into the client software 141a. The client software 141a has previously stored names of users who are authorized to use the software. Only a user having one of the stored user names is allowed to log into the client software. It is assumed here that the user has logged in with a user name "hashimoto." After a successful log-in, a browsing screen is displayed as a window within the display screen. The user enters necessary items into the browsing screen to view the desired HTML document. The items to be entered are a work name and a URL.

Figure 15:
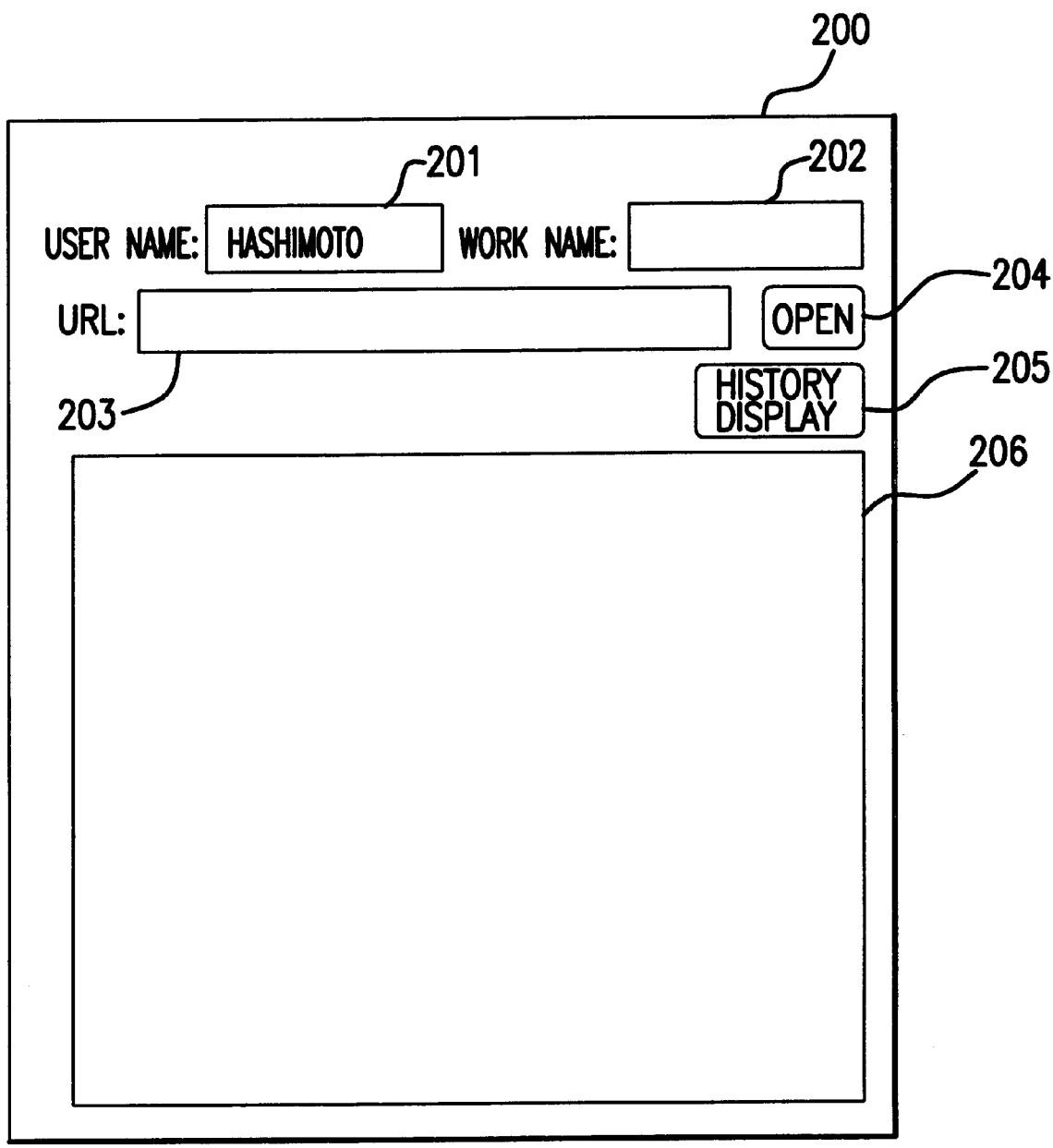
FIG. 15 is a view of a browsing screen.

FIG. 15 is a view of a typical browsing screen. In the top left corner of the browsing screen 200 is a user name display area 201 that shows the name of the user who logged in, i.e., "hashimoto" in this example. To the right of the user name display area 201 is a text box 202 for work name entry. The user inputs the name of the work task in progress into the text box 202. Under the user name display area 201 is a text box 203 for URL entry. The URL of the document to be referenced is input to the text box 203. To the right of the URL entry text box 203 are an "Open" button 204 and a "History Display" button 205. Clicking on the "Open" button 204 causes the client software 141a to output to the data routing apparatus a data acquisition request including the time at which the button 204 is operated. The "History Display" button 205 is used to request historical information from the data routing apparatus 150. Clicking on the button 205 causes a history display screen to appear.

On the browsing screen 200, the user illustratively inputs "patent" into the work name entry text box 202, and "http://www.test.com/index.html" into the URL entry text box 203.

When the work name and URL thus entered are judged to be correct, the user clicks on the "Open" button 204. At this point, the time is assumed to be "12:35, 03/08/97." The client software 141a then transmits to the data routing apparatus 150 a data acquisition request including the URL "http://www.test.com/index.html," user name "hashimoto," work name "patent," and current time "12:35, 03/08/97." The transmitted data may illustratively be structured as follows:

```
(GET
    (USER hashimoto)
    (URL http://www.test.com/index.html)
    (WORK patent)
    (TIME 12:35 03/08/97)
)
```

Alternatively, the request may be transmitted to the data routing apparatus 150 in a format encompassing all relevant information, such as:

"http://proxy.xxx.co.jp/cgi-bin/GET?USER=hashimoto&URL=http://www.test.com/index.html&WORK=patent&TIME=12:35_03/08/97"

With the above format, any existing browser may be used as client software for this embodiment.

As another alternative, an HTTP (Hypertext Transfer Protocol) expansion may be used to transmit data corresponding to USER, WORK or TIME to the data routing apparatus 150.

The request analysis means 151 in the data routing apparatus 150 receives from the client software 141a the following data:

```
(GET
    (USER hashimoto)
    (URL http://www.test.com/index.html)
    (WORK patent)
    (TIME 12:35 03/08/97)
)
```

Given the data, the request analysis means 151 analyzes it to find that:

(1) the data is a GET request, i.e., a data routing request;
(2) the user who issued the request is "hashimoto";
(3) the requested URL is "http://www.test.com/index.html";
(4) the work name in effect when the request was issued is "patent"; and
(5) the time of day at which the request was issued is "12:35, 03/08/97."

The request analysis means 151 inputs to the data request means 152 the request sent from the client software 141a.

In turn, the data request means 152 transmits the URL "http://www.test.com/index.html" to the name analysis means 153. The name analysis means 153 analyzes the received URL and returns the server name "www.test.com." The data request means 152 requests data having the URL "http://www.test.com/index.html" from the WWW server 161 having the server name "www.test.com."

The WWW server 161 checks to see if there exists data corresponding to the URL "http://www.test.com/index.html." Since the document exists, the WWW server 161 returns the data "HTML document 1" to the data request means 152.

The data request means 152 sends the URL "http://www.test.com/index.html" to the history management means 154 along with the corresponding data "HTML document 1," the time "12:35, 03/08/97" and the work name "patent."

Given the items of information from the data request means 152, the history management means 154 stores them in the history holding means 155. The data "HTML document 1" is input to the output means 156.

Given the data "HTML document 1" from the history management means 154, the output means 156 forwards the data to the client software 141a.

In turn, the client software 141a displays contents of the data "HTML document 1" from the data routing apparatus 150 in window 206 of the browsing screen.

Figure 16:
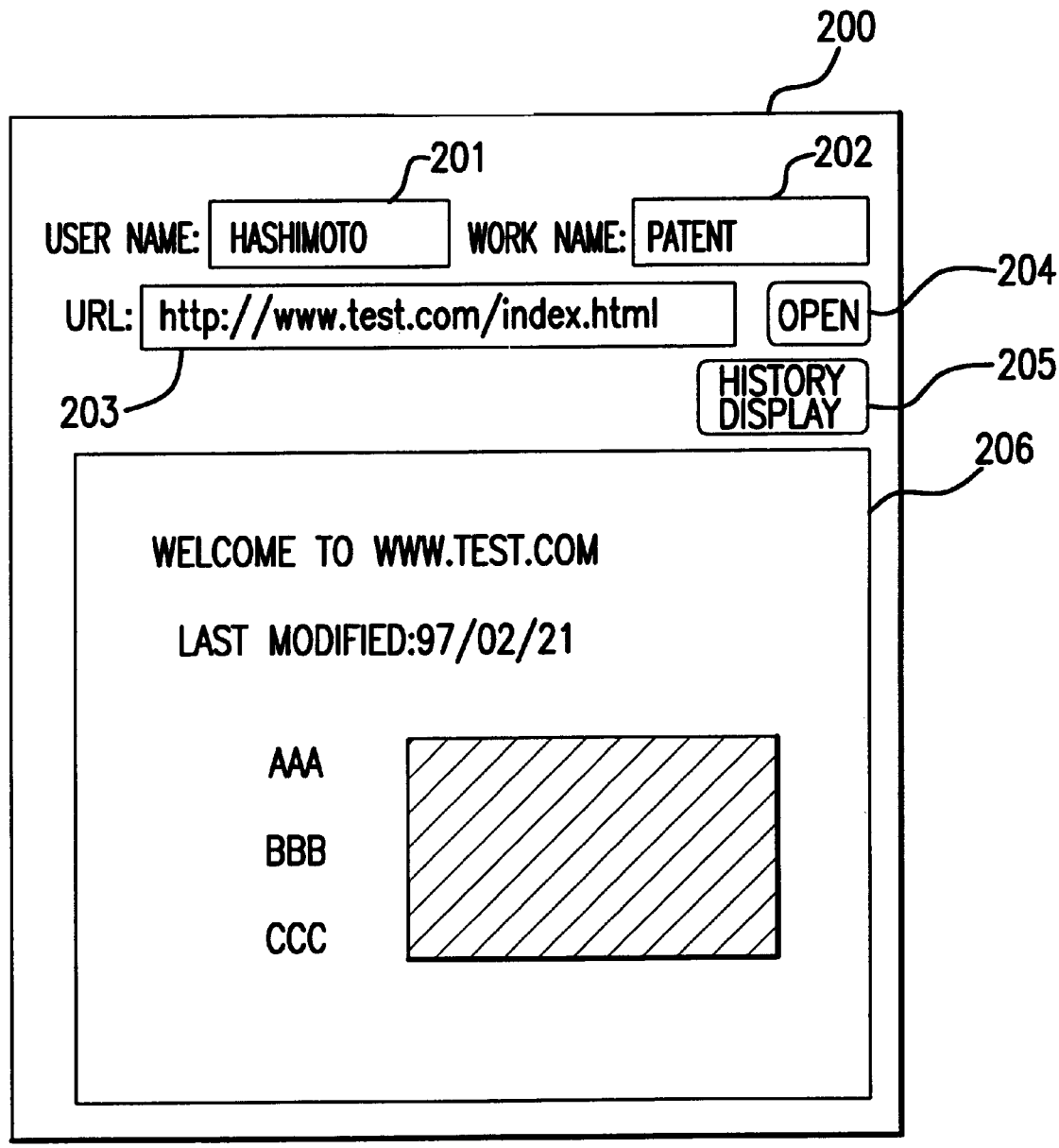
FIG. 16 is a view of a browsing screen showing the content of "HTML document 1"

FIG. 16 is a view of the browsing screen 200 showing the content of "HTML document 1." The differences between FIG. 16 and FIG. 15 are: the work name entry text box 202 shows "patent," the URL entry text box 203 indicates "http://www.test.com/index.html" and the window 206 displays the contents of the data "HTML document 1."

Suppose that, as in the earlier example, the user named "hashimoto" requested data associated with the work name "patent" and a URL "http://www.fujiyama.co.jp/index.html" at a time "11:03, 03/11/97." In this case, the history holding means 155 receives and stores the URL "http://www.fujiyama.co.jp/index.html," the data "HTML document 2" corresponding to the URL, the time "11:03, 03/11/97," the user name "hashimoto" and the work name "patent," all in association with one another.

In another example, suppose that a user named "yamada" requested data associated with a work name "R&D" and a URL "http://www.test.com/index.html" at a time "13:15, 03/14/97." In that case, the history holding means 155 receives and stores the URL "http://www.test.com/index.html," the data "HTML document 1" corresponding to the URL, the time "13:15, 03/14/97," the user name "yamada" and the work name "R&D," all in association with one another.

Suppose that contents of the HTML document 1 were updated on a day "03/17/97" by the WWW server 161 and turned into "HTML document 3."

Then suppose that the user named "hashimoto" requested the contents of data associated with the work name "patent" and URL "http://www.test.com/index.html" at time "10:54, 03/25/97." In such a case, the history holding means 155 receives and stores the URL "http://www.test.com/index.html," the data "HTML document 3" corresponding to the URL, the time "10:54, 03/25/97," the user name "hashimoto" and the work name "patent," all in association with one another.

Because the data contents have been updated, the browsing screen of the client software 141a displays contents of the data "HTML document 3."

Figure 17:
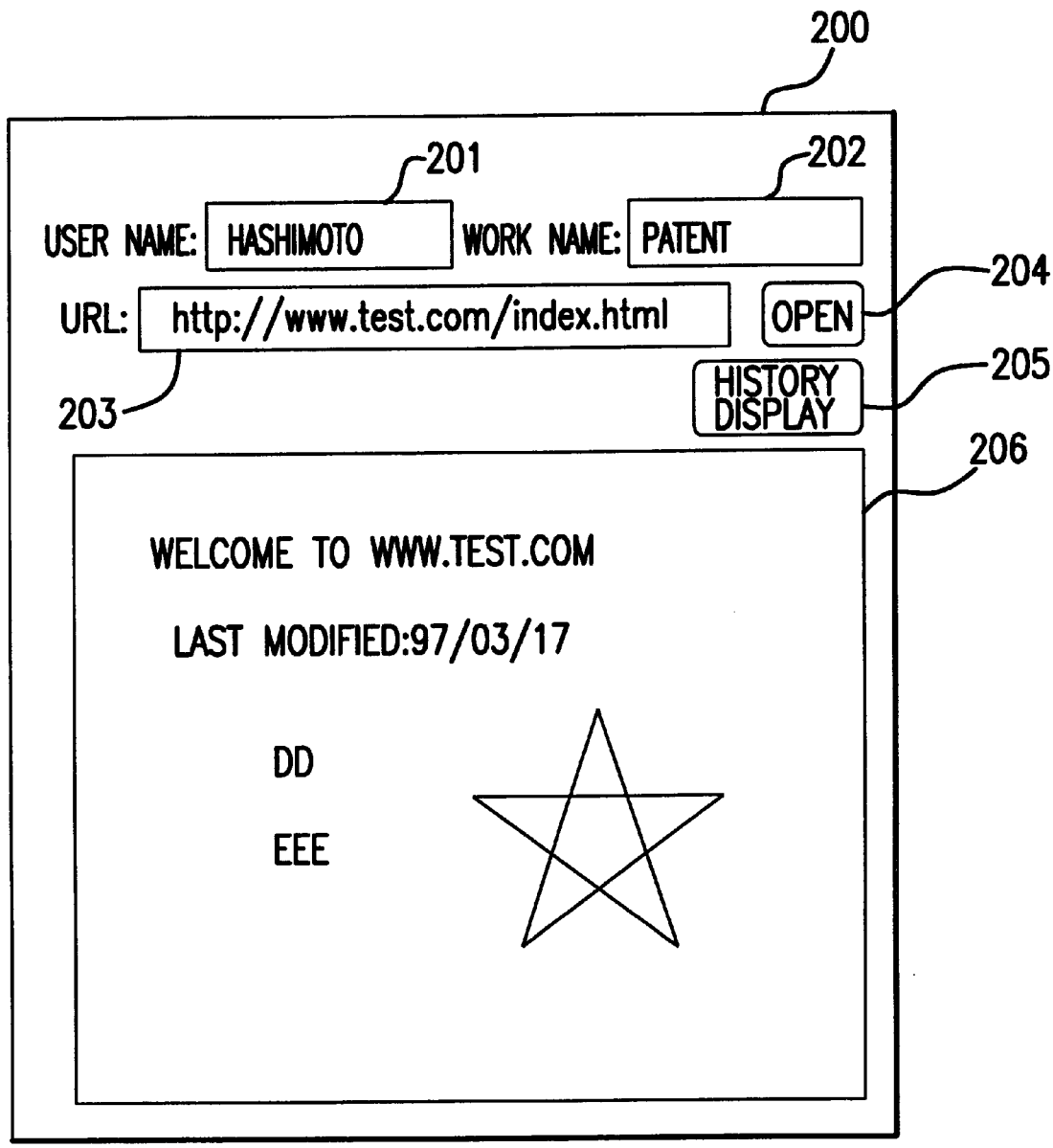
FIG. 17 is a view of a browsing screen showing the content of "HTML document 3"

FIG. 17 is a view of the browsing screen 200 showing contents of the "HTML document 3." The URL entered into the URL entry text box 203 of the browsing screen 200 is the same as that in FIG. 16. What is different is the time at which the data acquisition request was output (i.e., the time at which the button 204 was operated). Specifically, the example of FIG. 16 shows the time "12:35, 03/08/97" while the example of FIG. 17 indicates the time "10:54, 03/25/97." The WWW server 161 updated the data between these two points in time, and the window 206 now displays different contents of data.

FIG. 18 is a view of typical historical information 155a held by the history holding means 155. The historical information 155a stores names of data routed by the data routing apparatus 150 along with user names, URLs, work names and times associated with the data.

Below is a description of how to display previously browsed data.

To look up previously accessed data, a user clicks on the "History Display" button 205. This causes the client software 141a to transmit to the data routing apparatus 150 the following request:

```
(SEARCH
        (USER hashimoto)
        (WORK patent)
)
```

The request above is asking for a URL and a time corresponding to the user name "hashimoto" and work name "patent."

In the above example, the search for historical information was carried out using a user name and a work name. Alternatively, client software may request all historical information. As another alternative, a limited time range may be designated and search may be executed within that range.

Upon receipt of the above request, the request analysis means 151 analyzes it to find that:

(1) the request is SEARCH, i.e., a request to search for historical information;

(2) the user name to be searched for is "hashimoto"; and (3) the work name to be searched for is "patent."

The request analysis means 151 transmits the above data to the history management means 154. Upon receipt of the request, the history management means 154 searches the information in the history holding means 155 for data having the user name "hashimoto" and work name "patent."

The history management means 154 inputs the information thus retrieved to the output means 156. The output means 156 forwards the information to the client software 141a. At this point, the client software 141a is supplied illustratively with the following information:

```
((http://www.test.com/index.html, 12:35 03/08/97)
(http://www.fujiyama.co.jp/index.html, 17:03 03/11/97)
(http://www.test.com/index.html, 10:54 03/25/97)
)
```

The client software 141a organizes the information received from the data routing apparatus 150 for display onto the history display screen.

Figure 19:
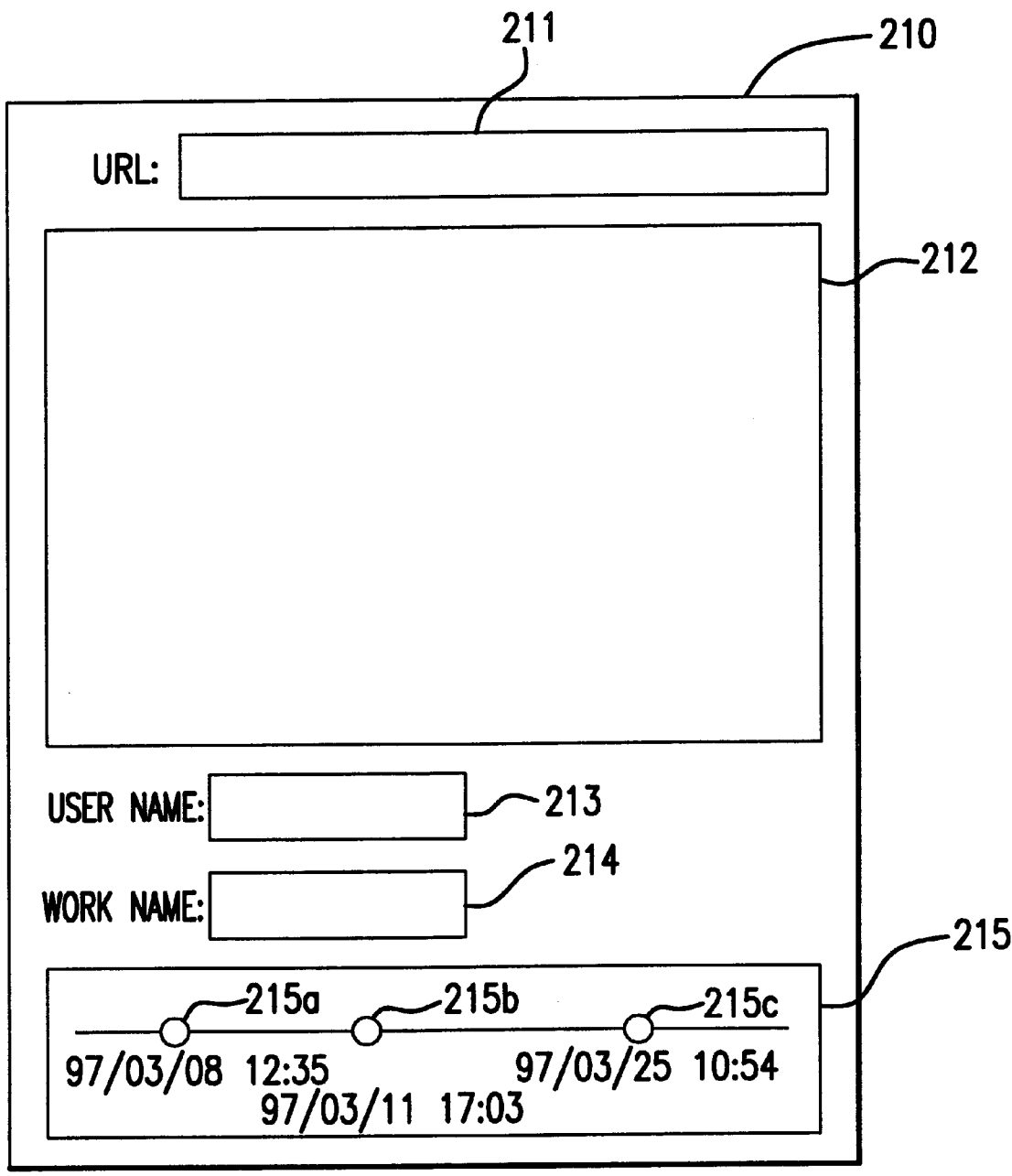
FIG. 19 is a view of a history display screen in effect after receipt of retrieved information.

FIG. 19 is a view of a history display screen 210 in effect after receipt of retrieved information. The screen 210 includes a URL display area 211. Under the area 211 is a window 212 that shows data contents. Under the window 212 are a user name display area 213 and a work name display area 214. Further below, there is a window 215 that displays data included in historical information on a time series basis. In the window 215, locations representing individual data items are identified by hollow circle icons 215a, 215b and 215c. Under each of the icons 215a, 215b and 215c is the time at which the data in question was looked up.

Suppose that the user has selected the icon 215a denoting the time "2:35, 03/08/97." The selected icon 215a turns gray. The URL display area 211 displays "http://www.test.com/index.html" corresponding to the time "12:35, 03/08/97." The user name display area 213 indicates the user name "hashimoto" corresponding to the time "12:35, 03/08/97." The work name display area 214 shows the work name "patent" corresponding to the time "12:35, 03/08/97."

Furthermore, the data acquisition request corresponding to the time "12:35, 03/08/97" is sent from the client software 141a to the data routing apparatus 150. The request is structured illustratively as follows:

```
(GET-LOG
        (USER hashimoto)
        (URL http://www.test.com/index.html)
        (WORK patent)
        (TIME 12:35 03/08/97)
)
```

Given the above data acquisition request, the request analysis means 151 analyzes it and interprets "GET-LOG" as indicative of a historical information acquisition request. The information included in the request is sent to the history management means 154. The history management means 154 retrieves from the history holding means 155 the data "HTML document 1" coinciding with the content of the data acquisition request, and sends the retrieved data to the data output means 156. The data output means 156 transmits the data "HTML document 1" to the client software 141a.

The client software 141a displays in the window 212 the data returned from the data routing apparatus 150.

Figure 20:
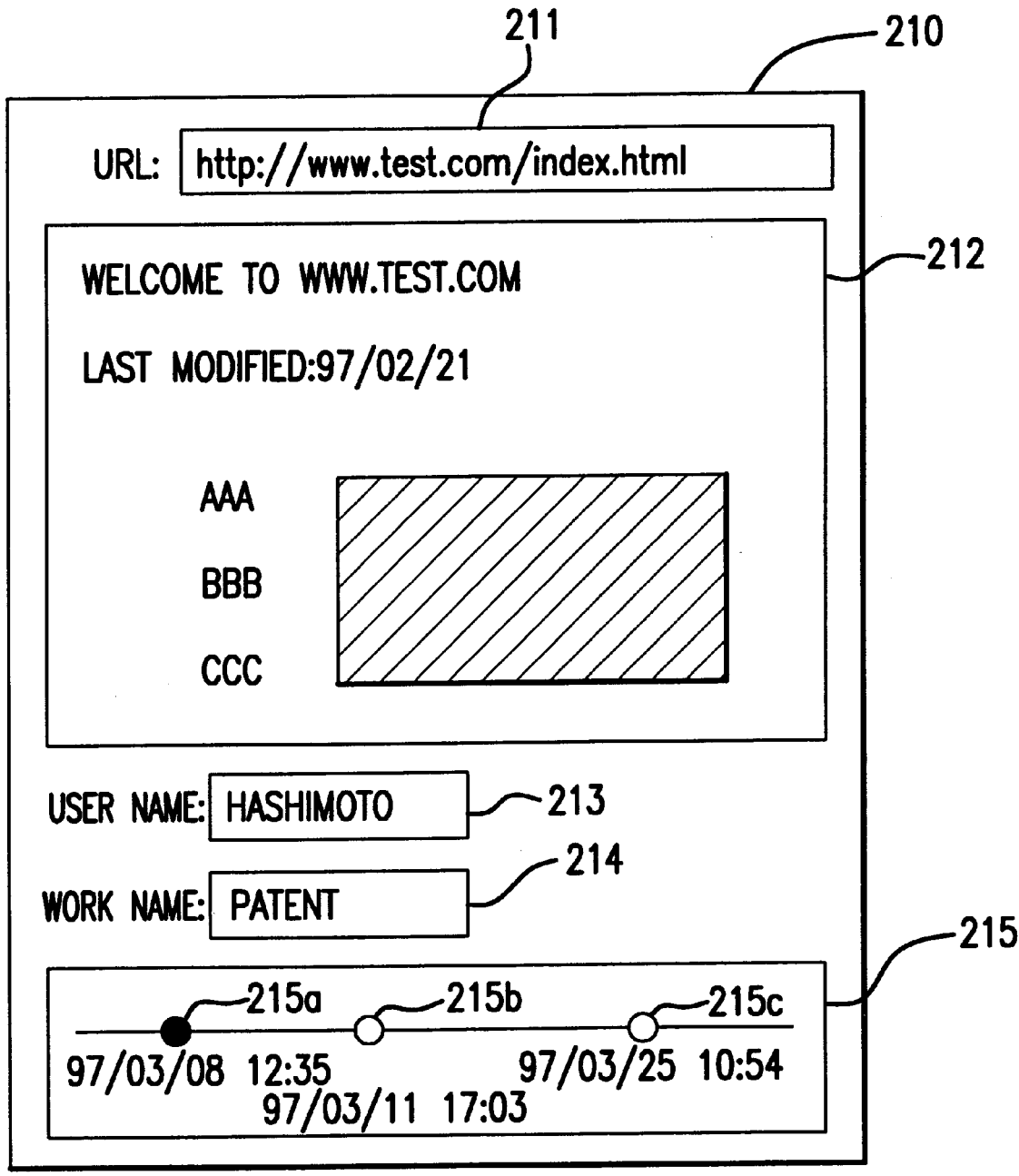
FIG. 20 is a view of a history display screen displaying "HTML document 1"

FIG. 20 is a view of a history display screen displaying the "HTML document 1." What makes the screen of FIG. 20 different from that of FIG. 19 is that the URL display area 211 displays "http://www.test.com/index.html"; the window 212, the contents of the data "HTML document 1"; the user name display area 213, "hashimoto"; the work name display area 214, "patent"; and the icon 215a has turned gray.

The screen of FIG. 20 allows the user to look up the contents of the data in effect before the update.

If the user selects the icon 215c corresponding to the time "10:54, 03/25/97" in the window 215, the selected icon 215c turns gray. At the same time, the indications in the URL display area 211, user name display area 213 and work name display area 214 turn into those corresponding to the time "10:54, 03/25/97." The client software 141a then sends to the data routing apparatus 150 a data acquisition request corresponding to the time "10:54, 03/25/97." The request is structured illustratively as follows:

```
(GET-LOG
        (USER hashimoto)
        (URL http://www.test.com/index.html)
        (WORK patent)
        (TIME 10:54 03/25/97)
)
```

The data routing apparatus 150 returns to the client software 141a the data "HTML document 3" corresponding to the request sent from the latter. The client software 141a displays the transmitted data "HTML document 3" in the window 212.

Figure 21:
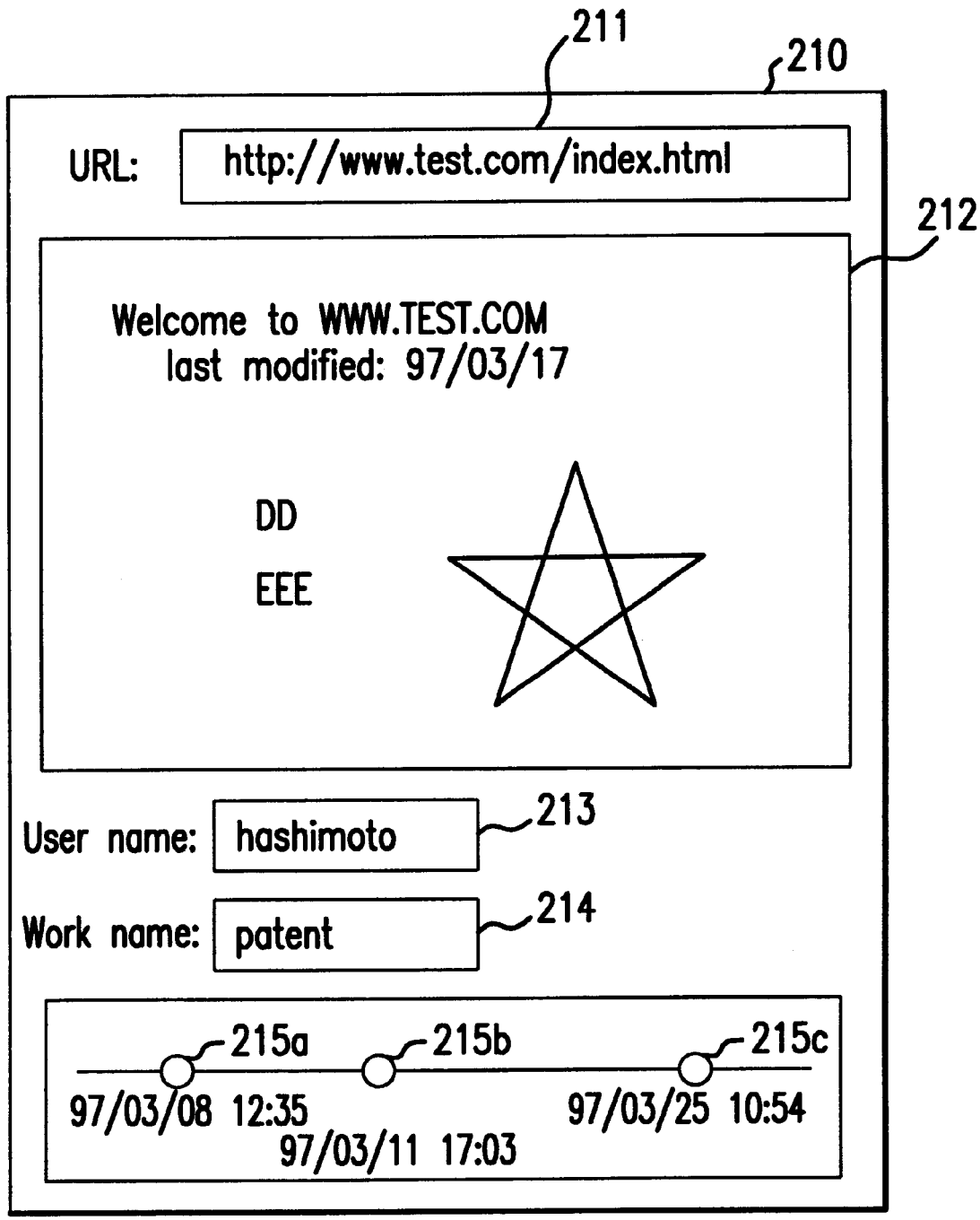
FIG. 21 is a view of a history display screen displaying "HTML document 3"

FIG. 21 is a view of a history display screen displaying the data "HTML document 3." What makes the screen of FIG. 21 different from that of FIG. 20 is that the window 212 displays the contents of the data "HTML document 3" and that the icon 215c has turned gray in place of the icon 215a.

In the manner described, client software can acquire historical information and look up past data based on the acquired information. When historical information is obtained from the data routing apparatus 150, users can easily access previously browsed data even if they fail to remember the exact time at which the data was referenced in the past. Because the historical information is limited illustratively in terms of the user name and work name, the window 215 in the history display screen does not show massive—but largely unnecessary—historical information.

Historical information was shown above being acquired within the range limited by the user name and work name. Alternatively, such limits may be removed and all historical information may instead be obtained from the data routing apparatus 150. It is also possible to acquire all historical information coinciding with a specific user name, not limited by a work name. If context information such as names of other hosts is retained as historical information, any of such context data items may be designated so that desired historical information may be acquired accordingly.

Below is a description of the fifth embodiment of the invention allowing client software to change data held by a server.

More specific ally, with the fifth embodiment, client software connected to a network outputs data having a data name designated therein to a server by way of data routing means. Furthermore, the fifth embodiment allows client software to transmit a request having a past time and a data name designated therein to a data routing apparatus from which previously output data is acquired.

Figure 22:
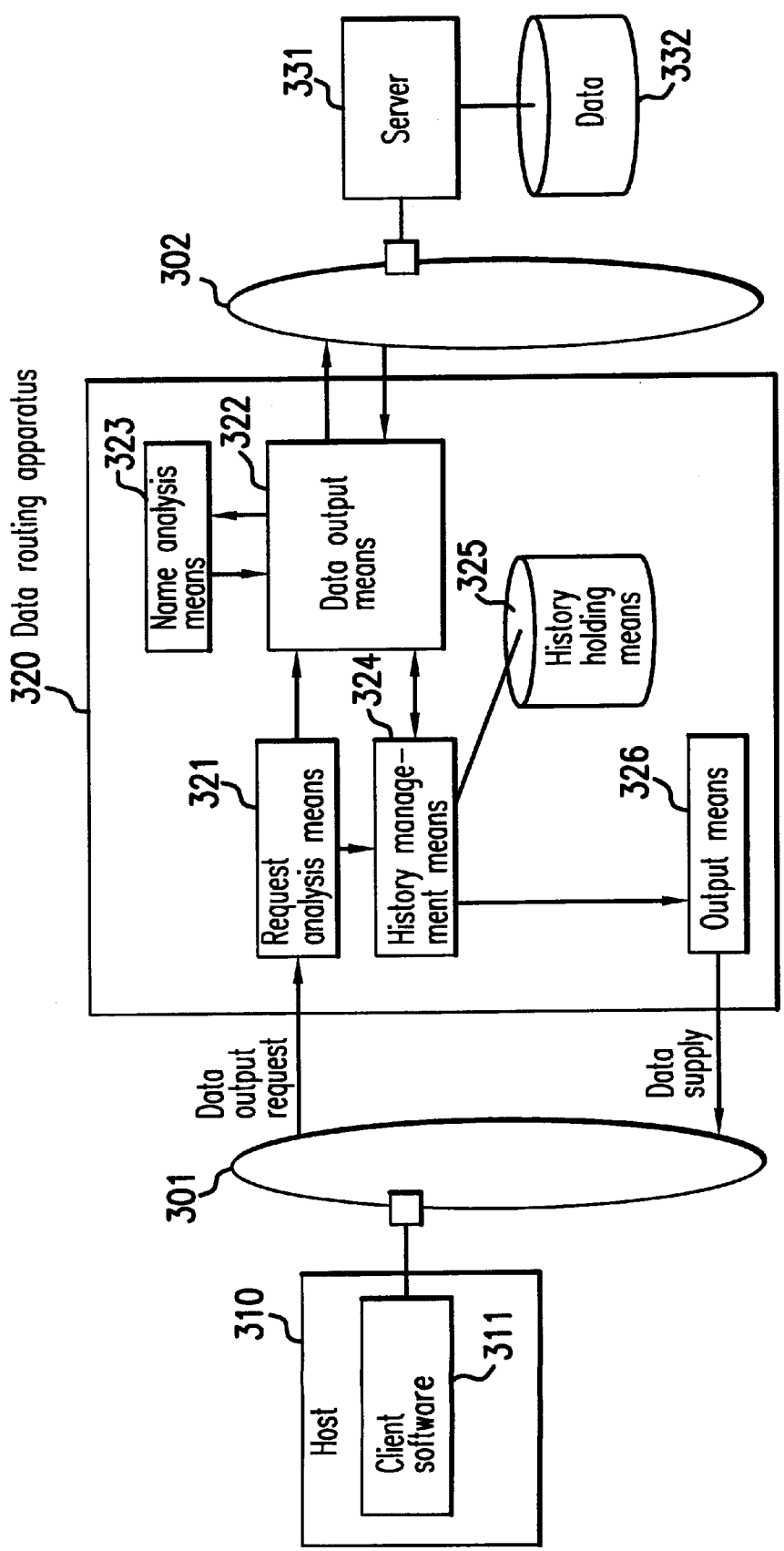
FIG. 22 is a block diagram of a fifth embodiment of the invention.

FIG. 22 is a block diagram of the fifth embodiment of the invention. In FIG. 22, a host 310 is connected to a data routing apparatus 320 via a network 301. The data routing apparatus 320 is connected via a network 302 to a server 331 that holds data 332.

The host 310 has client software 311 that outputs data to the server 331.

The data routing apparatus 320 comprises request analysis means 321, data output means 322, name analysis means 323, history management means 324, history holding means 325 and output means 326. The apparatus components, with the exception of the data output means 322, are basically the same in function as their counterparts with identical names in FIG. 11. The data output means 322 outputs to the server 331 a data output request made by the client software 331.

For a system of the above constitution, suppose that a user wants to output to a server some data corresponding to a name using the client software 311. In that case, the user causes the client software 311 to transmit a data output request having the name and data included therein to the data routing apparatus 320. In such a data output request being transmitted, a PUT instruction is followed illustratively by the user name, data name and data contents.

In the data routing apparatus 320, the request analysis means 321 receives the request from the client software 311. The request analysis means 321 analyzes the request, recognizes that the request is a data output request, and extracts the name and data. The request analysis means 321 then inputs the name and data to both the data output means 322 and the history management means 324.

Given the name and data from the request analysis means 321, the history management means 324 retains and manages the name, data and the current time in the history holding means 325. Alternatively, when the name and data are received from the request analysis means 321, the history management means 324 may search the names in the history holding means 325 for the same name input from the request analysis means 321. If the name is found, the data associated with that name may be compared with the data received from the request analysis means 321. If the two data are different, then the history holding means 325 may retain the name, data and time.

Upon receipt of the name and data from the request analysis means 321, the data output means 322 forwards the name to the name analysis means 323. The name analysis means 323 analyzes the received name from the data output means 322 and, in return, supplies the latter with the identity of the server from which to retrieve the named data. The data output means 322 then outputs the name and data to the server 331 corresponding to the identifier returned by the name analysis means 323.

Upon receiving the name and data from the data output means 322, the server 331 retains the name and data for management. In this manner, the data output by the client software 311 is held and managed inside the server 331. Furthermore, the data is supplemented with time information and retained in the history holding means 325.

Described below is an example in which the client software 311 requests data corresponding to a name that was output at a given time.

To acquire data associated with a name output at a specific time in the past, the client software 311 transmits to the data routing apparatus 320 a data request having the name and the time included therein.

In the data routing apparatus 320, the request analysis means 321 accepts the request from the client software 311. The request analysis means 321 analyzes the request and extracts the name and time. The request analysis means 321 then sends the name and time to the history management means 324.

Given the name and time from the request analysis means 321, the history management means 324 checks to see if the history holding means 325 holds data corresponding to the name-time pair. If such data is found to exist, the data is input to the output means 326. If no such data is detected, a "not found" notice is sent to the output means 326. The output means 326 transmits the received data to the client software 311.

In the manner described, the client software 311 can acquire data that was output at a specific time.

The system of FIG. 22 may also be applied to the WWW. That is, client software (WWW browser) may store HTML documents via the inventive data routing apparatus into WWW servers located on the Internet. Such documents may be looked up subsequently as needed.

It is also possible to build a system having two key features: allowing historical information to be retained when data in a server is referenced by client software (the system of FIG. 11), and permitting historical information to be retained when data output by client software is placed into a server (the system of FIG. 22). In such a system, the data routing apparatus comprises both the data request means 122 (shown in FIG. 11) and the data output means 322 (shown in FIG. 22). For historical information held in the history holding means, the items shown in FIG. 18 may be supplemented with an indication if the data processing in question is a reference to stored data in a server or a data write operation to a server. When acquiring data from the data routing apparatus, client software may check the indicator to see whether the data has been referenced or stored in the past. This allows the client software to further limit the range of historical information for its use.

What follows is a description of the sixth embodiment practiced by applying a work space technique to the third embodiment of FIG. 11.

The sixth embodiment is implemented primarily by data terminal equipment having work spaces in which to preserve and reproduce past states. When any of the icons representing work spaces is selected, the data terminal equipment displays information related to the selected icon of the work space in question. If an icon of, for example, a work space of past status is selected, past information previously viewed through that work space is again displayed.

Figure 23:
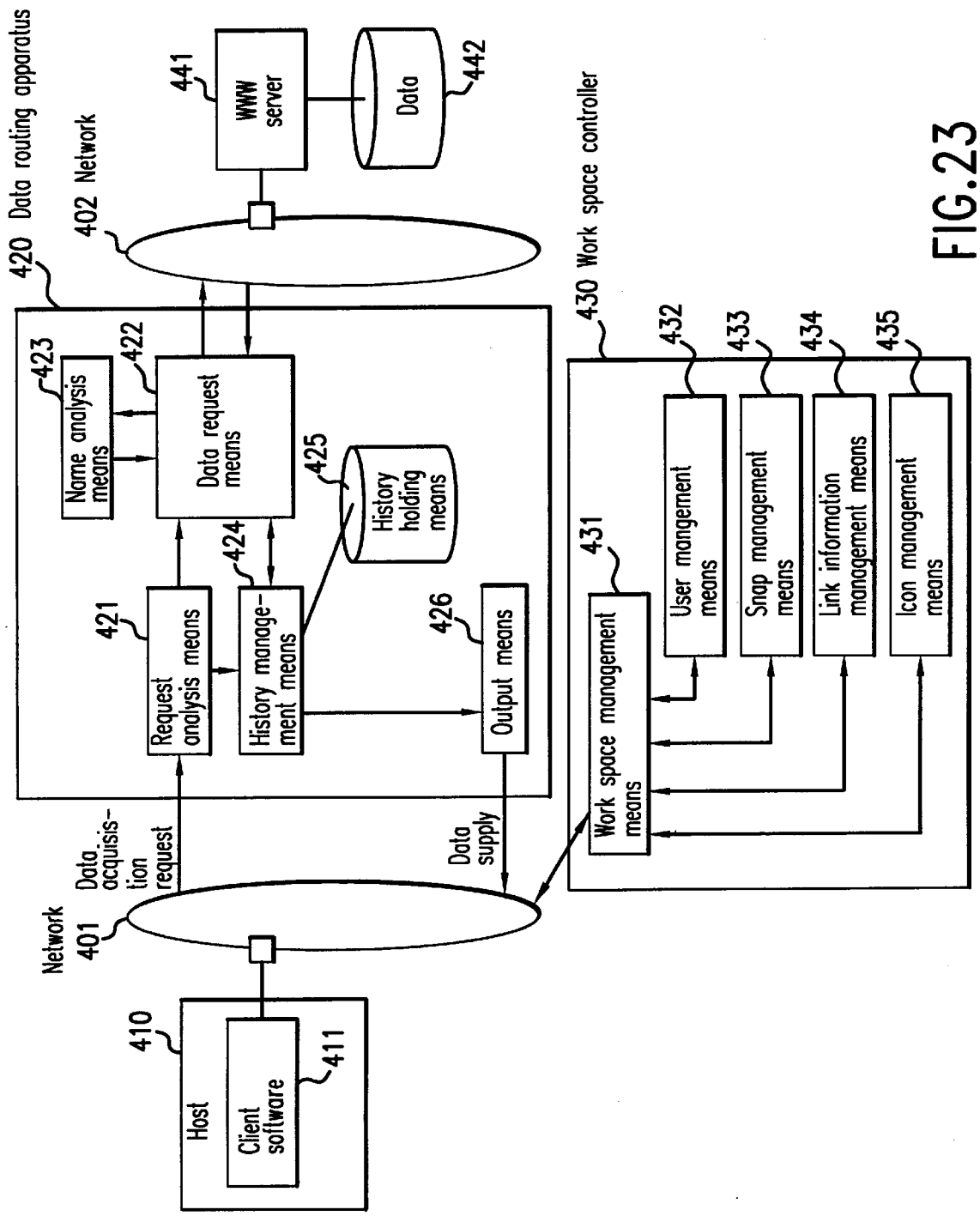
FIG. 23 is a block diagram of a sixth embodiment of the invention.

FIG. 23 is a block diagram of the sixth embodiment of the invention. In FIG. 23, a host 410 is connected via a network 401 to a data routing apparatus 420 and a work space controller 430. The data routing apparatus 420 is connected via a network 402 to a server 441 that retains data 442.

The host 410 has client software 411 that references the data 442 in the server 441 by use of work spaces.

The data routing apparatus 420 comprises request analysis means 421, data request means 422, name analysis means 423, history management means 424, history holding means 425 and output means 426. The apparatus components are basically the same in function as their counterparts having identical names in FIG. 11.

The work space controller 430 includes work space management means 431, user management means 432, snap management means 433, link information management means 434, and icon management means 435. The controller components have the following functions:

The work space management means 431 receives requests from the client software 411 a nd retains work space information. In servicing a request from the client software 411, the work space management means 431 queries the user management means 432, snap management means 433, link information management means 434 and icon management means 435. FIG. 24 is a view of a typical management table 431a held by the work space management means 431. In FIG. 24, "WS_ID" represents identifiers of work spaces, and "WS_title" denotes titles attached to the work spaces.

The user management means 432 retains user identifiers (ID) user names, passwords, and users' home work spaces, all associated with one another. A home work space is a work space mainly used by a particular user at present. FIG. 25 is a view of a typical management table 432a held by the user management means 432. In FIG. 25, "user_ID" stands for user identifiers, "user_name" for user names, "password" for passwords, and "home_WS_ID" for identifiers of users' home work spaces.

The snap management means 433 manages the status of each past work space as a snap. FIG. 26 is a view of a typical management table 433a held by the snap management means 433. In FIG. 26, "snap_ID" stands for identifiers of the status of past work spaces stored, "create_date" for times at which snaps were created, "WS_ID" for identifiers of work spaces, "link_ID" for identifiers of link information included in snaps, and "operation" for user operations that created the snaps.

The link information management means 434 retains titles attached by users to information, URLs representing information names, and memos attached by users to the information, all associated with one another. FIG. 27 is a view of a typical management table 434a held by the link information management means 434. In FIG. 27, "link_ID" stands for identifiers identifying link information, "link_TITLE" for titles attached by users to the information, "URL" for URLs denoting information names, and "MEMO" for memos attached by users to the information.

The icon management means 435 retains identifiers of snaps related to icons, link information identifiers, and X and Y coordinates in which icons are displayed in work spaces, all in association with one another in storage. FIG. 28 is a view of a typical management table 435a held by the icon management means 435. In FIG. 28, "snap_ID" stands for identifiers identifying snaps, "link_ID" for identifiers identifying link information, "X" for X coordinates, and "Y" for Y coordinates.

Figure 29:
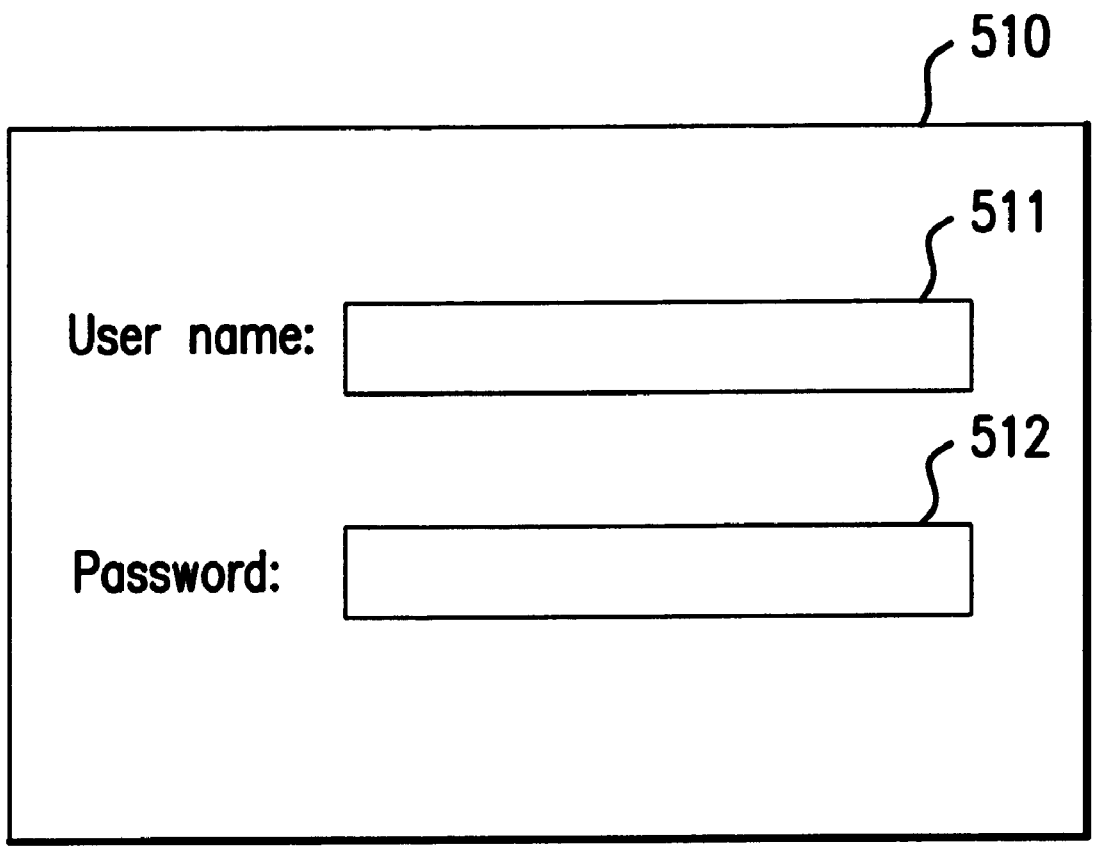
FIG. 29 is a view of a log-in screen.

With a system of the above constitution, a user may have the client software 411 display work spaces illustratively by performing the following operations:

The user first logs into the system using the client software 411. FIG. 29 is a view of a typical log-in screen 510. The log-in screen 510 shows a text box 511 into which to enter a user name and a text box 512 for password entry. The user inputs his or her user name and password to the text boxes 511 and 512 respectively in the screen 510. It is assumed here that a user name "hashimoto" and a password "hogehoge" have been input to their respective boxes.

The client software 411 transmits the entered user name and password to the work space management means 431.

The work space management means 431 receives a request composed of the user name and password from the client software 411 and analyzes the request. When the request is found to be a log-in request, the work space management means 431 queries the user management means 432 about the user name and password received.

The user management means 432 references its management table 432a (shown in FIG. 25) to verify whether the user name is correctly associated with the password. When the user name and password are found to be correctly associated, the user management means 432 returns the information:

(home_ws_id=2)

to the work space management means 431.

If the user name is not correctly associated with the password, the user management means 432 informs the work space management means of the mismatch.

With the user name and password in correct association, the work space management means 431 informs the client software 411 of the correct association and returns the information:

(home_ws_id=2)

to the client software 411.

If the user name fails to correspond correctly to the password, the client software 411 displays an indication to that effect and again presents the log-in screen 510 (shown in FIG. 29) prompting the user to enter his or her user name and password. When the user name and password are correctly associated with each other, the client software 411 requests a work space list from the work space management means 431.

The work space management means 431 retrieves the work space list from the management table 431a it retains (shown in FIG. 24) and returns the retrieved list to the client software 411. It is assumed here that three work spaces, e.g., "patent," "accounting" and "development" are managed. In that case, the work space management means 431 returns to the client software 411 the information:

((ws_id=1, ws_title=patent)
(ws_id=2, ws_title=accounting)
(ws_id=3, ws_title=development)
)

In the above information, numerals 1, 2 and 3 represent identifiers identifying the respective work spaces.

Figure 30:
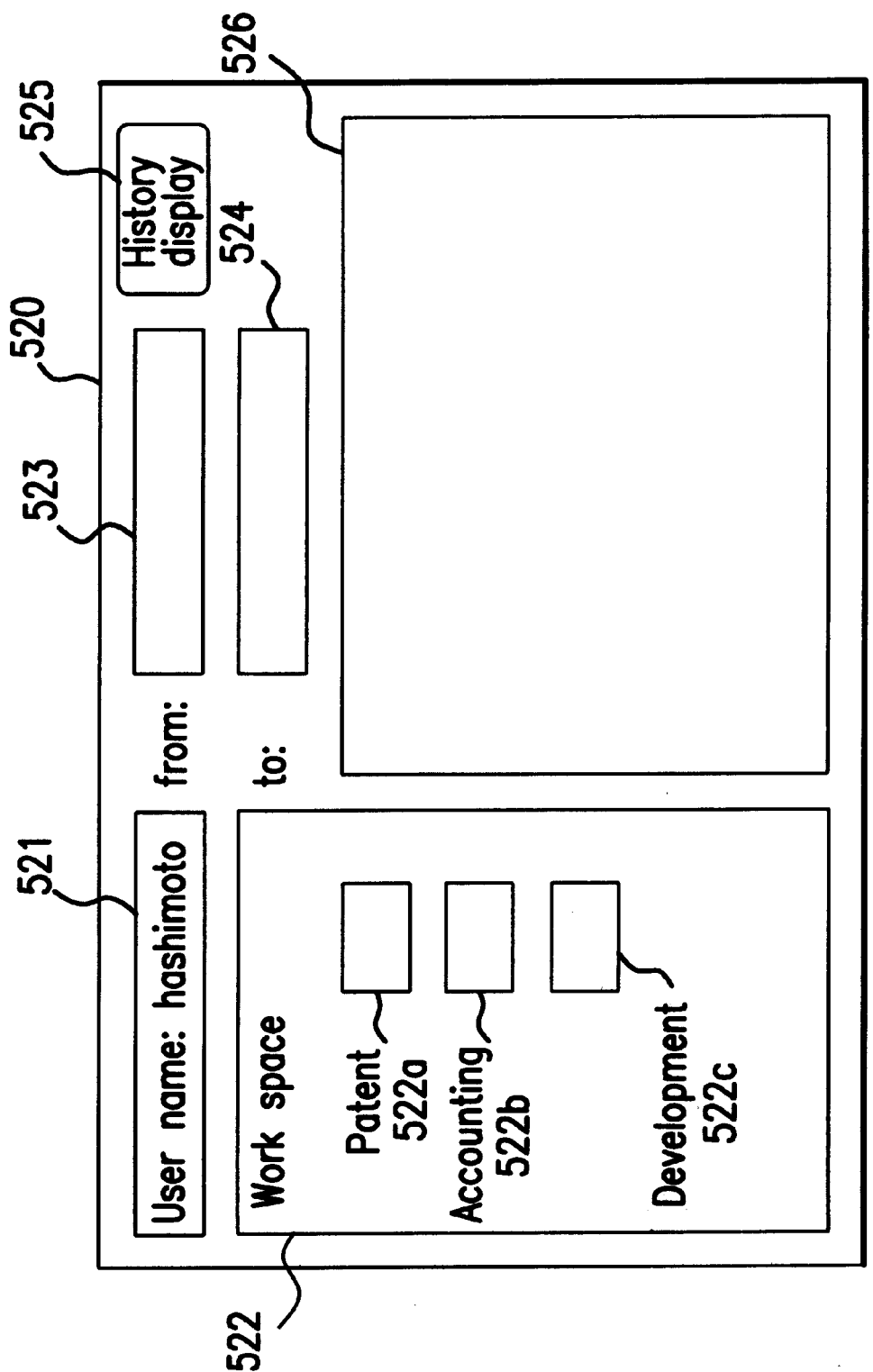
FIG. 30 is a view of a work space information screen.

The client software 411 displays the received work space information on the screen. FIG. 30 is a view of a work space information screen 520. The screen 520 includes a user name display area 521 that indicates, in this example, a user name "hashimoto." Under the user name display area 521 is a work space display window 522 showing a list of work space names. The work space display window 522 in this example displays a work space name "patent" 522a, a work space name "accounting" 522b and a work space name "development" 522c. To the right of the user name display area 521 are search period input fields 523 and 524. The "from" field 523 accommodates a time of day at which the search is started, and the "to" field 524 holds a time of day at which the search is ended. To the right of the search period input fields 523 and 524 is a "History Display" button 525. Activating the button 525 initiates history display. Historical information is shown in a history display window 526.

With the above work space information screen 520 displayed, the client software 411 transmits:

(home_ws_id=2)

to the work space management means 431 for query about a home work space of the user named "hashimoto."

In turn, the work space management means 431 queries the snap management means 433 about a snap identifier corresponding to the work space identifier "2."

The snap management means 433 searches the management table 433a it holds (shown in FIG. 26) for the snap identifier, and returns:

(snap_id=2, create_date="15:22 07/25/96," ws_id=2, link_id=4, operation="print")

The work space management means 431 queries the icon management means 435 about a link identifier corresponding to the snap identifier "2."

The icon management means 435 searches the management table 435a it holds (shown in FIG. 28) for the link identifier, and returns:

(
(link_id=2, x=45, y=89)
(link_id=3, x=42, y=105)
)

The work space management means 431 queries the link information management means 434 about link information corresponding to the link identifiers "2" and "3."

The link information management means 434 searches the management table 434a it holds (shown in FIG. 27) for the information, and returns:

(
(link_id=2, link_title="accounting procedure," url=http://www.keiri/tejyunnsho.htm, memo="urgent")
(link_id=3, link_title="department budget draft for '97," url=http://www.keiri/xxdepbudget-97.htm, memo="reference material")
)

The work space management means 431 returns to the client software 411 the following information:

(
(snap_id=2, create_date="15:22 07/10/96," ws_id=2, link_id=4, operation="print")

-continued ((link_id=2, x=45, y=89) (link_id=3, x=42, y=105)
((link_id=2, link_title="accounting procedure," url=http://www.keiri/tejyunnsho.htm, memo="urgent")
(link_id=3, link_title="department budget draft for '97," url=http://www.keiri/xxdepbudget-97.htm, memo="reference material")
)

On the basis of the information thus received, the client software 411 displays a work space in the window 526.

Figure 31:
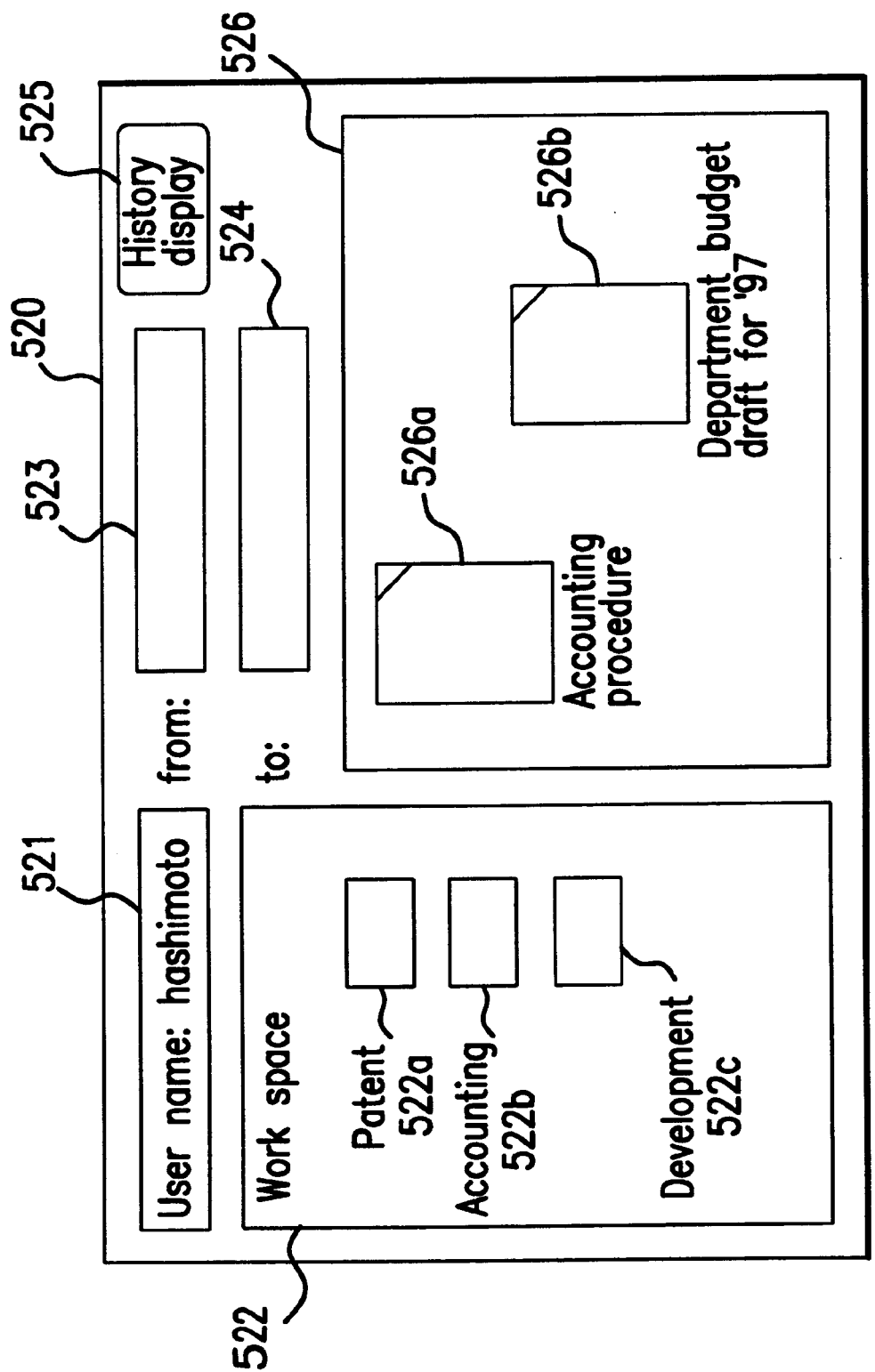
FIG. 31 is a view of a home work space screen.

FIG. 31 is a view of a typical home work space screen. In this example, the home work space identifier is "2," so that the corresponding work space name "accounting" 522b is shown enclosed by thick lines in the window 522. The window 526 displays an icon 526a representing the "accounting procedure" and another icon 526b denoting the "department budget draft for '97."

In the above description, a user's home work space was shown to be displayed first. Alternatively, when a given work space is selected in the window 522, the corresponding work space may be allowed to appear in the window 526.

What follows is a description of how, when information related to an icon of a given work space is looked up, the work space status at that point is preserved as a snap.

Figure 32:
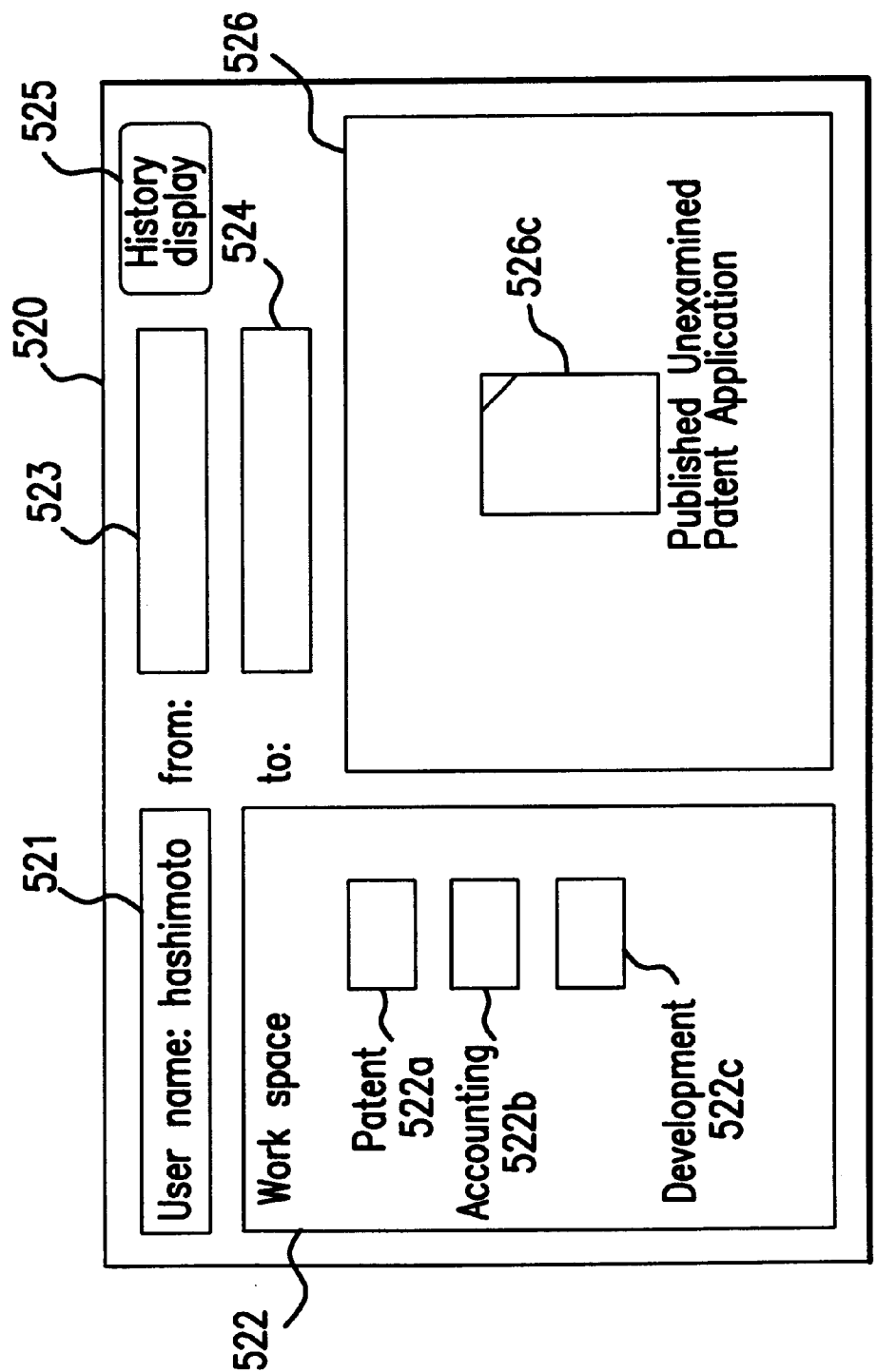
FIG. 32 is a view of a work space display screen of "Patent"

Suppose that the user is currently working in the work space "patent." FIG. 32 is a view of a typical screen displaying the work space "patent." In FIG. 32, the work space name "patent" 522a is shown enclosed by thick lines. The window 526 displays an icon 526c representing a "Published Unexamined Patent Application." The identifier for the work space "patent" is "1." The client software 411 retains the following information:

(
(user id=2)
(snap_id=1, create_date="13:10 06/05/96," ws_id=1, link_id=1, operation="browse")
((link_id=1, x=50, y=100)),
((link_id=1, link_title="Published Unexamined Patent Application," url=http://www.pat.ccc/pat?id=h08368297, memo="important"))
)

Suppose now that the user double-clicks on the icon 526c representing the "Published Unexamined Patent Application" to display the information related to the icon and that the time at that point is "10:19, 07/25/96." In such a case, the client software 411 sends the URL "http://www.pat.ccc/pat?id=h08368297" and the time "10;19, 07/25/96" to the data routing apparatus 420 to request the data corresponding to the URL.

Illustratively, the client software 411 transmits to the data routing apparatus 420 the following information:

(GET
(user hashimoto)
(url http://www.pat.ccc/pat?id=h08368297)
(work "patent")
(time 10:09 07/25/96)
)

In turn, the data routing apparatus 420 downloads the data corresponding to the URL "http://www.pat.ccc/pat?id=

H08368297," and places into the history holding means 425 the URL, the downloaded data and the time "10:09 07/25/96" in association with one another. Described below is an example of information held by the history holding means 425.

Figure 33:
FIG. 33 is a view of a typical management table held by history holding means of the invention.

FIG. 33 is a view of a typical management table 425*a* held by the history holding means 425. This exemplary table holds a history of a user named "hashimoto" having looked through "HTML document 4" and "HTML document 5." The "HTML document 4" and "HTML document 5" have the same URL.

The data routing apparatus 420 returns the downloaded data to the client software 411. The client software 411 displays on the screen the data returned from the data routing apparatus 420.

Figure 34:
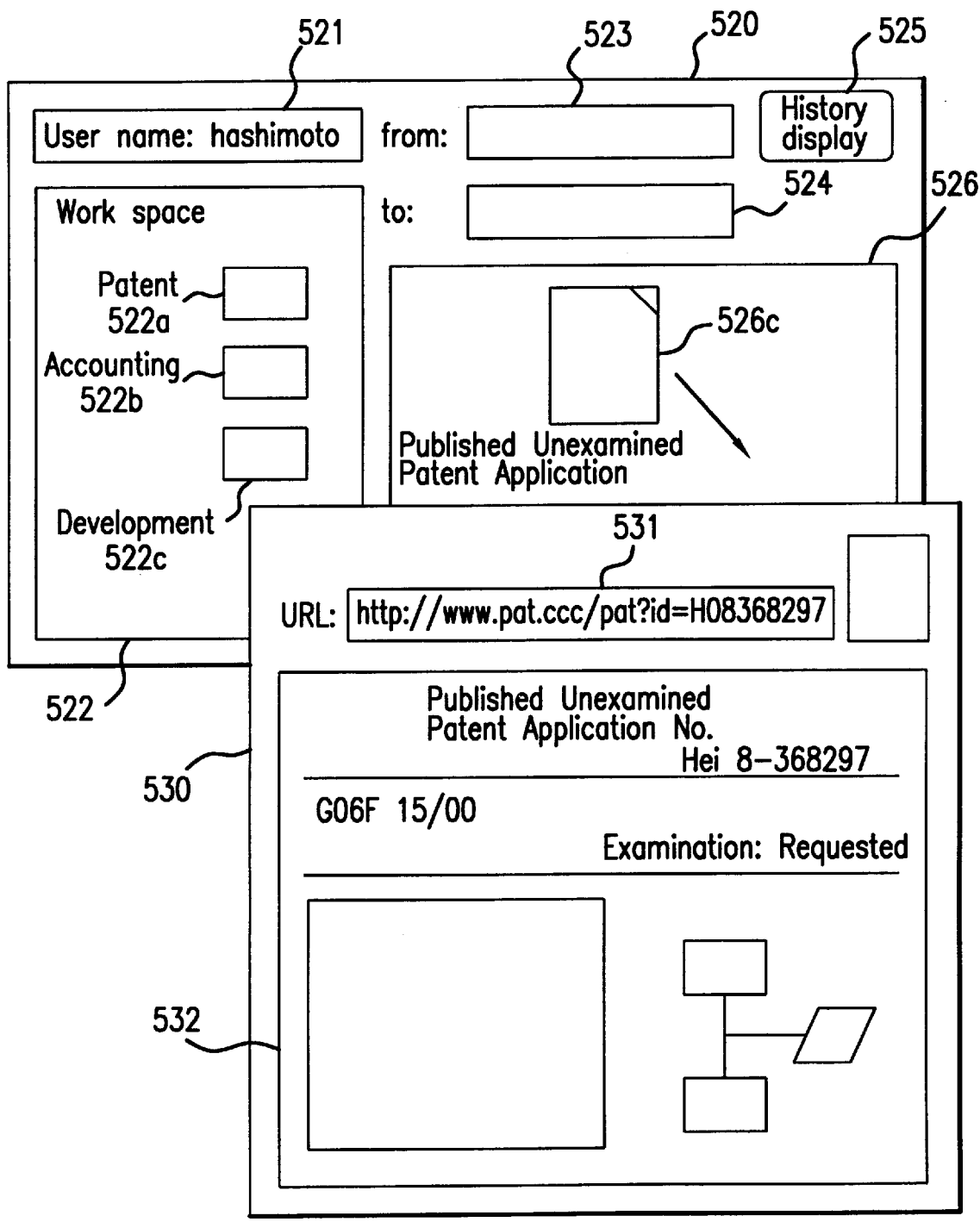
FIG. 34 is a view of a client software screen for browsing "HTML document 5"

FIG. 34 is a view of a typical client software screen for browsing the "HTML document 5." Clicking on the icon 526*c* denoting the "Published Unexamined Patent Application" in the work space information screen 520 causes the data returned from the data routing apparatus 420 to appear in a document viewing screen 530. The screen 530 includes a URL display area 531 for displaying the URL of the data being viewed, and a document content display window 532.

If the user's operation to browse information is set so as to trigger preservation of work space status, the client software 411 stores the work space status at that point into the work space management means 431.

The client software 411 transmits to the work space management means 431 a work space preservation request along with the following information:

---

(
  (CREATE_DATE="10:09 07/25/96," WS_ID=1, LINK_ID=1, OPERATION="BROWSE")
  ((LINK_ID=1, X=50, Y=100)),
  ((LINK_ID=1, LINK_TITLE="PUBLISHED UNEXAMINED PATENT APPLICATION," URL=http://www.pat.ccc/pat?id=H08368297, MEMO="IMPORTANT"))
)

---

The work space management means 431 forwards the information from the client software 411 to the snap management means 433. The snap management means 433 creates a new snap identifier ("4" in this example) and places the identifier into the management table 433*a* (shown in FIG. 26). The management table 433*a* in FIG. 26 is shown having the snap identifier "4" stored therein.

The work space management means 431 returns to the client software 411 the following information:

---

(
  (SNAP_ID=4, CREATE_DATE="10:09 07/25/96," WS_ID=1, LINK_ID=1, OPERATION="BROWSE")
  ((LINK_ID=1, X=50, Y=100))
  ((LINK_ID=1, LINK_TITLE="PUBLISHED UNEXAMINED PATENT APPLICATION," URL=http://www.pat.ccc/pat?id=H08368297, MEMO="IMPORTANT"))
)

---

In the manner described above, the snap management means 433 receives and retains the work space status at the time when information associated with an icon of a work space is browsed.

Described below is an example in which past work space status is searched for and retrieved.

Suppose that a user is working in the work space shown in FIG. 32 and that the screen 520 in FIG. 32 is in a state following the viewing of information related to the icon 526*c* of the "Published Unexamined Patent Application" at "10:09, 07/25/96." The identifier of the work space is "1" and the snap identifier is "4." The client software 411 holds the following information:

```
(
    (USER_ID=2)
    (SNAP_ID=4, CREATE_DATE="10:09 07/25/96," WS_ID=1, LINK_ID=1,
OPERATION="BROWSE")
    ((LINK_ID=1, X=50, Y=100))
    ((LINK_ID=1,    LINK_TITLE="PUBLISHED    UNEXAMINED    PATENT
APPLICATION,"                  URL=http://www.pat.ccc/pat?id=H08368297,
MEMO="IMPORTANT"))
)
```

When searching for the past work space, the user inputs a target search period by making necessary entries into the "from" and then "to" fields 523 and 524, and then clicks the "History Display" button 525. Clicking on the "History Display" button 525 causes the client software 411 to request from the work space management means 431 a past work space status list which corresponds to the work space identifier "1" and which falls into the designated search period.

The work space management means 431 queries the snap management means 433 about a snap which falls into the designated search period and which corresponds to the work space identifier "1." The snap management means 433 searches the management table 433a it holds (shown in FIG. 26) for the snap and returns to the work space management means 431 the following information:

one of the two icons 543a and 543b, and the corresponding work space status will be displayed in the window 542.

Suppose now that the user has clicked on the icon 543a corresponding to the time "13:10, 06/05/96."

In that case, the client software 411 searches for a snap created at "13:10, 06/05/96" by transmitting to the work space management means 431 a snap request including the information:

(SNAP_ID=1, CREATE_DATE="13:10 06/05/96," WS_ID=1,
    LINK_ID=1, OPERATION="BROWSE")

The work space management means 431 requests from the icon management means 435 icon information whose snap identifier is "1."

```
(
    (SNAP_ID=1, CREATE_DATE="13:10 06/05/96," WS_ID=1, LINK=ID=1,
OPERATION="BROWSE")
    (SNAP_ID=4, CREATE_DATE="10:09 07/25/96," WS_ID=1, LINK_ID=1,
OPERATION="BROWSE")
)
```

The work space management means 431 forwards the information returned from the snap management means 433 to the client software 411.

The client software 411 provides history display based on the information returned from the work space management means 431.

Figure 35:
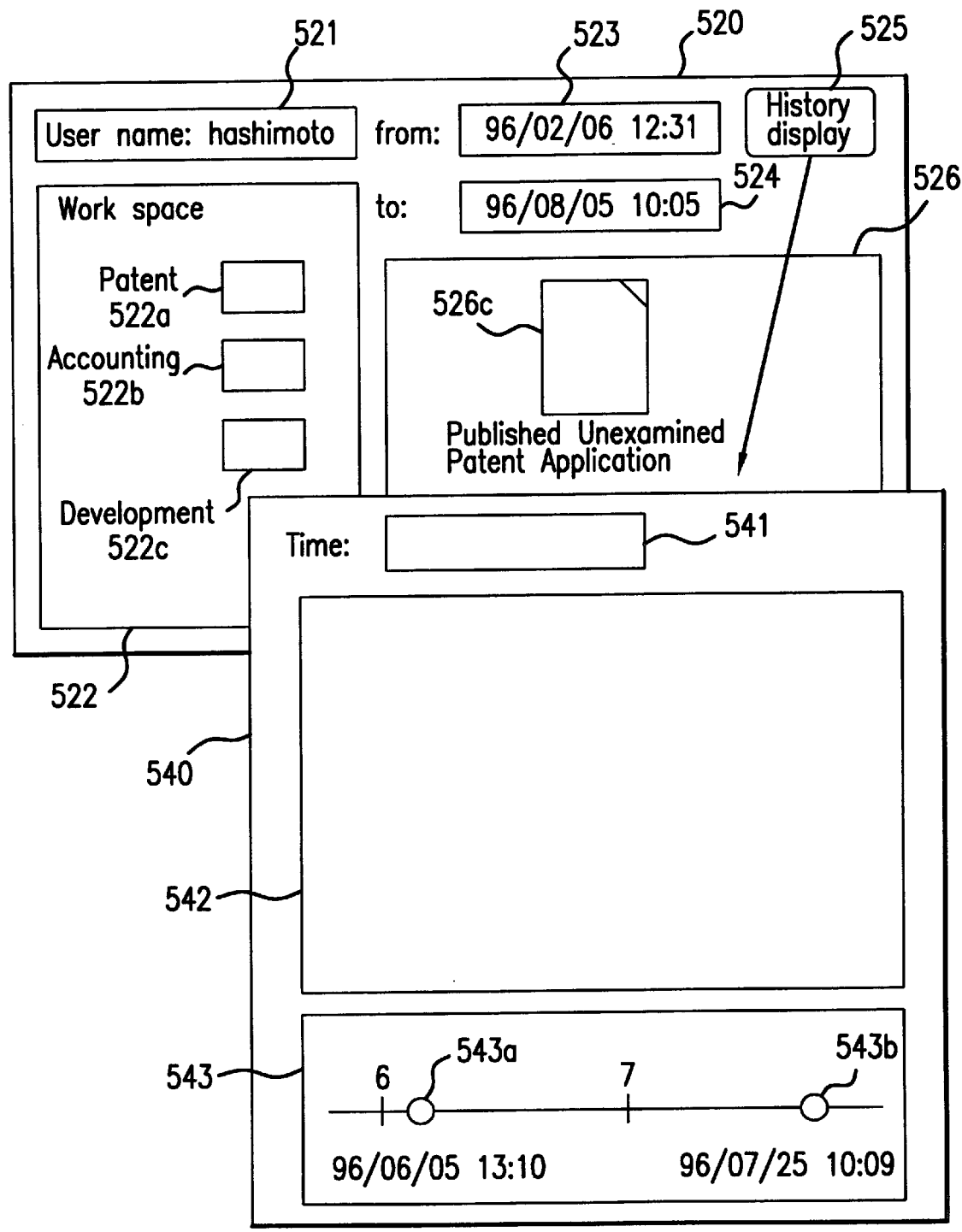
FIG. 35 is a view of a typical history display screen.

FIG. 35 is a view of a typical history display screen 540. The history display screen 540 includes a time display area 541 that displays a time associated with designated historical information. Under the time display area 541 is a window 542 in which past work space status is reproduced. Under the window 542 is a window 543 that displays historical information on a time series basis. That is, the window 543 indicates in a time base format times of day at which work space snaps were created. In this example, icons 543a and 543b are shown indicating that snaps were created at times "13:10, 06/05/96" and "10:09, 07/25/96." The user selects The icon management means 435 returns to the work space management means 431 the information:

((LINK_ID=1, X=50, Y=100))

The work space management means 431 requests from the link information management means 434 link information whose link identifier is "1."

The link information management means 434 returns to the work space management means 431 the information:

```
((LINK_ID=1,   LINK_TITLE="PUBLISHED   UNEXAMINED   PATENT
APPLICATION,"                URL=http://www.pat.ccc/pat?id=H08368297,
MEMO="IMPORTANT"))
```

The work space management means 431 returns to the client software 411 the following information:

```
(
  (SNAP_ID=1, CREATE_DATE="13:10 06/05/96," WS_ID=1, LINK_ID=1,
OPERATION="BROWSE")
  ((LINK_ID=1, X=50, Y=100)
  ((LINK_ID=1, LINK_TITLE="PUBLISHED UNEXAMINED PATENT
APPLICATION,"  URL=http://www.pat.ccc/pat?id=H08368297,
MEMO="IMPORTANT"))
)
```

The client software 411 reproduces the past work space status in the window 542 of FIG. 35 on the basis of the information thus received.

Figure 36:
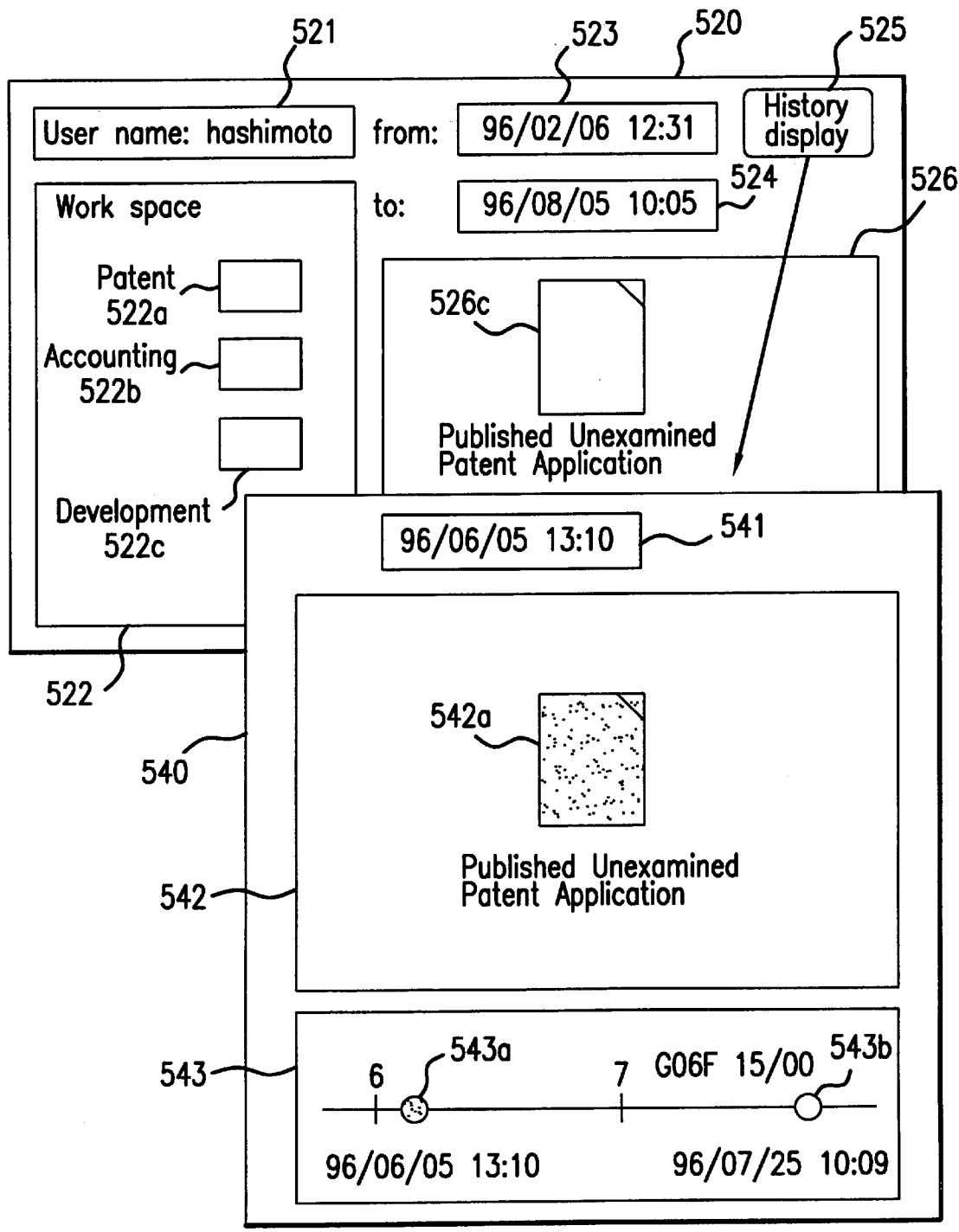
FIG. 36 is a view of a screen for reproducing a past work space in effect at "13:10, 06/05/96"

FIG. 36 is a view of a screen 540 for reproducing a past work space in effect at the time "13:10, 06/05/96." In the screen 540, an icon 543a corresponding to the time "13:10, 06/05/96" is shown having turned gray to indicate that the icon is selected. A time display area 541 displays the time corresponding to the selected icon 543a. The window 542 displays the work space in effect at the time "13:10, 06/05/96." In this example, the icon 542a denoting the "Published Unexamined Patent Application" is shown in the window 542.

Likewise, clicking on the icon corresponding to the time "10:09, 07/25/96" causes the work space in effect at that point in time to appear.

Figure 37:
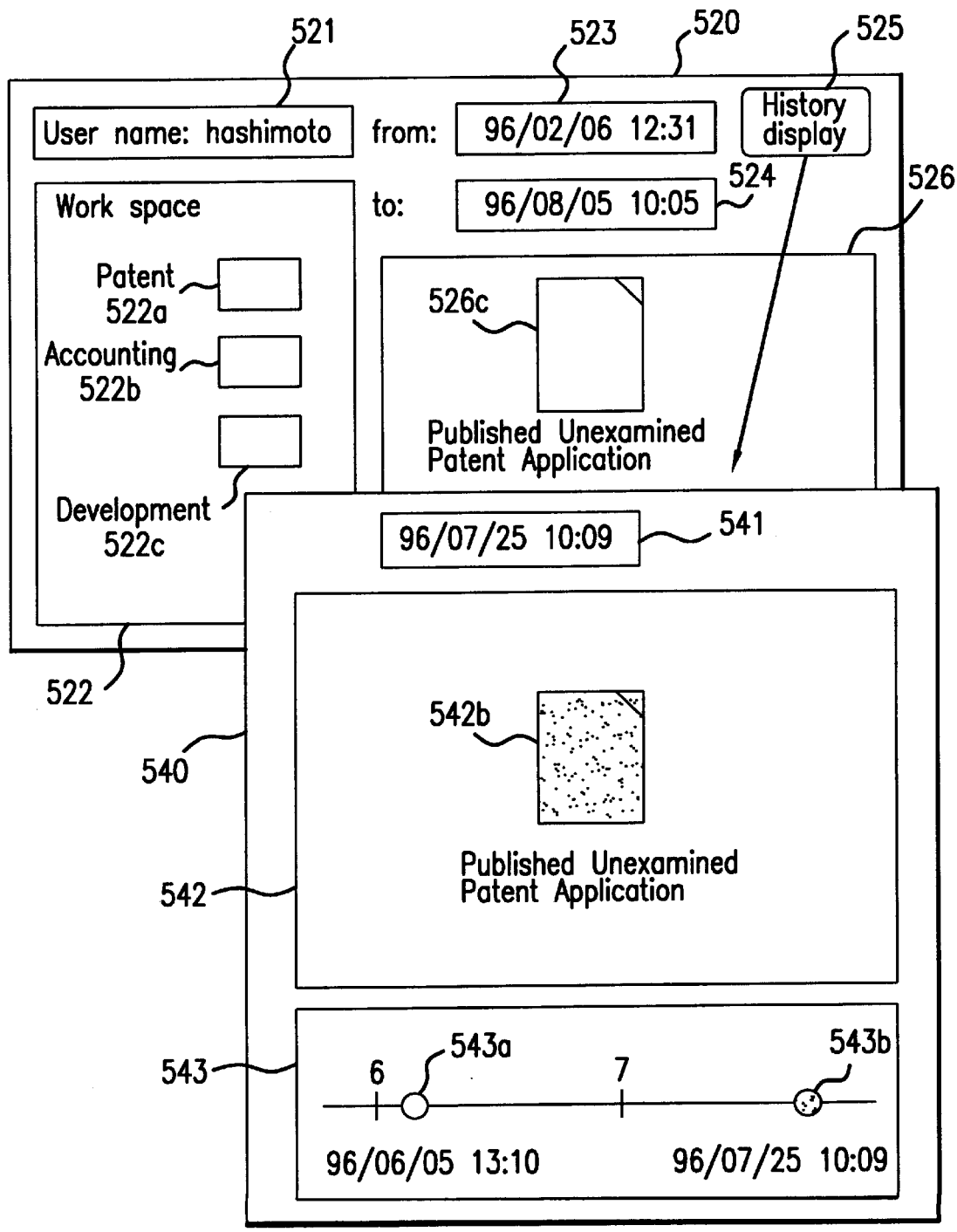
FIG. 37 is a view of a screen for reproducing another past work space in effect at "10:09, 07/25/96"

FIG. 37 is a view of a typical screen 540 for reproducing another past work space in effect at the time "10:09, 07/25/96." In the screen 540, an icon 543b corresponding to the time "10:09, 07/25/96" is shown having turned gray. The time display area 541 displays the time corresponding to the selected icon 543b. The window 542 displays the work space in effect at the time "10:09, 07/25/96." In this example, the icon 542b denoting the "Published Unexamined Patent Application" is shown in the window 542.

Described below is an example in which past work space status is searched for, retrieved and viewed again when the icon corresponding to the work space in question is selected. In FIG. 37, the icon 542a corresponding to the "Published Unexamined Patent Application" is displayed in gray. This indicates that a snap of the corresponding data is preserved because the icon was selected in the past. If a number of icons exist regarding a single work space, only one of the icons is displayed in gray. To view the corresponding data again, the user double-clicks on the icon 542a.

Double-clicking on the gray icon 542a causes the client software 411 to request the data routing apparatus 420 to return the name of the data associated with the icon, the time at which the snap was created, and the data corresponding to the data name. Illustratively, the client software 411 transmits to the data routing apparatus 420 the following information:

```
(GET-LOG
  (USER hashimoto)
  (URL http://www.pat.ccc/pat?id=H08368297)
  (WORK patent)
  (TIME 13:10 06/05/96)
)
```

The data routing apparatus 420 searches the historical information in the history holding means 425 for the applicable history in the same manner as with the fourth embodiment. With the history detected, the data routing apparatus 420 returns the data "HTML document 4" to the client software 411. It is assumed that the history holding means 425 retains the information shown in FIG. 33.

The client software 411 displays the data "HTML document 4" returned from the data routing apparatus 420.

Figure 38:
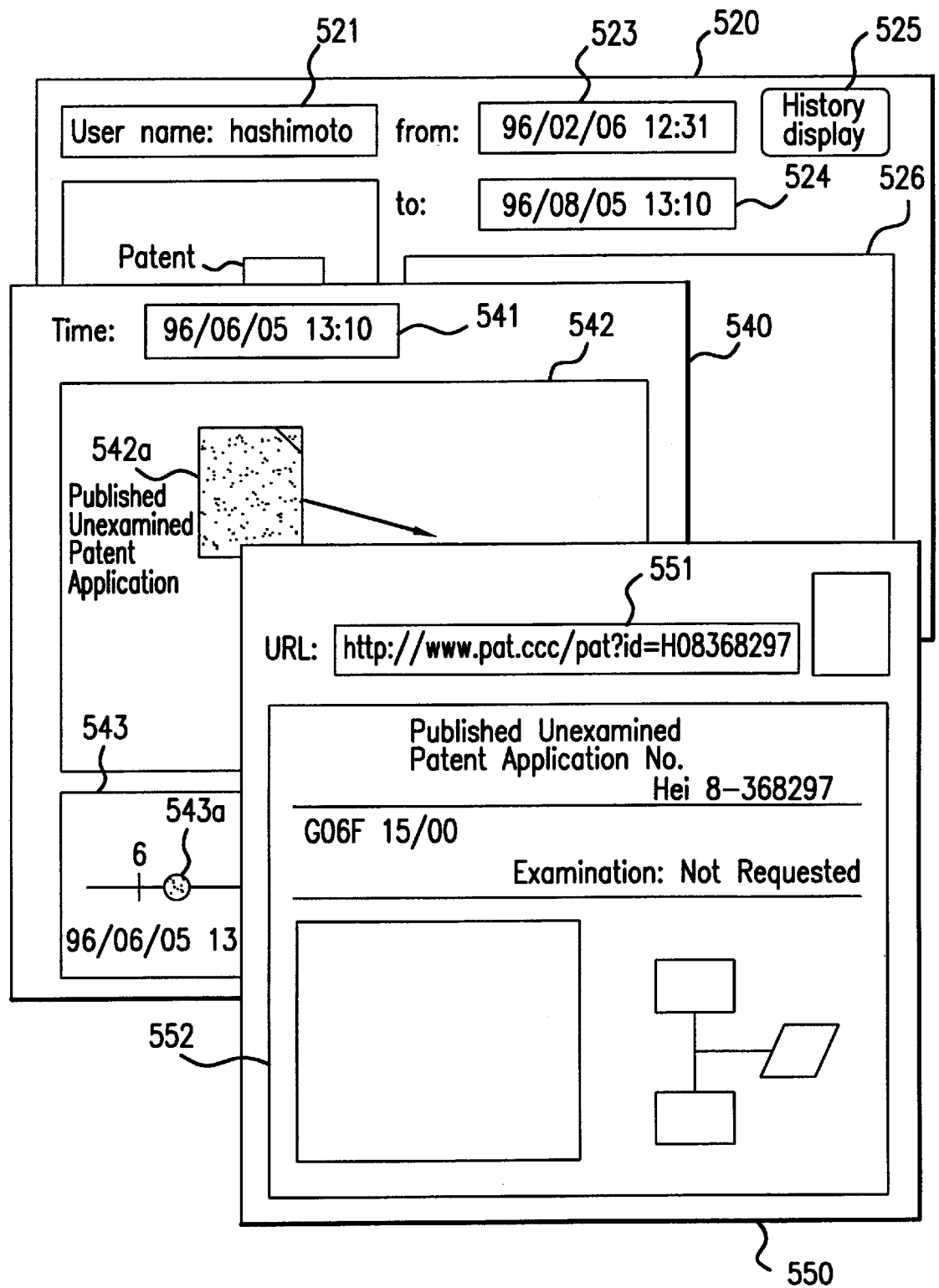
FIG. 38 is a view of a screen for again browsing "HTML document 4"

FIG. 38 is a view of a screen for viewing the data "HTML document 4." Double-clicking on the icon 542a causes a browsed data display screen 550 to appear. The screen 550 includes a URL display area 551 and a document content display window 552. The window 552 shows contents of the data "HTML document 4."

Similarly, double-clicking on the icon 542b representing the "Published Unexamined Patent Application" in the past work space of FIG. 37 causes the client software 411 to transmit to the data routing apparatus 420 a data request along with the following information:

```
(GET-LOG
  (USER hashimoto)
  (URL http://www.pat.ccc/pat?id=H08368297)
  (WORK patent)
  (TIME 10:09 07/25/96)
)
```

The data routing apparatus 420 returns data "HTML document 5" to the client software 411.

Figure 39:
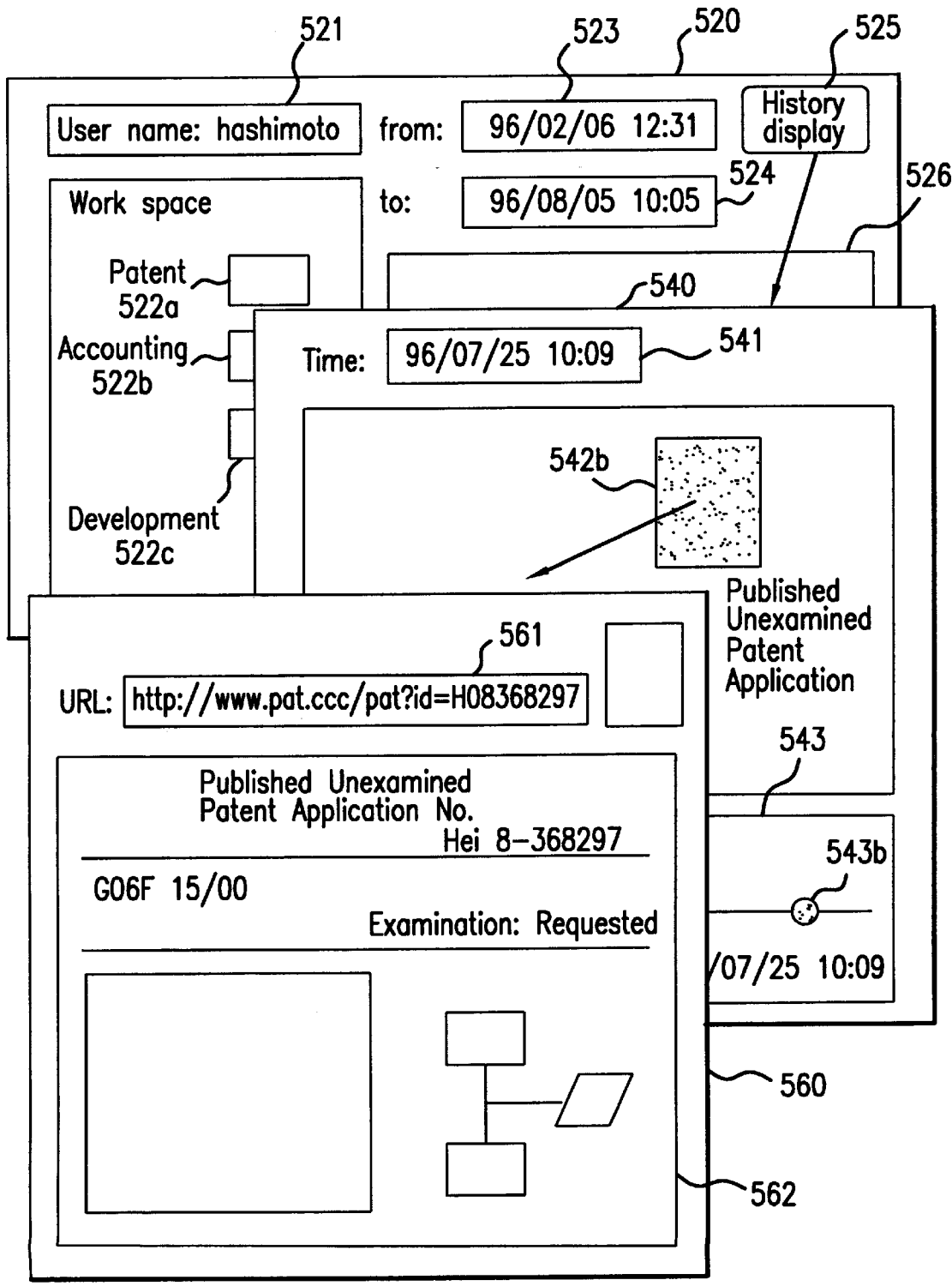
FIG. 39 is a view of a screen for again browsing "HTML document 5"
Figure 40:
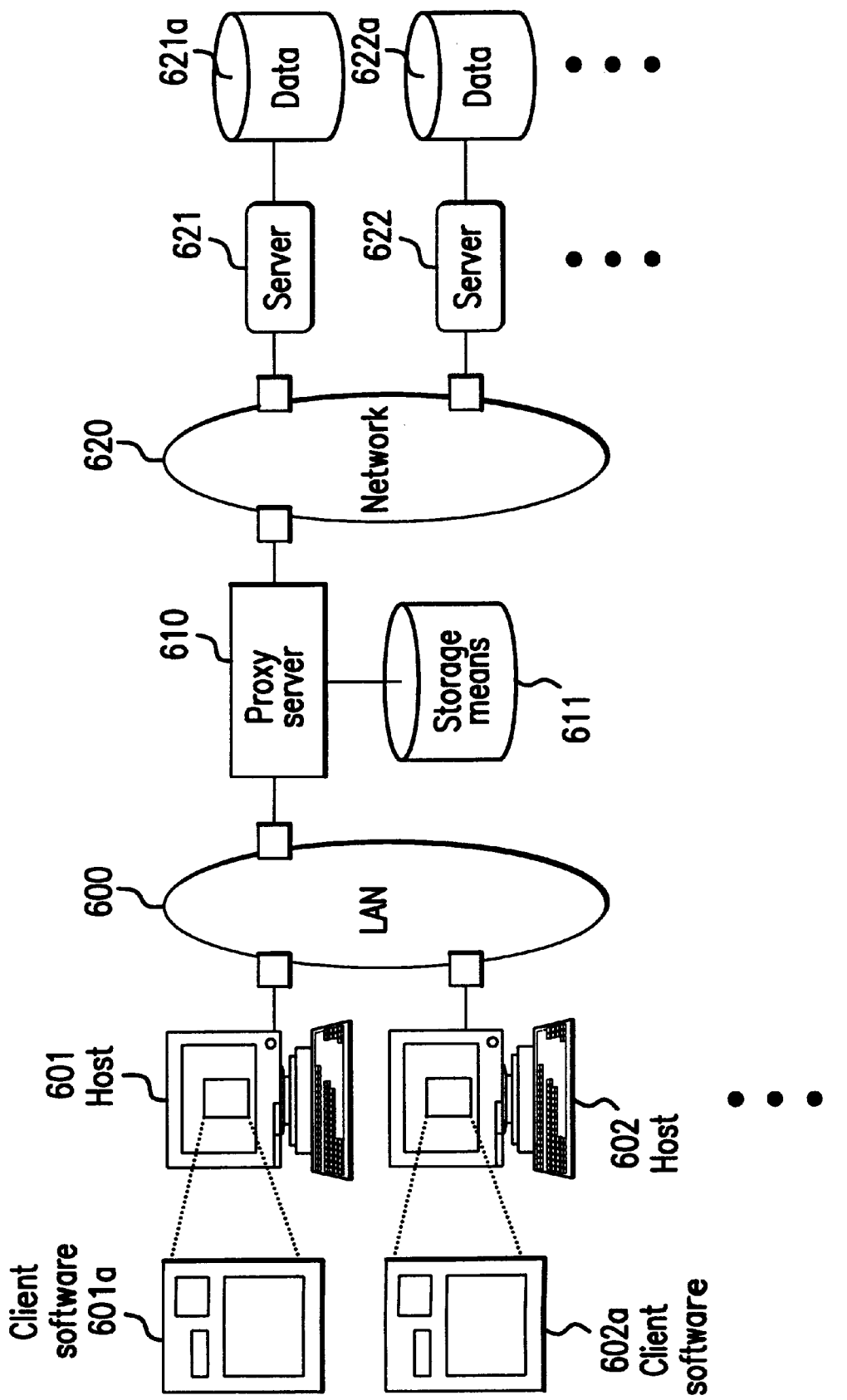
FIG. 40 is a schematic view of an environment in which a conventional proxy server works.
Figure 41:
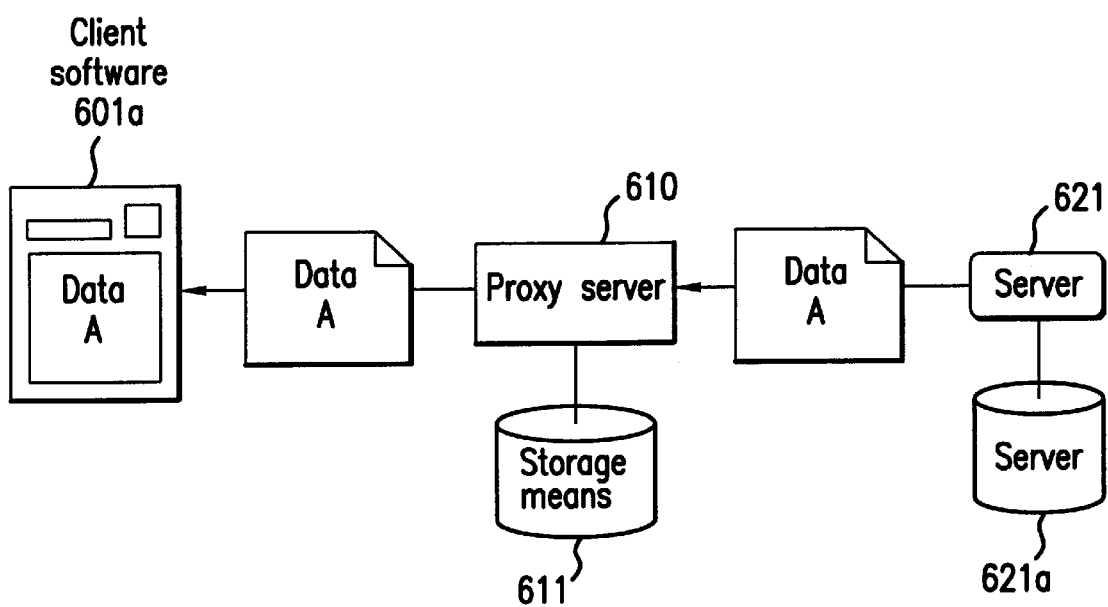
FIG. 41 is a schematic view depicting how the conventional proxy server typically works.

The client software 411 displays the data "HTML document 5" returned from the data routing apparatus 420. FIG. 39 is a view of a screen 560 for again browsing the data "HTML document 5." The browsed data display screen 560 includes a URL display area 561 and a document content display window 562. The window 562 shows contents of the data "HTML document 5."

The screen in FIG. 39 differs from that in FIG. 38 in terms of entry in the field "examination" ("requested" entered for one, "not requested" for the other). The difference of screen display between the two figures is due to the fact that the data corresponding to the URL "http://www.pat.ccc/pat?id=H08368297" was updated in the server "www.pat.ccc" between the time "13:10, 06/05/96" and the time "10:09, 07/25/96."

In the manner described, past work spaces may be reproduced and previously browsed data may again be viewed. Because a reproduced past work space is displayed together with the same name as that referenced in the past, the relationship between the original document and its variation following any update that may have since occurred remains clear and unambiguous.

As described and according to the invention, the data routing apparatus that routes data between a network and data terminal equipment retains historical information about past data requests.

The data routing apparatus accumulates such historical information independent of client software, of the environment in which the software operates or of servers connected to the apparatus. This allows any client software to make use of the historical information in the inventive data routing apparatus.

According to the invention, no direct access takes place between the external network and data terminal equipment.

This reduces the danger of illegal access to the data terminal equipment and can lower the load on the network.

Because routed data is retained as historical information associated with time information, a user operating data utilization means may acquire the same data prior to any update that may have since occurred by designating the time at which the data was obtained.

The server according to the invention retains data that was fed to other data terminal equipment as historical information associated with time information. Thus a user accessing a server from data terminal equipment may acquire the same data prior to any update that may have since occurred by designating the time at which the data was last served.

The data terminal equipment according to the invention retains data acquired from servers as historical information associated with time information. This allows a user operating the data terminal equipment to acquire the same data prior to any update that may have since occurred by designating the time at which the data was last obtained.

What is claimed is:

1. A data routing apparatus for routing data between a network server and data terminal equipment, said data routing apparatus comprising:

historical information holding means for holding historical information about past data requests from said data terminal equipment, said historical information holding means further accommodating additional historical information about any new data request coming from said data terminal equipment;

data acquisition means for accessing said network server in accordance with said data request so as to acquire requested data; and data output means for outputting the data acquired by said data acquisition means and said historical information to said data terminal equipment that issued said data request.

2. A data routing apparatus according to claim 1, further comprising data preparation means for supplementing the data acquired by said data acquisition means with said historical information so as to prepare history-supplemented data, wherein said data output means outputs said history-supplemented data to said data terminal equipment.

3. A data routing apparatus according to claim 1, wherein said data acquisition means includes:

data holding means for holding data acquired from said network server in accordance with a data request from said data terminal equipment; and request processing means, given a data request, for searching said historical information for any information matching said data request in order to request data from said network server in the case of a mismatch and to request data from said data holding means in the event of a match.

4. A data routing apparatus according to claim 1, wherein, upon accommodating additional historical information about a data request, said historical information holding means checks said historical information against said additional historical information to see if the two kinds of information match, said historical information holding means further counting up said historical information instead of accommodating said additional historical information in the event of an information match.

5. A data routing apparatus according to claim 2, wherein said data preparation means prepares said history-supplemented data by supplementing the data acquired by said data acquisition means with said historical information as well as with link information pointing to data designated by said historical information.

6. A data routing apparatus according to claim 1, wherein said historical information holding means holds information including user information as said historical information.

7. A data routing apparatus according to claim 6, further comprising data preparation means for preparing history-supplemented data by supplementing the data acquired by said data acquisition means with only that part of said historical information about a user who sent in said data request, wherein said data output means outputs said history-supplemented data to said data terminal equipment.

8. A data routing apparatus according to claim 2, further comprising condition management means for holding history-unnecessary conditions and for checking to see if acquired data matches any of said history-unnecessary conditions, wherein said data preparation means prepares history-supplemented data only if none of said history-unnecessary conditions are met by said acquired data.

9. A data routing apparatus for routing data between data utilization means for utilizing requested and acquired data on the one hand, and data service means for serving, as requested, data stored therein on the other hand, said data routing apparatus comprising:

history holding means for holding historical information about routed data;

request analysis means for analyzing a data acquisition request received from said data utilization means to see whether the request is a data routing request or a historical information acquisition request, said request analysis means further extracting a data name from said data acquisition request if the request is found to be a data routing request, said request analysis means further extracting a data name and time information from said data acquisition request if the request is found to be a historical information acquisition request;

data request means which, when said data acquisition request is a data routing request, requests from said data service means the data corresponding to the data name extracted by said request analysis means, said data request means also receiving the data sent from said data service means as requested;

history management means which, when said data acquisition request is a data routing request, stores into said history holding means historical information associating with the data received by said data request means, a name for the received data, and time information representing a time at which data routing was performed, said history management means thereupon preparing the data received by said data request means as output data; said history management means further acting, when said data acquisition request turns out to be a historical information acquisition request, to retrieve from said history holding means historical information relevant to the data name and time information extracted by said request analysis means, said history management means thereupon preparing the data included in the retrieved historical information as output data; and output means for sending the output data prepared by said history management means to said data utilization means that issued said data acquisition request.

10. A data routing apparatus according to claim 9, wherein, if said data service means has sent both contents of data and a last update time at which the data in question was last updated, said data request means receives both the data contents and said last update time; and wherein said history management means includes said last update time into historical information and stores into said history holding means the historical information about said data received by said data request means.

11. A data routing apparatus according to claim 9, wherein said request analysis means checks to see if said data acquisition request includes an indicator designating noninclusion of historical information; and wherein said history management means stores into said history holding means the historical information about said data received by said data request means only if said data acquisition request is a data routing request without an indicator designating noninclusion of historical information.

12. A data routing apparatus according to claim 9, wherein if, said data acquisition request is a historical information acquisition request, and if said history holding means holds no historical information relevant to the data name and time information extracted by said request analysis means, then said history management means prepares as output data the information designating no record of the requested historical information.

13. A data routing apparatus according to claim 9, wherein if said data acquisition request is a historical information acquisition request, and said history holding means holds no historical information relevant to the data name and time information extracted by said request analysis means, then said history management means prepares as output data the data in the historical information whose time information is closest to the extracted time information, relevant to said data name extracted by said request analysis means.

14. A data routing apparatus according to claim 9, wherein, upon receipt of information indicating the absence of relevant historical information, said data request means requests, from said data service means, the data corresponding to the data name extracted by said request analysis means and receives the data sent from said data service means as requested; and wherein, if said data acquisition request is found to be a historical information acquisition request, and said history holding means holds no historical information relevant to the data name and time information, as extracted by said request analysis means, then said history management means supplies said data request means with information indicating the absence of relevant historical information.

15. A data routing apparatus according to claim 9, wherein, if said data acquisition request is a data routing request, said request analysis means extracts a data name and a request output time from said data acquisition request; and wherein, if said data acquisition request is a data routing request, said history management means prepares as time information the request output time extracted by said request analysis means and stores into said history holding means the historical information about the data received by said data request means.

16. A data routing apparatus according to claim 9, wherein said request analysis means extracts from said data acquisition request context information including at least one of a user name, a host name, a task name, a department name and a group name; and wherein, if said data acquisition request is found to be a data routing request, said history management means includes said context information into historical information and stores into said history holding means the historical information about the data received by said data request means.

17. A data routing apparatus according to claim 9, wherein said request analysis means receives a data acquisition request from said data utilization means operating on a computer connected via a network;

wherein said data request means requests data from said data service means acting as a server connected via said network; and said data output means outputs data to said data utilization means connected via said network.

18. A data routing apparatus according to claim 9, wherein, upon receipt of a historical information retrieval request from said data utilization means, said request analysis means extracts a retrieval condition from said historical information retrieval request;

wherein said history management means searches said history holding means for historical information in accordance with the retrieval condition extracted by said analysis request means; and wherein said output means outputs the historical information retrieved by said history management means to said data utilization means that issued said historical information retrieval request.

19. A data routing apparatus for routing data between data utilization means for utilizing requested and acquired data on the one hand, and data service means for serving, as requested, data stored therein on the other hand, said data routing apparatus comprising:

history holding means for holding historical information about routed data;

request analysis means for analyzing a data acquisition request received from said data utilization means to see whether the request is a data routing request or a historical information acquisition request, said request analysis means further extracting a data name from said data acquisition request if the request is found to be a data routing request, said request analysis means further extracting a data name and a data identifier from said data acquisition request if the request is found to be a historical information acquisition request;

data request means which, when said data acquisition request turns out to be a data routing request, requests from said data service means the data corresponding to the data name extracted by said request analysis means, said data request means further receiving the data sent from said data service means as requested;

history management means which, when said data acquisition request is a data routing request, stores into said history holding means historical information associating with the data received by said data request means, a name for the received data, and an identifier identifying contents of the data, said history management means thereupon preparing the data received by said data request means as output data; said history management means further acting, when said data acquisition request is a historical information acquisition request, to retrieve from said history holding means historical information relevant to the data name and data identifier extracted by said request analysis means, said history management means thereupon preparing the data included in the retrieved historical information for output; and output means for sending the output data prepared by said history management means to said data utilization means that issued said data acquisition request.

20. A data routing apparatus for routing data between data storage request means for outputting a data storage request on the one hand, and data management means for storing and managing response data on the other hand, said data routing apparatus comprising:

history holding means for holding historical information about routed data;

request analysis means which, upon receipt of a data storage request from said data storage request means, extracts data and a data name from said data storage request, said request analysis means further acting, upon receipt of a data acquisition request from said data storage request means, to extract a data name and time information from said data acquisition request;

data output means which, when said request analysis means has received said data storage request, outputs a data storage request to the data management means corresponding to the data name extracted by said request analysis means;

history management means which, when said request analysis means has received said data storage request, stores into said history holding means historical information associating the data extracted by said data request means, a name of the extracted data, and time information representing a time at which data routing was performed; said history management means further acting, when said request analysis means has received a data acquisition request, to retrieve from said history holding means historical information relevant to the data name and time information extracted by said request analysis means, said history management means thereupon preparing the data included in the retrieved historical information as output data; and output means for sending the output data prepared by said history management means to said data storage request means that issued said data storage request.

21. A server for returning data in response to a request from data terminal equipment, said server comprising:

data holding means for holding data to be served via a network;

history holding means for holding historical information about data served in response to data acquisition requests;

request analysis means for analyzing a data acquisition request received from data terminal equipment to see whether the request is a latest data acquisition request or a historical information acquisition request, said request analysis means further extracting a data name from said data acquisition request if the request is found to be a latest data acquisition request, said request analysis means further extracting a data name and time information from said data acquisition request if the request is found to be a historical information acquisition request;

data retrieval means which, when said data acquisition request is found to be a latest data acquisition request, retrieves from said data holding means the data corresponding to the data name extracted by said request analysis means;

history management means which, when said data acquisition request is a latest data acquisition request, stores into said history holding means historical information associating with the data retrieved by said data retrieval means a name for the retrieved data, and time information representing a time at which data was served, said history management means thereupon preparing the data retrieved by said data retrieval means as output data; said history management means further acting, when said data acquisition request turns out to be a historical information acquisition request, to retrieve from said history holding means historical information relevant to the data name and time information extracted from said data acquisition request, said history management means thereupon preparing the data included in the retrieved historical information as output data; and output means for sending the output data prepared by said history management means to the data terminal equipment that issued said data acquisition request.

22. Data terminal equipment for accessing data in a server connected via a network, said data terminal equipment comprising:

history holding means for holding historical information about data acquired through access to said server;

request analysis means for analyzing a data acquisition request that is input to determine whether the request is a server access request or a historical information acquisition request, said request analysis means further extracting a data name from said data acquisition request if the request is found to be a server access request, said request analysis means further extracting a data name and time information from said data acquisition request if the request is found to be a historical information acquisition request;

data request means which, when said data acquisition request is a server access request, requests from said server the data corresponding to the data name extracted by said request analysis means, said data request means further receiving the data sent from said server as requested;

history management means which, when said data acquisition request turns out to be a server access request, stores into said history holding means historical information associating the data received by said data request means, a name of the received data, and time information representing a time at which server access was performed, said history management means thereupon preparing the data received by said data request means as output data; said history management means further acting, when said data acquisition request is a historical information acquisition request, to retrieve from said history holding means historical information relevant to the data name and time information extracted by said request analysis means, said history management means thereupon preparing the data included in the retrieved historical information as output data; and display means for displaying on a display screen the output data prepared by said history management means.

23. Data terminal equipment for routing data to and from a server; for storing and managing routed data, data names and time information associated into historical information; and for accessing, through a data acquisition request including a data name and time information, data in a server located on a network and connected through a data routing apparatus which returns data included in relevant historical information, said data terminal equipment comprising:

request means which, when accessing the latest data in said server, outputs to said data routing apparatus a data acquisition request designating a name of said latest data, said request means further acting, when accessing data in said historical information held by said data routing apparatus, to output a data acquisition request designating a data name and time information;

data reception means for receiving data sent from said data routing apparatus in accordance with said data acquisition request; and display means for displaying on a display screen the data received by said data reception means.

24. Data terminal equipment according to claim 23, further comprising:

time holding means for holding time information;

access time management means which, when said data acquisition request means has output said data acquisition request, associates a name of the requested data with time information representing a time at which the request was output and stores the time information into said time holding means, said access time management means further outputting time information from said time holding means when an access time acquisition request is input; and time information display means for displaying on a display screen the time information output by said access time management means.

25. Data terminal equipment for routing data to and from a server; for storing and managing routed data, data names and time information associated into historical information; and for accessing, through a data acquisition request including a data name and time information, data in a server located on a network and connected through a data routing apparatus which returns data included in relevant historical information, said data terminal equipment comprising:

work space control means which, given a storage order ordering storage of a work state associated with data in a server and represented by an icon, stores a work space denoting said work state in association with time information indicating a time at which said storage order was issued, said work space control means further acting, given a restoration order ordering restoration of a work space, to restore a past work state denoted by the work space designated by said restoration order;

request means which, when an icon on a work space is selected, transmits to said data routing apparatus a data acquisition request including the name of the data associated with the selected icon and the time information related to said work space;

data reception means for receiving data sent from data routing apparatus in accordance with said data acquisition request; and display means for displaying on a display screen the data received by said data reception means.

* * * * *